US009009512B2

(12) United States Patent
Henry et al.

(10) Patent No.: US 9,009,512 B2
(45) Date of Patent: *Apr. 14, 2015

(54) POWER STATE SYNCHRONIZATION IN A MULTI-CORE PROCESSOR

(71) Applicant: VIA Technologies, Inc., New Taipei (TW)

(72) Inventors: G. Glenn Henry, Austin, TX (US); Darius D. Gaskins, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,373

(22) Filed: Feb. 4, 2014

(65) Prior Publication Data

US 2014/0173301 A1  Jun. 19, 2014

Related U.S. Application Data

(63) Continuation of application No. 13/299,059, filed on Nov. 17, 2011, now Pat. No. 8,782,451.

(60) Provisional application No. 61/426,470, filed on Dec. 22, 2010.

(51) Int. Cl.
*G06F 1/32* (2006.01)
*G06F 1/26* (2006.01)
*G06F 9/50* (2006.01)

(52) U.S. Cl.
CPC ............. *G06F 1/26* (2013.01); *G06F 1/3206* (2013.01); *G06F 1/3237* (2013.01); *G06F 1/324* (2013.01);

(Continued)

(58) Field of Classification Search
CPC ....... G06F 1/26; G06F 1/3206; G06F 1/3237; G06F 1/324; G06F 1/3287; G06F 1/3296

USPC .................................... 713/320, 323
See application file for complete search history.

(56) References Cited

U.S. PATENT DOCUMENTS 4,748,559 A  5/1988 Smith et al.
5,467,455 A  11/1995 Gay et al.

(Continued)

FOREIGN PATENT DOCUMENTS

CN  101111814  1/2008
CN  101901177  12/2010

OTHER PUBLICATIONS

"Intel® Core™ 2 Extreme Quad-Core Mobile Processor and Intel® Core™ 2 Quad Mobile Processor on 45-nm Process." Datasheet. For platforms based on Mobile Intel® 4 Series Express Chipset Family. Jan. 2009 Document No. 320390-002 pp. 1-72.

(Continued)

*Primary Examiner* — Nimesh G Patel
(74) *Attorney, Agent, or Firm* — E. Alan Davis; James W. Huffman; Eric W. Cernyar

(57) ABSTRACT

A multi-core processor includes microcode distributed in each core enabling each core to participate in a de-centralized inter-core state discovery process. In a related microcode-implemented method, states of a multi-core processor are discovered by at least two cores participating in a de-centralized inter-core state discovery process. The inter-core state discovery process is carried out through a combination of microcode executing on each participating core and signals exchanged between the cores through sideband non-system-bus communication wires. The discovery process is unmediated by any centralized non-core logic. Applicable discoverable states include target and composite power states, whether and how many cores are enabled, the availability and distribution of various resources, and hierarchical structures and coordination systems for the cores. The inter-core state discovery process may be carried out in accordance with various hierarchical coordination systems involving chained inter-core communications.

16 Claims, 32 Drawing Sheets

(52) U.S. Cl.
CPC .......... *G06F 1/3287* (2013.01); *G06F 1/3296* (2013.01); *G06F 9/5094* (2013.01); *Y02B 60/1217* (2013.01); *Y02B 60/1282* (2013.01); *Y02B 60/1285* (2013.01); *Y02B 60/1221* (2013.01); *Y02B 60/142* (2013.01)

(56) References Cited

U.S. PATENT DOCUMENTS

| | | | |
|---|---|---|---|
| 5,485,625 | A | 1/1996 | Gumkowski |
| 5,546,588 | A | 8/1996 | Deems et al. |
| 5,587,987 | A | 12/1996 | Okabe |
| 5,918,061 | A | 6/1999 | Nikjou |
| 6,496,880 | B1 | 12/2002 | Ma et al. |
| 6,665,802 | B1 * | 12/2003 | Ober ........................... 713/320 |
| 6,968,467 | B2 * | 11/2005 | Inoue et al. ................. 713/320 |
| 7,257,679 | B2 * | 8/2007 | Clark ........................... 711/141 |
| 7,308,558 | B2 | 12/2007 | Arimilli et al. |
| 7,358,758 | B2 | 4/2008 | Gaskins et al. |
| 7,451,333 | B2 | 11/2008 | Naveh et al. |
| 7,467,294 | B2 | 12/2008 | Matsuoka et al. |
| 8,024,591 | B2 | 9/2011 | Bertelsen et al. |
| 8,046,615 | B2 | 10/2011 | Taguchi et al. |
| 8,103,816 | B2 | 1/2012 | Tiruvallur et al. |
| 8,214,632 | B2 | 7/2012 | Choi et al. |
| 8,358,651 | B1 | 1/2013 | Kadosh et al. |
| 8,359,436 | B2 | 1/2013 | Vash et al. |
| 2004/0019827 | A1 | 1/2004 | Rohfleisch et al. |
| 2004/0117510 | A1 | 6/2004 | Arimilli et al. |
| 2005/0138249 | A1 | 6/2005 | Galbraith et al. |
| 2006/0053326 | A1 * | 3/2006 | Naveh et al. ................. 713/323 |
| 2006/0171244 | A1 | 8/2006 | Ando |
| 2006/0224809 | A1 | 10/2006 | Gelke et al. |
| 2006/0282692 | A1 | 12/2006 | Oh |
| 2007/0070673 | A1 | 3/2007 | Borkar et al. |
| 2007/0143514 | A1 | 6/2007 | Kaushik et al. |
| 2007/0266262 | A1 | 11/2007 | Burton et al. |
| 2008/0129274 | A1 | 6/2008 | Komaki |
| 2009/0013217 | A1 | 1/2009 | Shibata et al. |
| 2009/0083516 | A1 | 3/2009 | Saleem et al. |
| 2009/0094481 | A1 | 4/2009 | Vera et al. |
| 2009/0172423 | A1 | 7/2009 | Song et al. |
| 2009/0222654 | A1 | 9/2009 | Hum et al. |
| 2009/0233239 | A1 | 9/2009 | Temchenko et al. |
| 2009/0307408 | A1 | 12/2009 | Naylor |
| 2009/0319705 | A1 | 12/2009 | Foong et al. |
| 2010/0058078 | A1 | 3/2010 | Branover et al. |
| 2010/0138683 | A1 | 6/2010 | Burton et al. |
| 2010/0250821 | A1 | 9/2010 | Mueller |
| 2010/0325481 | A1 | 12/2010 | Dahan et al. |
| 2010/0332869 | A1 | 12/2010 | Hsin et al. |
| 2011/0185125 | A1 | 7/2011 | Jain et al. |
| 2011/0265090 | A1 | 10/2011 | Moyer et al. |
| 2011/0271126 | A1 | 11/2011 | Hill |
| 2011/0295543 | A1 | 12/2011 | Fox et al. |
| 2012/0005514 | A1 | 1/2012 | Henry et al. |
| 2012/0023355 | A1 * | 1/2012 | Song et al. .................... 713/323 |
| 2012/0124264 | A1 | 5/2012 | Tiruvallur et al. |
| 2012/0161328 | A1 | 6/2012 | Henry et al. |
| 2012/0166763 | A1 | 6/2012 | Henry et al. |
| 2012/0166764 | A1 | 6/2012 | Henry et al. |
| 2012/0166832 | A1 | 6/2012 | Gaskins et al. |
| 2012/0166837 | A1 | 6/2012 | Henry et al. |
| 2012/0166845 | A1 | 6/2012 | Henry et al. |
| 2012/0239847 | A1 | 9/2012 | Gaskins |

OTHER PUBLICATIONS

"Intel® Atom™ Processor 330$^\Delta$ Series." Datasheet. For systems based on Nettop Platform for '08. Revision 002. Feb. 2009: Document No. 320528-002. pp. 1-50.

"Intel® Core™ 2 Duo Processors and Intel® Core™ 2 Extreme Processors for Platforms Based on Mobile Intel® 965 Express Chipset Family." Datasheet. Jan. 2008. Document No. 316745-005. pp. 1-87.

"Intel® Core™ Duo Processor and Intel® Core™ Solo Processor on 65 nm Processs." Datasheet. Jan. 2007. Document No. 309221-006. pp. 1-91.

Richard, Michael Graham. "Intel's Next CPU to Include Dedicated 'Power Control Unit' to Save Power." Aug. 22, 2008. Downloaded from http://www.treehugger.com/files/2008/08/intel-cpu-processor-nehalem-i7-power-pcu.php on Jul. 14, 2010. pp. 1-4.

Naveh, Alon et al. "Power and Thermal Management in Intel® Core™ Duo Processor." Intel® Technology Journal. vol. 10, Issue 02, Published May 15, 2006. ISSN 1535-864X pp. 109-123.

Glaskowsky, Peter. "Investigating Intel's Lynnfield Mysteries." Mcall.com, CNET News, Speeds and Feeds. Sep. 21, 2009. Downloaded from http://mcall.com.com/8301-13512_3-10357328-23.html?tag=mncol;txt downloaded on Jul. 14, 2010. pp. 1-4.

Wasson, Scott. "Intel's Core i7 Processors; Nehalem Arrives with a Splash." The Tech Report. Nov. 3, 2008. Downloaded from http://techreport.com/articles.x/15818/1 on Jul. 14, 2010. pp. 1-11.

"Intel® QuickPath Architecture; A New System Architecture." White Paper Document No. 319725-001US. Mar. 2008 pp. 1-6.

Sartori, John et al. "Distributed Peak Power Management for Many-core Architectures." Published in Design, Automation & Test in Europe Conference & Exhibition, Apr. 2009, pp. 1556-1559.

* cited by examiner

SYNC_CSTATE (A) – CONT.

SYNC_CSTATE (A) – CONT.

SYNC_CSTATE (A) – CONT.

SYNC_CSTATE (A) – CONT.

POWER STATE SYNCHRONIZATION IN A MULTI-CORE PROCESSOR

CROSS REFERENCE TO RELATED APPLICATION(S)

This application is a continuation of U.S. patent application Ser. No. 13/299,059, filed Nov. 17, 2011, which claims priority based on U.S. Provisional Application Ser. No. 61/426,470, filed Dec. 22, 2010, entitled MULTI-CORE INTERNAL BYPASS BUS, each of which is incorporated by reference in its entirety This application is related to the following co-pending U.S. Patent Applications which are concurrently filed herewith, each of which is hereby incorporated by reference in its entirety.

| Ser. No. | Filing Date | Title |
| --- | --- | --- |
| 13/299,014 | Nov. 17, 2011 | MULTI-CORE INTERNAL BYPASS BUS |
| 13/299,122 | Nov. 17, 2011 | DECENTRALIZED POWER MANAGEMENT DISTRIBUTED AMONG MULTIPLE PROCESSOR CORES |
| 13/299,171 | Nov. 17, 2011 | RETICLE SET MODIFICATION TO PRODUCE MULTI-CORE DIES |
| 13/299,207 | Nov. 17, 2011 | DYNAMIC MULTI-CORE MICROPROCESSOR CONFIGURATION DISCOVERY |
| 13/299,225 | Nov. 17, 2011 | DISTRIBUTED MANAGEMENT OF A SHARED POWER SOURCE TO A MULTI-CORE MICROPROCESSOR |
| 13/299,239 | Nov. 17, 2011 | DYNAMIC AND SELECTIVE CORE DISABLEMENT AND RECONFIGURATION IN A MULTI-CORE PROCESSOR |

FIELD OF THE INVENTION

The present invention relates to the field of multi-core microprocessor design, and more particularly, to the management and implementation of restricted operational states for cores and multi-core domains of a multi-core multiprocessor.

BACKGROUND OF THE INVENTION

A primary way in which modern microprocessors reduce their power consumption is to reduce the frequency and/or the voltage at which the microprocessor is operating. Additionally, in some instances the microprocessor may be able to allow clock signals to be disabled to portions of its circuitry. Finally, in some instances the microprocessor may even remove power altogether to portions of its circuitry. Furthermore, there are times when peak performance is required of the microprocessor such that it needs to be operating at its highest voltage and frequency. The microprocessor takes power management actions to control the voltage and frequency levels and clock and power disablement of the microprocessor. Typically the microprocessor takes the power management actions in response to directions from the operating system. The well-known x86 MWAIT instruction is an example of an instruction that the operating system may execute to request entry to an implementation-dependent optimized state, which the operating system uses to perform advanced power management. The optimized state may be a sleeping, or idle, state. The well-known Advanced Configuration Power Interface (ACPI) Specification facilitates operating system-directed power management by defining operational or power-management related states (such as "C-states" and "P-states").

Performing the power management actions is complicated by the fact that many modern microprocessors are multi-core processors in which multiple processing cores share one or more power management-related resources. For example, the cores may share voltage sources and/or clock sources. Furthermore, computing systems that include a multi-core processor also typically include a chipset that includes bus bridges for bridging the processor bus to other buses of the system, such as to peripheral I/O buses, and includes a memory controller for interfacing the multi-core processor to a system memory. The chipset may be intimately involved in the various power management actions and may require coordination between itself and the multi-core processor.

More specifically, in some systems, with the permission of the multi-core processor, the chipset may disable a clock signal on the processor bus that the processor receives and uses to generate most of its own internal clock signals. In the case of a multi-core processor, all of the cores that use the bus clock must be ready for the chipset to disable the bus clock. That is, the chipset cannot be given permission to disable the bus clock until all the cores are prepared for the chipset to do so.

Still further, normally the chipset snoops the cache memories on the processor bus. For example, when a peripheral device generates a memory access on a peripheral bus, the chipset echoes the memory access on the processor bus so that the processor may snoop its cache memories to determine whether it holds data at the snoop address. For example, USB devices are notorious for periodically polling memory locations, which generates periodic snoop cycles on the processor bus. In some systems, the multi-core processor may enter a deep sleep state in which it flushes its cache memories and disables the clock signals to the caches in order to save power. In this state, it is wasteful for the multi-core processor to wake up in response to the snoop cycle on the processor bus to snoop its caches (which will never return a hit because they are empty) and to then go back to sleep. Therefore, with the permission of the multi-core processor, the chipset may be authorized not to generate snoop cycles on the processor bus in order to achieve additional power savings. However, again, all of the cores must be ready for the chipset to turn off snooping. That is, the chipset cannot be given permission to turn off snooping until all the cores are prepared for the chipset to do so.

U.S. Pat. No. 7,451,333 issued to Naveh et al. (hereinafter Naveh) discloses a multi-core microprocessor that includes multiple processing cores. Each of the cores is capable of detecting a command that requests the core to transition to an idle state. The multi-core processor also includes Hardware Coordination Logic (HCL). The HCL receives idle state status from the cores and manages power consumption of the cores based on the commands and the idle state status of the cores. More specifically, the HCL determines whether all the cores have detected a command requesting a transition to a common state. If not, the HCL selects a shallowest state among the commanded idle states as the idle state for each core. However, if the HCL detects a command requesting transition to a common state, the HCL can initiate shared power saving features such as performance state reductions, a shutdown of a shared phase-locked-loop (PLL), or saving of an execution context of the processor. The HCL can also prevent external break events from reaching the cores and can transition all the cores to the common state. In particular, the HCL can conduct a handshake sequence with the chipset to transition the cores to the common state.

In an article by Alon Naveh et al. entitled "Power and Thermal Management in the Intel Core Duo Processor" which appeared in the May 15, 2006 issue of the Intel Technology Journal, Naveh et al. describes a consistent C-state control architecture using an off-core hardware coordination logic (HCL), located in a shared region of the die or platform, that serves as a layer between the individual cores and shared resources on the die and platform. The HCL determines the required CPU C-state based on the cores' individual requests, controls the state of the shared resources, and emulates a legacy single-core processor to implement the C-state entry protocol with the chipset.

In the scheme disclosed by both Naveh references, the HCL is centralized non-core logic outside the cores themselves that performs power management actions on behalf of all the cores. This centralized non-core logic solution may be disadvantageous, especially if the HCL is required to reside on the same die as the cores in that it may be yield-prohibitive due to large die sizes, particularly in configurations in which it would be desirable to include many cores on the die.

BRIEF SUMMARY OF INVENTION

In one aspect of the present invention, a multi-core processor is provided comprising a plurality of physical processing cores and inter-core state discovery microcode in each core. The inter-core state discovery microcode enables the core to participate in a de-centralized inter-core power state discovery process. Relatedly, a decentralized, microcode-implemented method is providing of discovering power states of a multi-core processor, including at least two cores participating in a de-centralized inter-core state discovery process. The inter-core state discovery process is carried out through a combination of microcode executing on each participating core and signals exchanged between the cores through sideband non-system-bus communication wires. The discovery process is unmediated by any centralized non-core logic. Moreover, in many embodiments, the inter-core state discovery process is carried out in accordance with an appropriate or selected hierarchical coordination system using chained inter-core communications.

In other aspects, inter-core state discovery processes are provided for the discovery of microprocessor configurations, including the availability and distribution of resources, which cores and how many cores are enabled, and hierarchical coordination structures and systems of the microprocessor, including domain and domain master identification.

In another aspect of the present invention, a multi-core processor is provided comprising a plurality of enabled physical processing cores and a configurable resource shared by two or more of the cores, wherein configurations of the resource affect the power, speed, or efficiency with which the cores sharing the resource are able to operate. The processor further includes, for each core, internal core power state management logic configuring each core to participate in a de-centralized inter-core power state discovery process carried out between the cores without the assistance of centralized non-core logic. The internal core power management logic configures the core to instigate implementation of a composite target power state configuring the shared resource, if the core is designated as a master core for the purpose of configuring the shared resource and the composite target power state is discovered through the de-centralized inter-core power state discovery process. The composite target power state is a most power-conserving power state for the shared resource that will not interfere with any corresponding target power state of each core sharing the resource.

In a related aspect, a decentralized method of managing power states for a multi-core processor is provided. A core receives a target power state affecting a configurable resource shared between itself and at least one other core, wherein the target power state defines a configuration of the resource that would affect the power, speed, or efficiency with which the cores sharing the resource would be able to operate. The core participates in an inter-core power state discovery process that comprises an exchange, unmediated by any centralized non-core logic, of power states with at least one other core sharing the resource. The core instigates implementation of a composite target power state for configuring the shared resource, if the core is designated as a master core for the purpose of configuring the shared resource and the composite target power state is discovered through the de-centralized inter-core power state discovery process.

In yet another aspect, the present invention provides a multi-core processor. Each core of the multi-core processor includes power state management microcode for configuring that core to participate in a decentralized inter-core composite power state discovery process. The power state management microcode enables each core to receive a state transition request to configure itself in accordance with any requested targeted one of a plurality of predefined power states including an active operating state and one or more progressively less responsive states. When a core receives a request to transition into a restricted power state, such as a power state that could interfere with resources shared by other cores, then its power state management microcode initiates a decentralized inter-core composite power state discovery process to determine whether all other affected cores are ready for that restricted power state.

If the cores participating in the discovery process confirm that the restricted power state is the composite power state, then an authorized one of the cores, through its power state management microcode, implements, or enables implantation of, the restricted power state. Specifically, the authorized core will implement the most restrictive or power-conserving operating state that can be implemented by the core without interfering with corresponding target operating states of other cores.

In another aspect, a portion or routine of each core's power management microcode is synchronization logic that is configured to exchange power state information with other nodally connected cores to determine compound power states. Each invoked instance of synchronization logic is configured to at least conditionally induce dependent instances of synchronization logic in not-yet-synched nodally-connected cores, which are cores that are nodally connected to itself for which a synchronized instance of the synchronization logic has not yet been invoked, as part of a composite power state discovery process.

In one embodiment, the core's power management microcode is configured to implement a target power state, without invoking a native instance of its synchronization logic, if the core's target power state is not a restricted power state for which coordination is required with other cores. Otherwise, the power management logic configures the core to implement non-restricted aspects of the target power state or of a subordinate power state, such as local power saving actions on the core, and also invokes a native instance of its synchronization logic to start the composite power state discovery process for the largest domain of cores to which the restricted power state applies. Upon discovery of a composite power state that corresponds with the target restricted power state, the power management microcode of a core authorized to implement the composite power state (typically the master core of the largest affected domain) enables and/or carries out implementation of the composite power state.

In another aspect, the present invention provides a decentralized method of managing power for a multi-core processor such as the processor configured as described above. The method comprises receiving a state transition request on any one of the cores to configure that core ("the native core") in accordance with a target power state. If the target power state is a restricted power state, then power management logic running on the native core invokes a native instance of synchronization logic to initiate a a de-centralized inter-core composite power state discovery process in which the core exchanges power states with other cores. The method further comprises evaluating the discovered power states and responsively conditionally implementing or enabling implementation of the restricted power state.

Each native instance of the synchronization logic induces one or more dependent instances of the synchronization logic on one or more nodally connected cores. These dependent instances in turn are operable to induce additional dependent instances of the synchronization logic to themselves. Each instance of synchronization logic determines at least a compound power state, and recursively induces (unless terminated by a terminating condition, if any) yet further dependent instances of the synchronization logic on not yet-synched nodally distal cores until there are synchronized instances of the synchronization logic on each of the cores of the potentially impacted domain. Upon discovery that the composite power state is equal to the restricted power state, power management logic running on an authorized core enables and/or carries out the implementation.

In yet another aspect, the present invention provides microcode encoded in a computer readable storage medium of a physical core of a multi-core processor comprising the de-centralized inter-core state discovery and power management logic described above.

BRIEF DESCRIPTION OF THE DRAWINGS

FIG. 11, are interrelated with each other in accordance with a deeper hierarchical coordination system.

FIG. 9, are interrelated with each other in accordance with a deeper hierarchical coordination system.

DETAILED DESCRIPTION OF THE INVENTION

Figure 1:
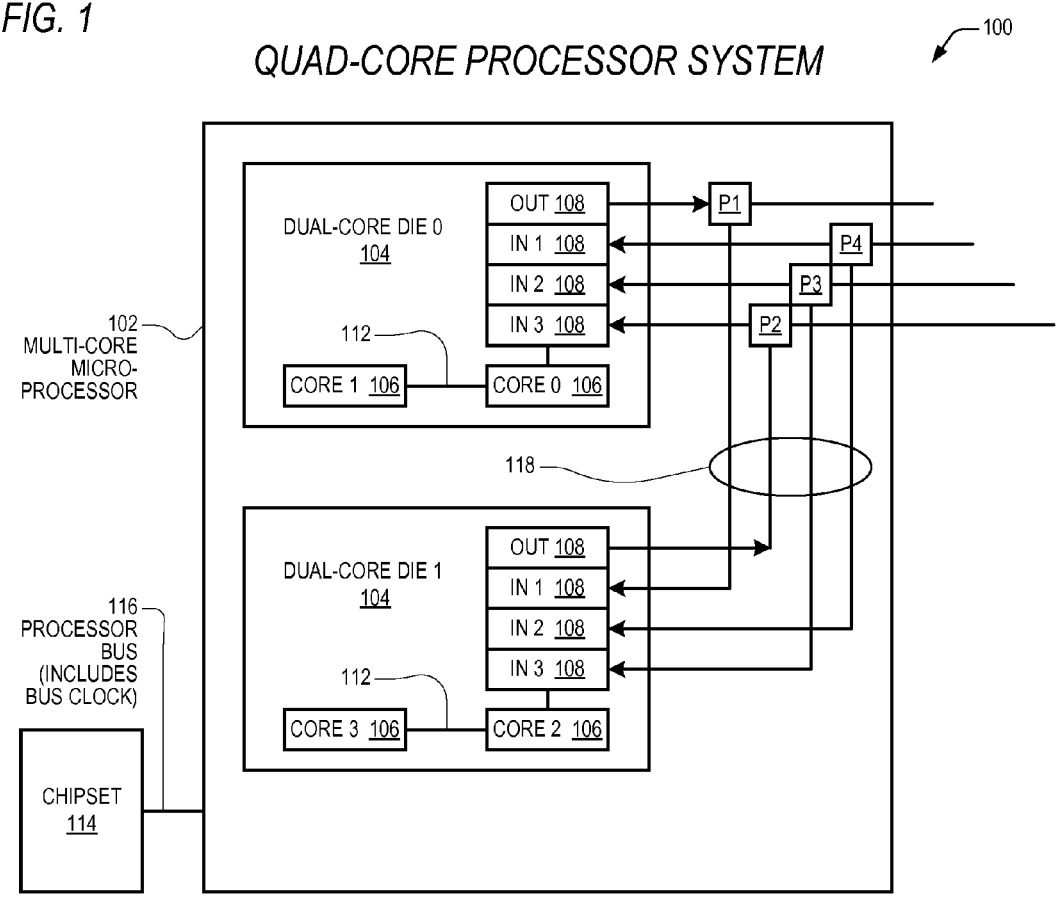
FIG. 1 is a block diagram illustrating one embodiment of a computer system that performs decentralized power management distributed among multiple processing cores of a dual-die quad-core microprocessor.

Described herein are embodiments of systems and methods for coordinating, synchronizing, managing, and implementing power, sleep or operating states on a multi-core processor, using decentralized, distributed logic that is resident and duplicated on each core. Before describing each of the Figures, which represent detailed embodiments, more general applicable concepts of the invention are introduced below.

I. Multi-Layer Multi-Core Processor Concepts

As used herein, a multi-core processor generally refers to a processor comprising a plurality of enabled physical cores that are each configured to fetch, decode, and execute instructions conforming to an instruction set architecture. Generally, the multi-core processor is coupled by a system bus, ultimately shared by all of the cores, to a chipset providing access to peripheral buses to various devices. In some embodiments, the system bus is a front-side bus that is an external interface from the processor to the rest of the computer system. In some embodiments, the chipset also centralizes access to a shared main memory and a shared graphics controller.

The cores of the multi-core processor may be packaged in one or more dies that include multiple cores, as described in the section of Ser. No. 61/426,470, filed Dec. 22, 2010, entitled "Multi-Core Processor Internal Bypass Bus," and its concurrently filed nonprovisional Ser. No. 13/299,014, which are incorporated herein by reference. As set forth therein, a typical die is a piece of semiconductor wafer that has been diced or cut into a single physical entity, and typically has at least one set of physical I/O landing pads. For instance, some dual core dies have two sets of I/O pads, one for each of its cores. Other dual core dies have a single set of I/O pads that are shared between its twin cores. Some quad core dies have two sets of I/O pads, one for each of two sets of twin cores. Multiple configurations are possible.

Furthermore, a multi-core processor may also provide a package that hosts multiple dies. A "package" is a substrate on which dies reside or are mounted. The "package" may provide a single set of pins for connection to a motherboard and associated processor bus. The package's substrate includes wire nets or traces connecting the pads of the dies to shared pins of the package.

Further levels of stratification are possible. For example, an additional layer—described herein as a "platform"—may be provided between multiple packages mounted on that platform and an underlying motherboard. The platform may be, in many ways, like the package described above, comprising a substrate with wire nets or traces connecting the pins of each package and the shared pins of the platform.

Applying the concepts above, in one example, a multi-package processor can be characterized as a platform of N2 packages, having N1 dies per package, and N0 cores per die, where N2, N1, and N0 are each greater than or equal to one, and at least one of N2, N1, and N0 is greater than or equal to two.

II. Inter-Core Communication Structures

As stated above, some disadvantages of the use of off-core, but on-die hardware coordination logic (HCL) to implement restricted activities requiring inter-core coordination includes more complicated, less symmetric, and lower-yielding die designs, as well as scaling challenges. An alternative is to perform all such coordination using the chipset itself, but this potentially requires transactions between each core and the chipset on the system bus in order to communicate applicable values to the chipset. Such coordination also typically requires implementation through system software, such as BIOS, over which the manufacturer may have limited or no control. To overcome the disadvantages of both conventional approaches, some embodiments of the present invention utilize sideband connections between cores of the multi-core processor. These sideband connections are not connected to the physical pins of the package; hence they do not carry signals off of the package; nor do communications exchanged through them require corresponding transactions on the system bus.

For example, as described in Ser. No. 13/299,014, each die may provide a bypass bus between cores of the die. The bypass bus is not connected to the physical pads of the die; hence it does not carry signals off the dual core die. The bypass bus also provides improved quality signals between the cores, and enables the cores to communicate or coordinate with each other without using the system bus. Multiple variations are contemplated. For example, as described in Ser. No. 13/299,014, a quad-core die may provide a bypass bus between two sets of twin cores. Alternatively, as described in one embodiment below, a quad-core die may provide bypass buses between each of two sets of cores of a die and another bypass bus between select cores from the two sets. In another embodiment, a quad-core die may provide inter-core bypass buses between each of the cores, as described below in connection with FIG. 16. And in yet another embodiment, a quad-core die may provide inter-core bypass buses between a first and second core, the second core and a third core, the third and a fourth core, and the first and fourth cores, without providing inter-core bypass buses between the first and third cores or between the second and fourth cores. A similar sideband configuration, albeit between cores distributed on two dual-core dies, is illustrated in the section of Ser. No. 61/426,470, filed Dec. 22, 2010, entitled "Distributed Management of a Shared Power Source to a Multi-Core Microprocessor," and its concurrently filed nonprovisional Ser. No. 13/299,225, which are incorporated herein by reference.

Also, the present invention contemplates sets of inter-core communication wires less extensive than Ser. No. 13/299,014 bypass bus, such as alternative embodiments described in the section of Ser. No. 61/426,470, filed Dec. 22, 2010, entitled "Reticle Set Modification to Produce Multi-Core Dies," and its concurrently filed nonprovisional Ser. No. 13/299,171, which are incorporated herein by reference. One example of a less extensive set of inter-core communication wires is illustrated in Ser. No. 13/299,225, which is herein incorporated by reference. Sets of inter-core communication wires may be as small, in number of included wires, as necessary to enable coordination activities as described herein. Inter-core communication wires may also be configured, and interfaced between cores, in a manner similar to inter-die communication lines described further below.

Furthermore, a package may provide inter-die communication lines between dies of a package, and a platform may provide inter-package communication lines between packages of the platform. As will be explained more fully below, implementations of inter-die communication lines may require at least one additional physical output pad on each die. Likewise, implementations of inter-package communication lines may require at least one additional physical output pad on each package. And, as explained further below, some implementations provide additional output pads, beyond a minimally sufficient number of output pads, to enable greater flexibility in coordinating cores. For any of these various possible inter-core communication implementations, it is preferred that they require no active logic outside of any of the cores. As such, implementations of various embodiments of the present invention are expected to provide certain advantages, as made apparent herein, over implementations that use an off-core HCL or other active off-core logic to coordinate cores.

III. Hierarchical Concepts

To reiterate, the present invention describes, but is not—unless otherwise specified—limited to, several embodiments of multi-core multiprocessors that provide sideband communication wires and that use such wires in preference over the system bus to coordinate cores in order to implement or enable implementation of certain structured or restricted activities. In many of these embodiments, these physical implementations are used in conjunction with hierarchical coordination systems to carry out the desired hardware coordination. Some of the hierarchical coordination systems described herein are very complex. For example, FIGS. 1, 9, 11, 12, 14, 15, 16, 18, 19, 20, 21, and 22 depict embodiments of multi-core processors with various hierarchical coordination systems that structure and facilitate inter-core coordination activities such as power-state management. This specification also provides several progressively more abstract characterizations of hierarchical coordination systems, as well as examples of even more elaborate and complex hierarchical coordination systems. Therefore, before going into highly specific examples of inter-core coordination processes used to enable implementation of a structure or restricted activity, it is helpful to explain various aspects of various hierarchical coordination systems that are contemplated herein.

As used herein, a hierarchical coordination system refers to one in which the cores are configured to coordinate with each other in an at least partially restricted or structured hierarchical manner for some pertinent or predefined activity or purpose. This is distinguished herein from an equipotent peer-to-peer coordination system in which each core is equally privileged and can directly coordinate with any other core (and with the chipset) to perform a pertinent activity. For example, a nodal tree structure in which the cores coordinate, for certain restricted activities, solely with superiorly-ranked or inferiorly-ranked nodally connected cores, and for which there is only a single path between any two nodes, would constitute a strictly hierarchical coordination system. As used herein, a hierarchical coordination system, unless more strictly defined, also encompasses coordination systems that are more loosely hierarchical, such as a system that permits peer-to-peer coordination within at least one group of cores but requires hierarchical coordination between at least two of the core groups. Examples of both strictly and loosely hierarchical coordination systems are presented herein.

In one embodiment, a hierarchical coordination system is provided that corresponds to an arrangement of cores in a microprocessor having a plurality of packages, each package having a plurality of dies, and each die having a plurality of cores. It is useful to characterize each layer as a "domain." For example, a dual-core die may be characterized as a domain consisting of its cores, a dual-die package may be characterized as a domain consisting of its dies, and a dual-package platform or microprocessor may be characterized as a domain consisting of its packages. It is also useful to describe the core itself as a domain. This conceptualization of "domains" is also useful in referring to a resource, such as a cache, a voltage source, or a clock source, that is shared by cores of a domain but that is otherwise local to that domain (i.e., not shared by cores outside of that domain). Of course, the domain depth and number of constituents per domain (e.g., where a die is a domain, the package is a domain, and so on) applicable to any given multi-core processor can vary and be scaled up or down depending on the number of cores, their stratification, and the manner in which various resources are shared by the cores.

It is also useful to name different types of relationships between domains. As used herein, all of the enabled physical cores on a multi-core die are considered "constituents" of that die and "co-constituents" of each other. Likewise, all of the enabled physical dies on a multi-die package are considered constituents of that package and co-constituents of each other. Also likewise, all of the enabled physical packages on a multi-package processor would be considered constituents of that processor and co-constituents of each other. Again, this representation may be extended to as many levels of domain depth as is provided with the multi-core processor. In general, each non-terminal domain level is defined by one or more constituents, each of which comprises the next lower domain level of the hierarchical structure.

In some multi-core processor embodiments, for each multi-core domain (e.g., for each die, for each package, for each platform, and so on), one and only one core thereof is designated as, and provided with a corresponding functional gate-keeping or coordination role of, a "master" for that domain. For example, a single core of each multi-core die, if any, is designated as a "die master" of that die, a single core of each package is designated a "package master" (PM) of that package, and (for a processor so stratified) a single core of each platform is designated as "platform master" for that platform, and so on. Generally, the master core of the highest domain of the hierarchy serves as the sole "bus service processor" (BSP) core for the multi-core processor, wherein only the BSP is authorized to coordinate certain types of activities with the chipset. It is noted that terms such as "master" are employed herein for convenience, and that labels other than "master"—for example, "delegate"—could be applied to describe such functional roles.

Further relationships are defined between each domain master core and the cores with which it is enabled, for the predefined purposes or activities for which it is so designated, to directly coordinate. At the lowest domain level (e.g., a die), the die master core of a multi-core die may be characterized as a "pal" to each of the enabled non-master cores of that die. Generally, each of the cores of a die is characterized as a pal to any of the other cores of the same die. But in an alternative characterization, the pal designation is restricted to subordinate relationships between die master core and the other cores of a multi-core die. Applying this alternative characterization to a four-core die, the die master core would have three pals, but each of the other cores would be considered as having only a single pal—the die master core.

At the next domain level (e.g., a package), the PM core of a package may be characterized as a "buddy" to each of the other master cores on the same package. Generally, each of the die master cores of a package is characterized as a buddy to each other die master core of the same package. But in an alternative characterization, the buddy designation is restricted to subordinate relationships between a package master core and other master cores of that package. Applying this alternative characterization to a four-die package, the PM core would have three pals, but each of the other die master cores would be considered as having only a single pal—the PM core. In yet another alternative characterization (such as that set forth in FIG. 11), a master core is characterized as a "buddy" to each of the other master cores in the processor, including master cores on a different package of the processor.

At the next domain level (e.g., the platform of a multi-core processor having such depth), the BSP (or platform master) core is characterized as a "chum" to each of the other PM cores of the platform. Generally, each of the PM cores is related as a chum to each other PM core of the same platform. But in an alternative characterization, the chum designation is restricted to subordinate relationships between a BSP package master core and other PM cores of a platform. Applying this alternative characterization to a four-package platform, the BSP core would have three pals, but each of the other PM cores would be considered as having only a single pal—the BSP.

The pal/buddy/chum relationships described above are more generally characterized herein as "kinship" relationships. Each "pal" core belongs to one kinship group, each "buddy" core belongs to a higher-level kinship group, and each "chum" core belongs to a yet higher-level kinship group. In other words, the various domains of the hierarchical coordination system described above define corresponding "kinship" groups (e.g., one or more groups of pals, groups of buddies, and groups of chums). Moreover, each "pal," "buddy," and "chum" core, if any, of a particular core can be more generally characterized as a "kin" core.

As used herein, the concept of a kinship group is slightly distinct from the concept of a domain. As described above, a domain consists of all of the cores in its domain. For example, a package domain generally consists of all of the cores on the package. A kinship group, by contrast, generally consists of select constituent cores of the corresponding domain. A package domain, for instance, would generally define a corresponding kinship group consisting only of the master cores (one of which is also a package master core), but not any of the pal cores, on the package. Generally, only terminal multi-core domains—i.e., domains that have no constituent domains—would define a corresponding kinship group that included all of its cores. For example, a dual-core die would generally define a terminal multi-core domain with a corresponding kinship group that included both of the die's cores. It will be noted that it is also convenient to describe each core as defining its own domain, as each core generally includes resources local to itself, and not shared by other cores, that may be configured by various operating states.

It will be appreciated that in the pal/buddy/chum hierarchy described above, each core that is not a master core is merely a pal, and belongs to a single kinship group consisting only of cores on the same die. Every die master core belongs, first, to the lowest level kinship group consisting of pal cores on the same die and, secondly, to a kinship group consisting of buddy cores on the same package. Every package master core belongs, first, to a lowest level kinship group consisting of pal cores on the same die, secondly, to a kinship group consisting of buddy cores on the same package, and thirdly, to a kinship group consisting of chum cores on the same platform. In short, each core belongs to W kinship groups, where W equals the number of kinship groups for which that core is a master core, plus 1.

To further characterize of the hierarchical nature of the kinship groups, the "closest" or "most immediate" kinship group of any given core corresponds to the lowest-level multi-core domain of which that core is a part. In one example, no matter how many master designations a particular core has, its most immediate kinship group comprises its pal(s) on the same die. A master core would also have a second closest kinship group comprising the core's buddy or buddies on the same package. A package master core would also have a third closest kinship group comprising the core's chum(s).

It is notable that the kinship groups described above will be semi-exclusive for a multi-level multi-core processor (wherein at least two levels Nx have multiple constituents). That is, for such processors, no given kinship group will include all of the cores of that processor.

The kinship group concept described above can be characterized even further by different coordination models a kinship group may employ between its constituent cores. As used herein, in a "master-mediated" kinship group, direct coordination between cores is restricted to coordination between the master core and its non-master cores. Non-master cores within the kinship group cannot directly coordinate with each other, but only indirectly through the master core. In a "peer-collaborative" kinship group, by contrast, any two cores of the kinship group may directly coordinate with each other, without the master core's mediation. In a peer-collaborative kinship group, a more functionally consistent term for the master would be a "delegate," because it acts as a coordination gatekeeper only for coordinations with higher level domains, not for coordinations between the kinship group's peers. It should be noted that the distinction defined herein between a "master-mediated" and "peer-collaborative" kinship group is only meaningful for kinship groups having three or more cores. Generally, for certain predefined activities, any given core can only coordinate with constituents or co-constituents of its kinship groups, and, with respect to any master-mediated kinship group of which it is a part, only with its superior "co-constituent" or inferior constituents, as applicable.

It is also convenient to describe the hierarchical coordination systems above in terms of nodes and nodal connections of a nodal hierarchy. As used herein, a nodal hierarchy is one in which each node is a unique one of the cores of the multi-core processor, one of the cores (e.g., the BSP core) is the root node, and there is an unbroken coordination "path" (including intermediate nodes, if applicable) between any two nodes. Each node is "nodally connected" to at least one other node, but not all of the other nodes, and can only coordinate, for purposes of activities to which the coordination system applies, with "nodally connected" cores. To further differentiate these nodal connections, a master core's subordinate nodally connected cores are described herein as "constituent" cores and alternatively as "subordinate kin" cores, which are distinguished from a core's nodally connected "co-constituent cores," which are nodally connected cores that are not subordinate to itself. Further clarifying, a core's nodally connected "co-constituent" cores consist of its master core, if any, and any equally ranked cores to which it is nodally connected (e.g., in a peer-coordinated kinship group of which the core is a part). Also, any cores that have no subordinate kin cores are also referred to herein as "terminal" nodes or "terminal" cores.

Figure 22:
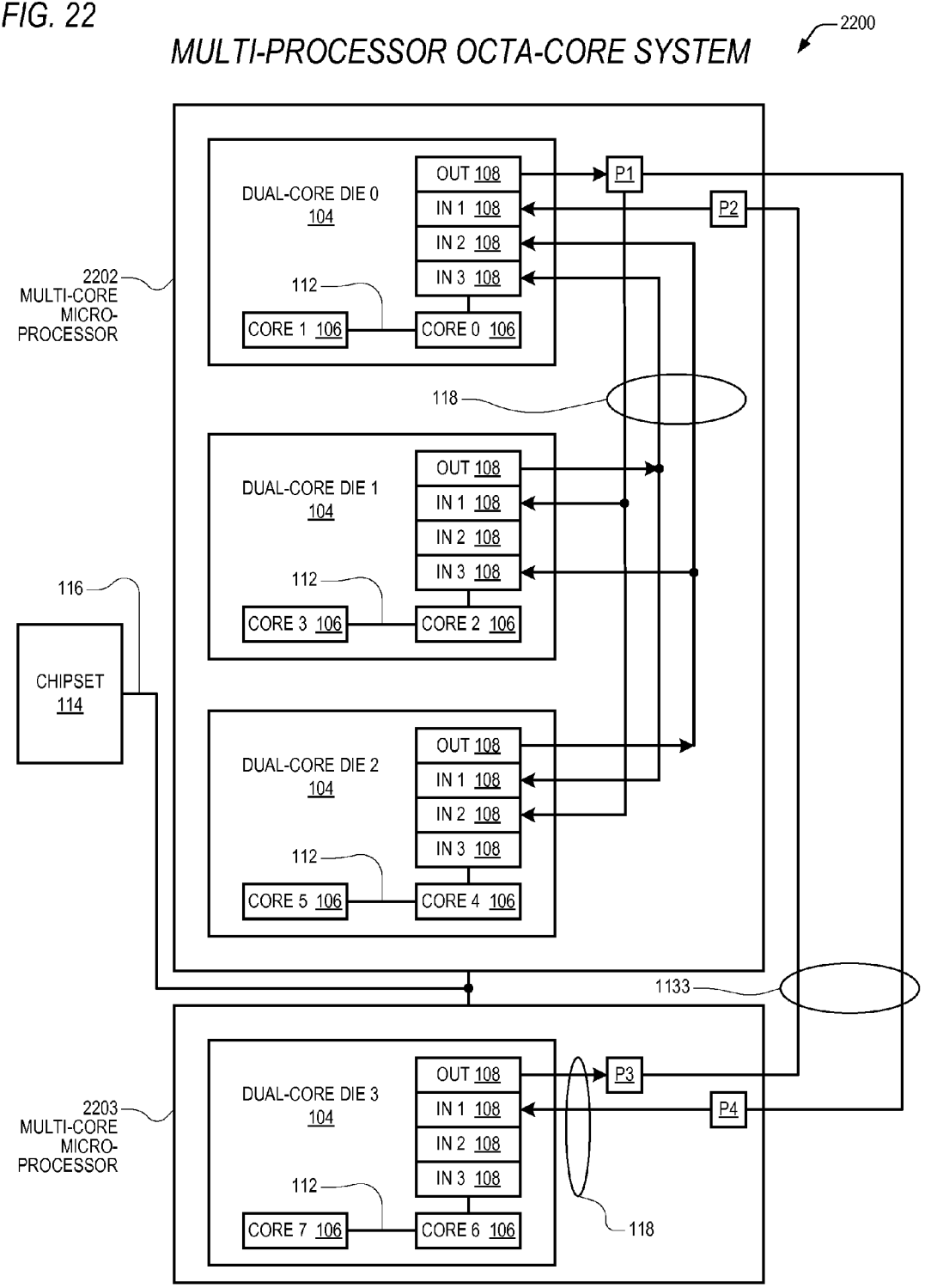
FIG. 22 is a block diagram illustrating yet another embodiment of a computer system that performs decentralized power management distributed among the cores of an octa-core microprocessor similar to that of FIG. 21, but having a deeper hierarchical coordination system.

Up until this point, hierarchical coordination systems have been described, for purposes of clarity, in which the domains correspond to a physically distinct nested arrangements of cores (e.g., a distinct domain corresponds to each applicable core, die, package, and platform). FIGS. 1, 9, 12, 16, and 22, for example, all illustrate hierarchical coordination systems that correspond with the physically distinct nested packages of cores illustrated in the processor. FIG. 22 is an interesting consistent example. It illustrates an octacore processor 2202 with asymmetric packages, one of which has three dual-core dies and the other of which has a single-core die. Nevertheless, consistent with the physically distinct nested manner in which the cores are packaged, sideband wires are provided that define a corresponding three-level hierarchical coordination system, with package masters related as chums, die masters related as buddies, and die cores related as pals.

Figure 11:
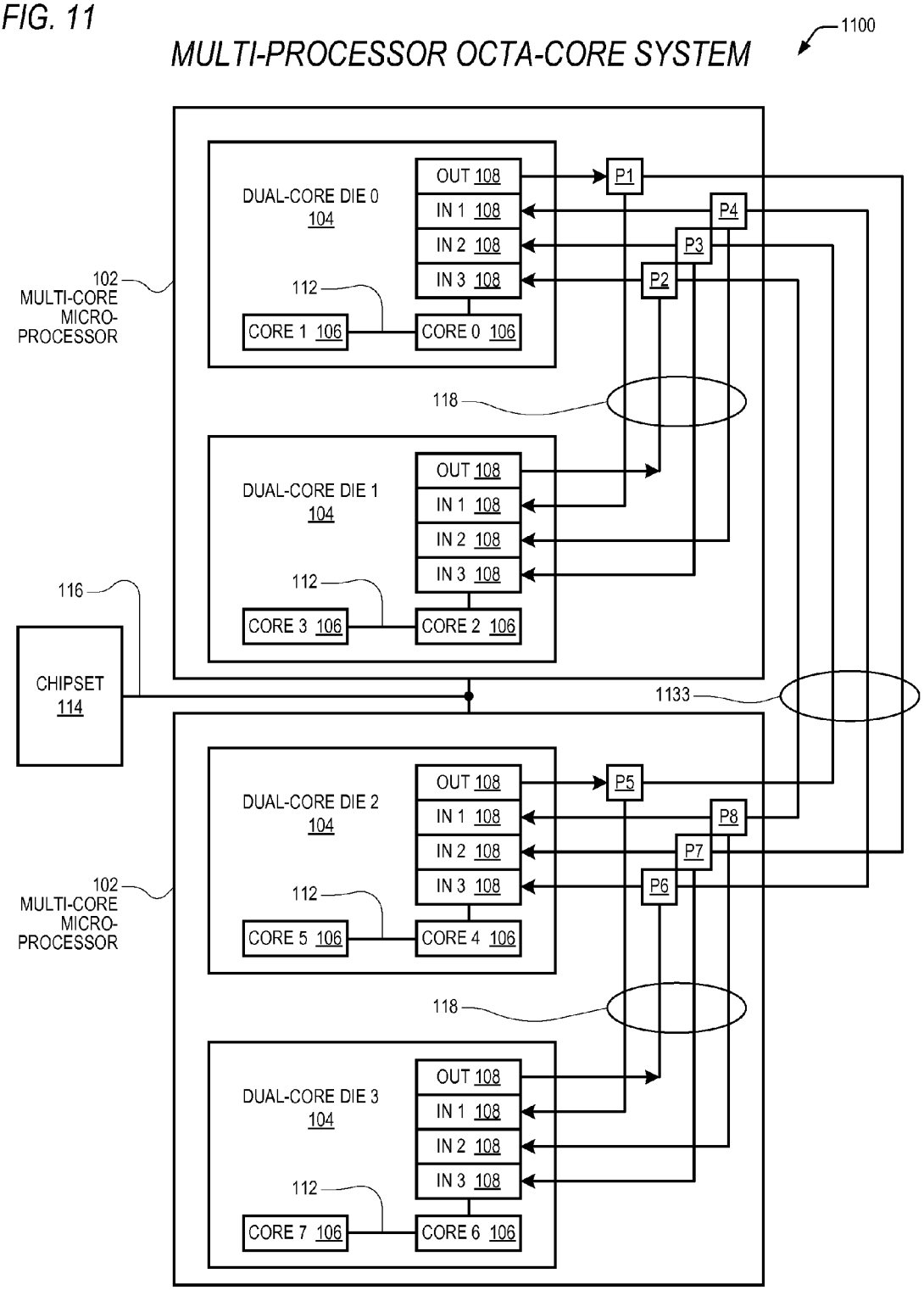
FIG. 11 is a block diagram illustrating another embodiment of a computer system that performs decentralized power management distributed among multiple processing cores of an octa-core microprocessor having four dual-core dies, distributed on two packages, using FIG. 10's power-state synchronization routine.
Figure 14:
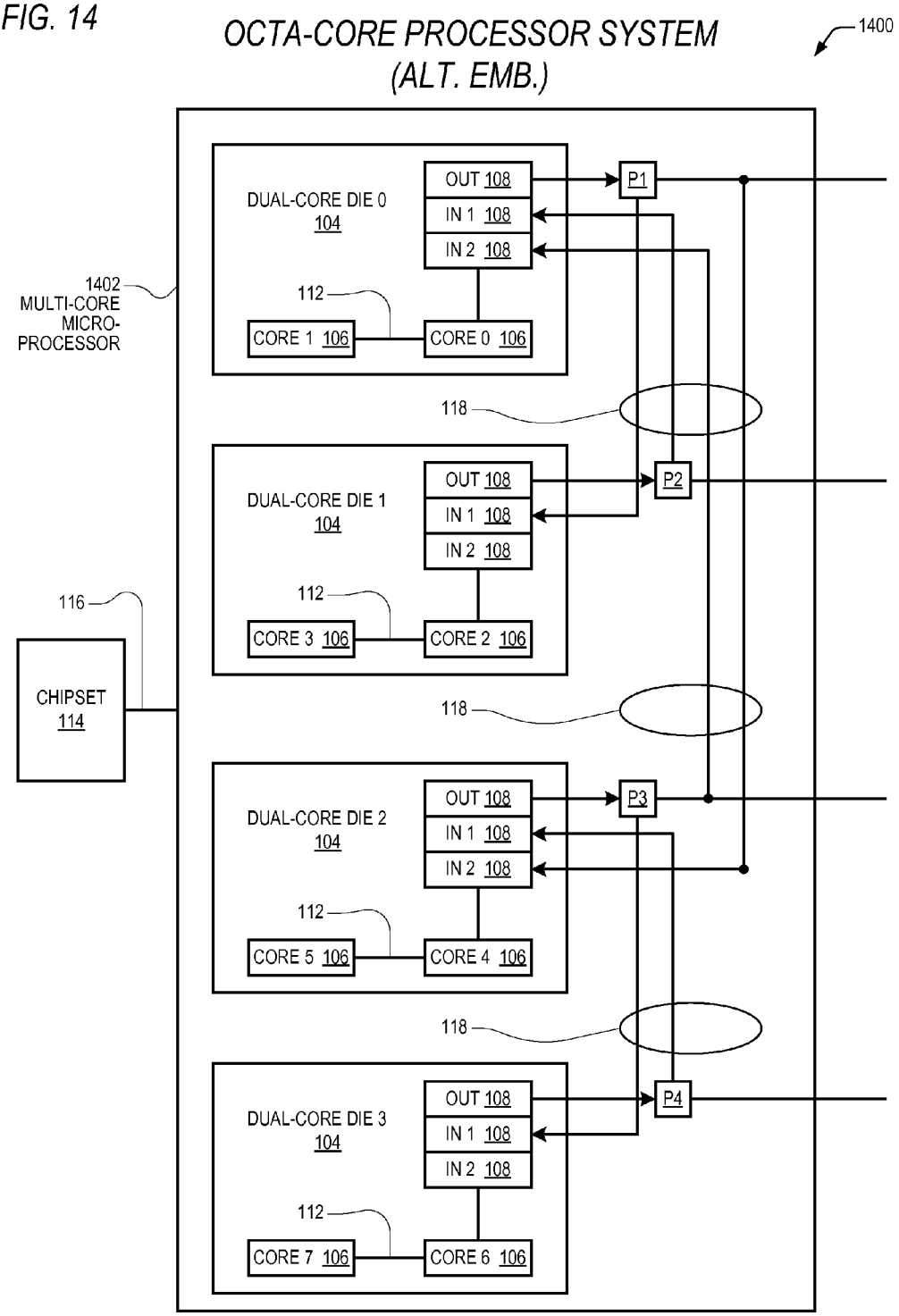
FIG. 14 is a block diagram illustrating another embodiment of a computer system that performs decentralized power management distributed among multiple processing cores of an octa-core microprocessor that, like FIG. 9, has four dual-core dies on a single package, but whose cores, unlike
Figure 15:
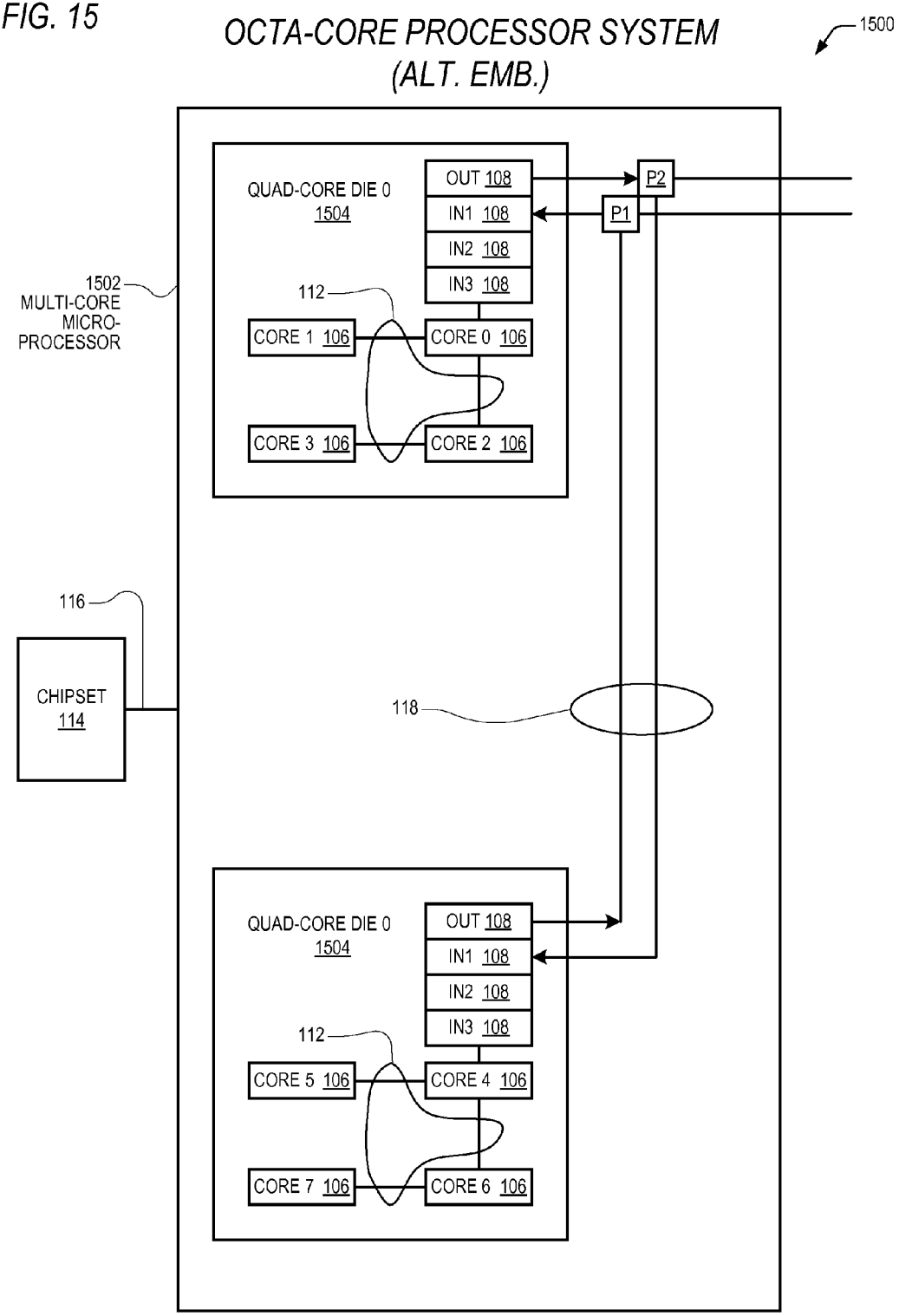
FIG. 15 is a block diagram illustrating another embodiment of a computer system that performs decentralized power management distributed among multiple processing cores of an octa-core microprocessor has two quad-core dies on a single package.
Figure 21:
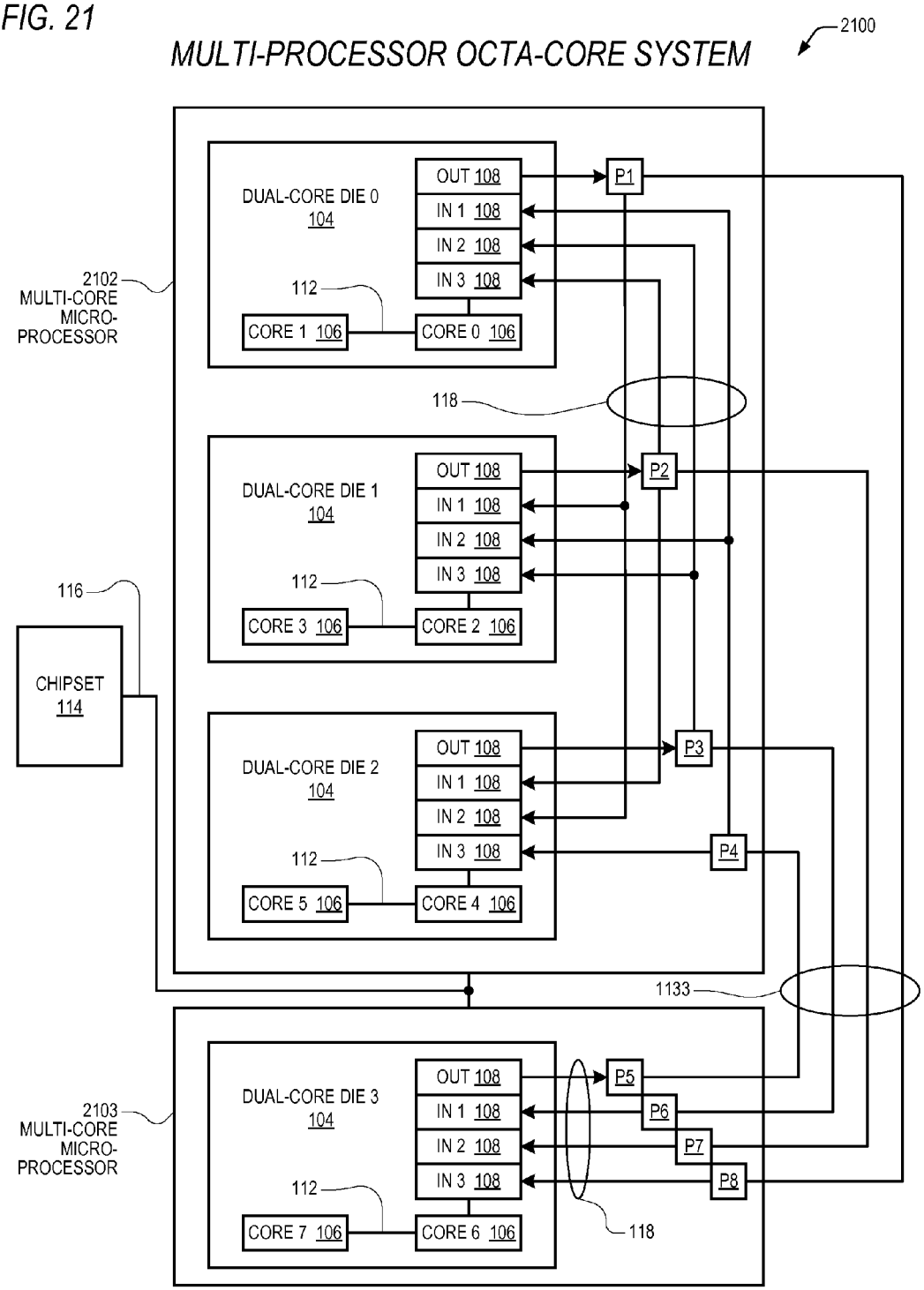
FIG. 21 is a block diagram illustrating yet another embodiment of a computer system that performs decentralized power management distributed among the cores of an octa-core microprocessor having two packages, one of which has three dual-core dies, and the other of which has a single dual-core die.

But, depending on the configuration of the inter-core, inter-die, and inter-package sideband wires, if any, of a processor, hierarchical coordination systems between cores may be established that have a different depth and stratification than the nested physical arrangements in the processor's cores are packaged. Several such examples are provided in FIGS. 11, 14, 15, and 21. FIG. 11 illustrates an octa-core processor having two packages, with two dies per package, and two cores per die. In FIG. 11, sideband wires facilitating a two-level hierarchical coordination system are provided, so that all of the master cores may be part of the highest-level kinship group, and each master core also belongs to a distinct lowest-level kinship group comprising itself and its pals. FIG. 14 illustrates an octa-core processor having four dual-core dies on a single package. In FIG. 14, sideband wires requiring a three-level hierarchical coordination system of pals, buddies, and chums are provided. FIG. 15 illustrates a processor with two quad-core dies where inter-core wires within each die require a two-level hierarchical coordination system between them, and inter-die wires providing a third hierarchical level of coordination are provided between the masters (i.e., chums) of each die. FIG. 21 illustrates another octacore processor that, like FIG. 22, has two asymmetric packages, one of which has three dual core dies and the other of which has a single dual core die. But, like FIG. 11, inter-die and inter-package sideband wires are provided that facilitate a two-level hierarchical coordination system between the cores, will all of the master cores on both packages being part of the same kinship group.

Figure 16:
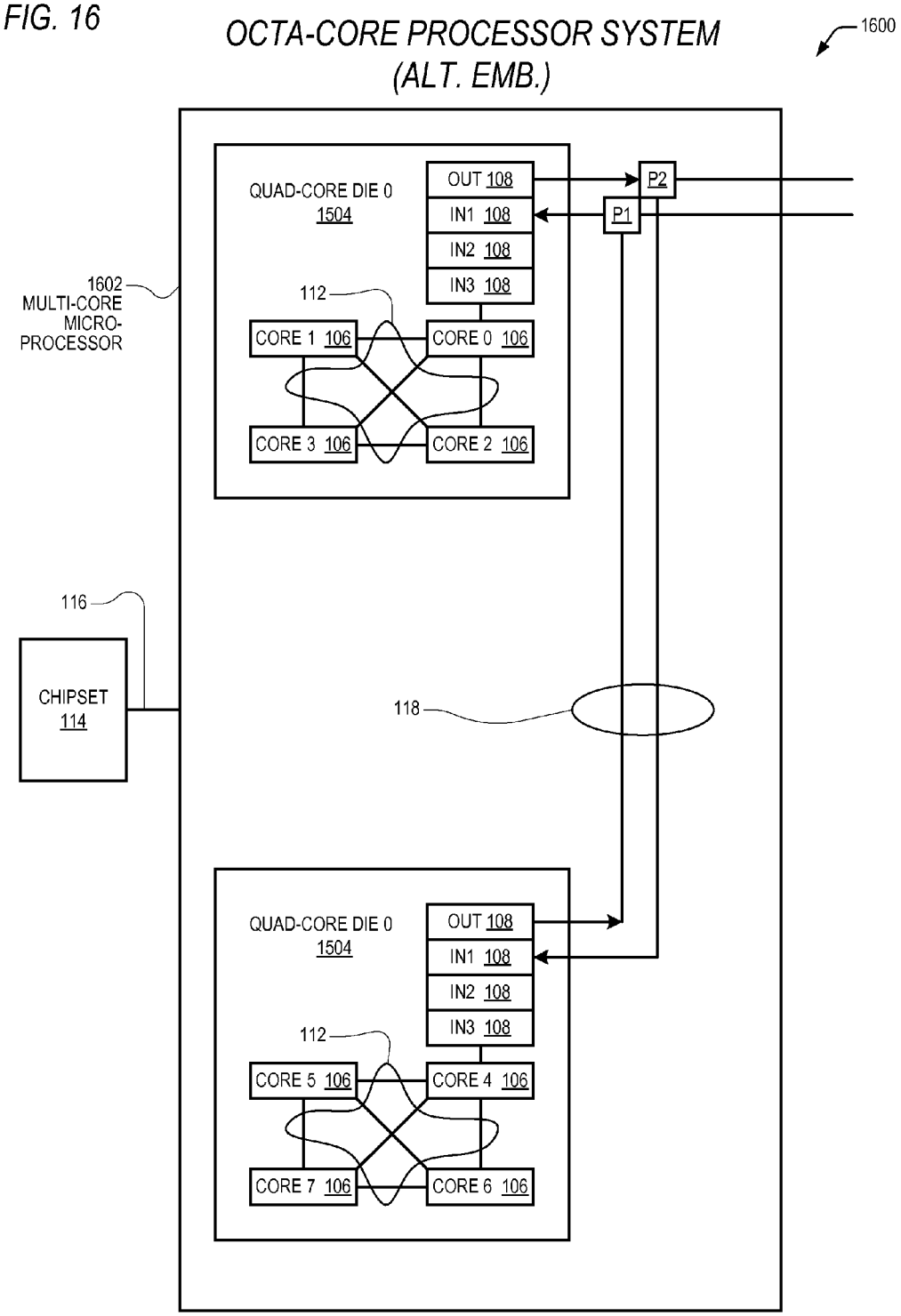
FIG. 16 is a block diagram illustrating yet another embodiment of a computer system that performs decentralized power management distributed among multiple processing cores of an octa-core microprocessor.
Figure 17A:
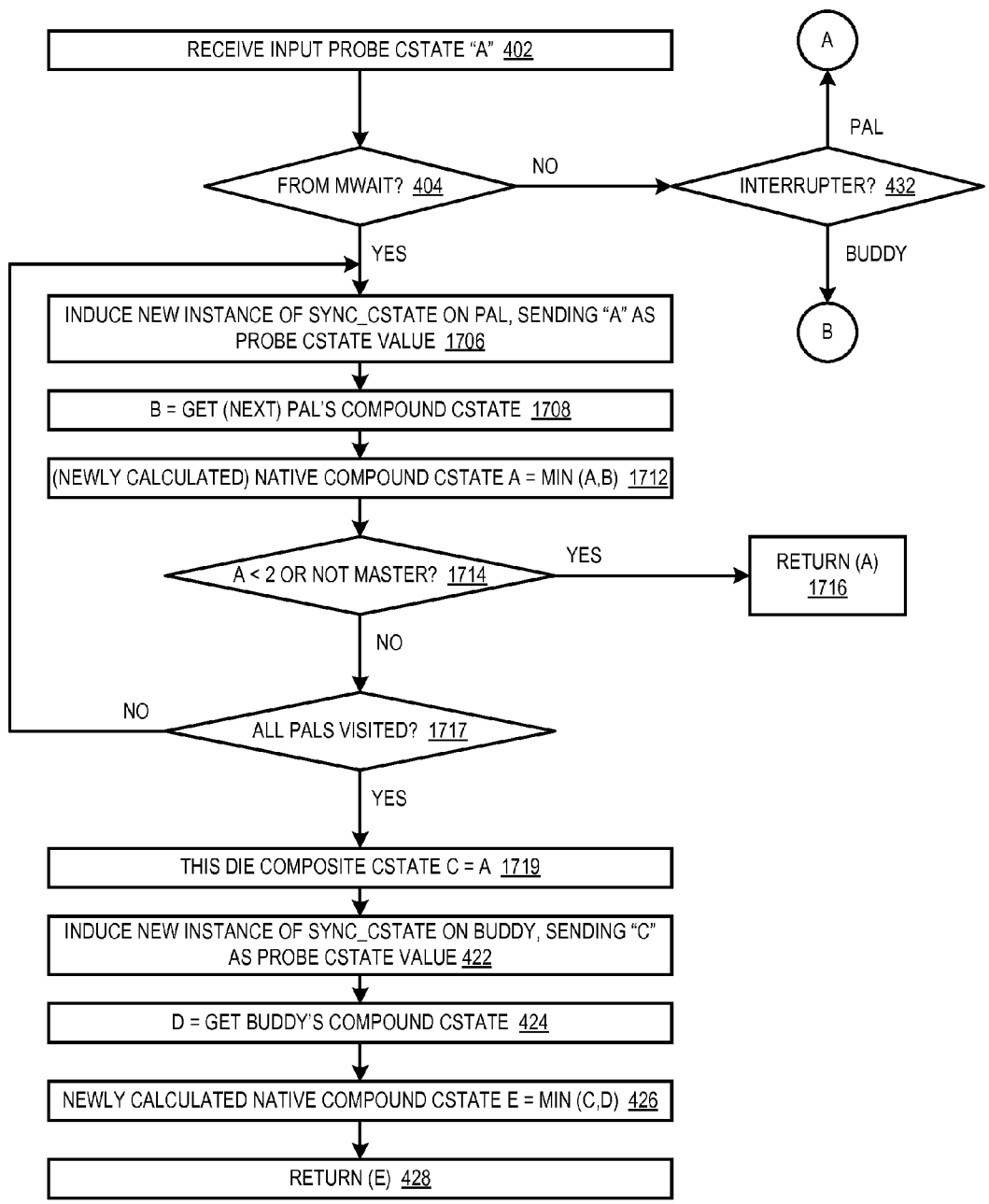
FIGS. 17A-17C is a flowchart illustrating operation, by a core, of one embodiment of a power-state synchronization routine integral to a composite power state discovery process of the system of FIG. 16.
Figure 17B:
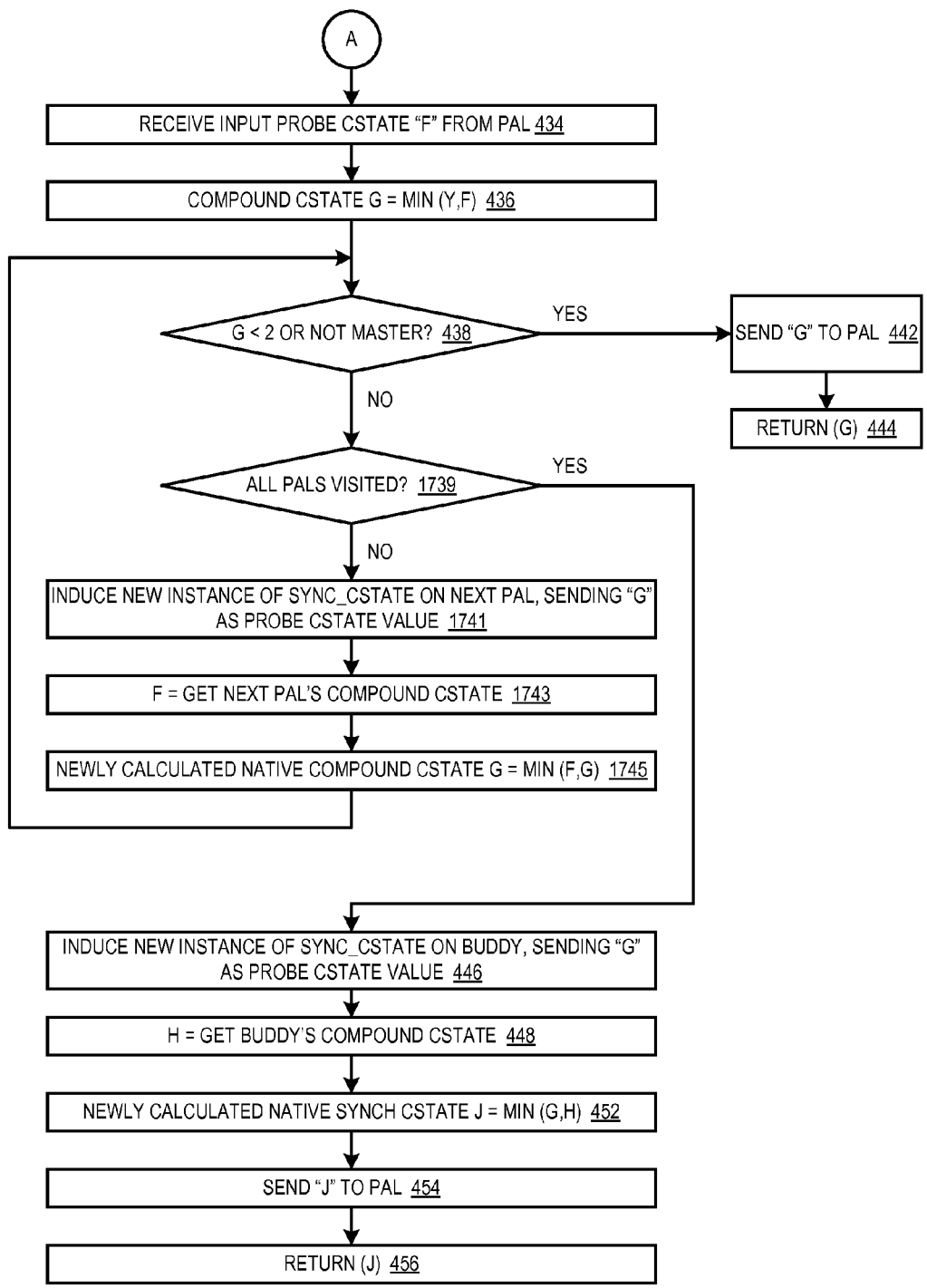
Figure 17C:
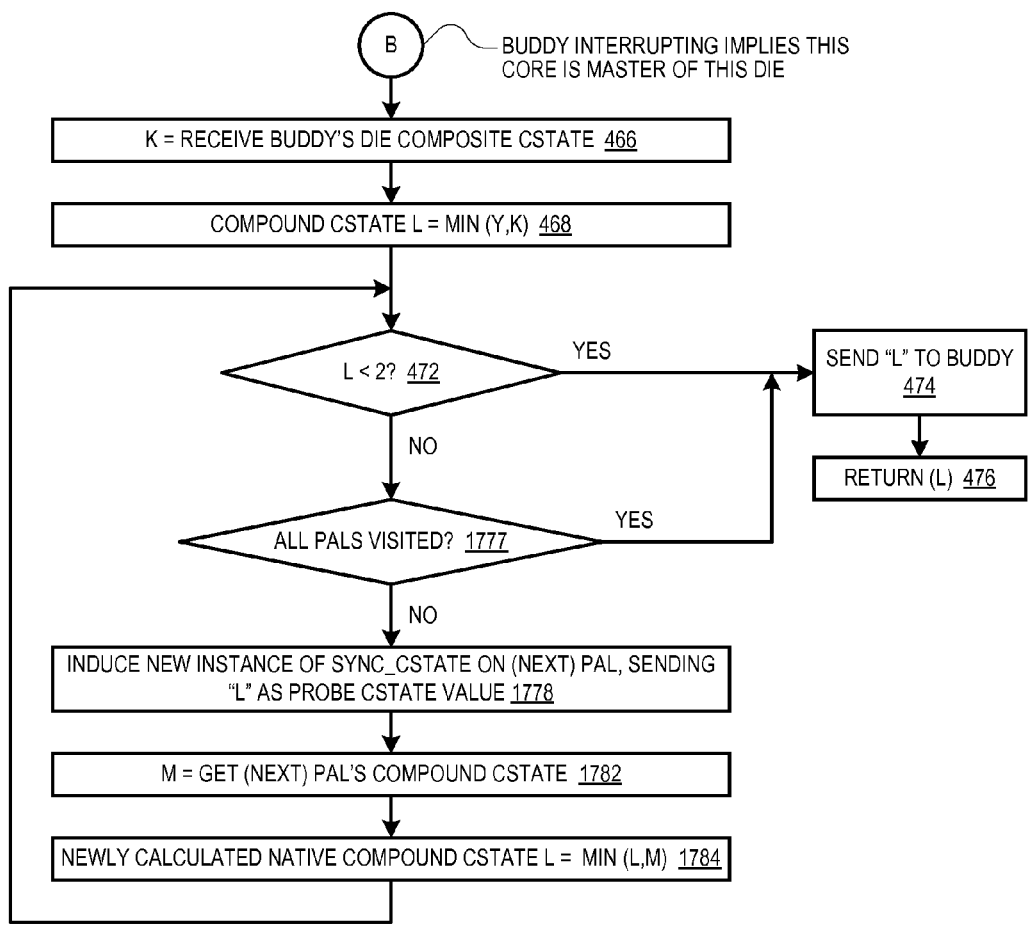

As explained above, hierarchical coordination systems of different depths and coordination models can be applied as desired or as applicable to the distribution of shared resources provided for a multi-core processor, provided it is consistent with the structural capabilities and constraints of the multi-core processor. To further illustrate, FIG. 16 shows a processor that provides sufficient sideband communication wires to facilitate a peer-collaborative coordination model between all of the cores of each quad-core die. In FIG. 17, however, a more-restrictive, master-mediated coordination model is established for the cores of each quad-core die. Moreover, as illustrated in FIG. 15, a multi-level coordination hierarchy, with two pal kinship groups and one master kinship group, could also, if desired, be established for the cores of FIG. 16's quad-core microprocessor, simply by using less (for purposes of activities to which the coordination system applies) than all of the available inter-core wires. Because each quad-core die in FIG. 16 provides sideband wires between each of its cores, the die is capable of facilitating all three types of hierarchical coordination systems.

Generally, regardless of the nature and number of domains, kinship groups, and nodes of a multi-core processor, one and only one of the cores of each domain and each corresponding kinship group will be designated as the master of that domain and corresponding kinship group. Domains may have constituent domains, and again, one and only of the cores of each domain and corresponding kinship group will be designated as the master of that domain. The highest ranking core of the coordination system is also referred to as a "root node."

IV. Power State Management

Having introduced various concepts related to multi-core configurations, sideband communication capabilities, and hierarchical relationships, this specification now introduces some concepts related to specific contemplated embodiments of power state management systems. It should be appreciated, however, that the present invention is applicable to coordination of a wide variety of activities besides power state management.

In the distributed multi-core power management embodiments described herein, each core of the multi-core processor includes decentralized and distributed scalable power management logic, duplicated in one or more microcode routines resident on each core. The power management logic is operable to receive a target power state, ascertain whether it is a restricted power state, initiate a composite power state discovery process that includes inter-core coordination, and respond appropriately.

Generally, a target state is any requested or desired one of a class of predefined operating states (such as C-states, P-states, voltage ID (VID) value, or clock ratio value). Generally, a predefined group of operating states defines comprises a plurality of processor operating states orderable on the basis of one or more power, voltage, frequency, performance, operating, responsiveness, shared resource, or restricted implementation characteristics. The operating states may be provided to optimally manage power, relative to other desired operating characteristics, of a processor.

In one embodiment, the predefined operating states include an active operating state (such as the C0 state) and a plurality of progressively less active or responsive states (such as the C1, C2, C3, etc. states). As used herein, a progressively less responsive or active state refers to a configuration or operating state that saves power, relative to a more active or responsive state, or is somehow relatively less responsive (e.g., slower, less fully enabled, subject to some kind of impediment such as accessing resources such as cache memories, or sleepier and harder to wake up). In some embodiments, the predefined operating states constitute, but are not necessarily limited to, C-states or sleep states based on, derived from, or compliant with the ACPI specification. In other embodiments, predefined operating states constitute, or include, various voltage and frequency states (e.g., progressively lower voltage and/or lower frequency states), or both. Further, a set of predefined operating states may comprise or include various programmable operating configurations, such as forcing instructions to be executed in program order, forcing only one instruction to be issued per clock cycle, formatting only a single instruction per clock cycle, translating only a single microinstruction per clock cycle, retiring only a single instruction per clock cycle, and/or accessing various cache memories in a serial fashion, using techniques such as those described in U.S. Ser. No. 61/469,515, filed Mar. 30, 2011, entitled "Running State Power Saving Via Reduced Instructions Per Clock Operation", which is herein incorporated by reference.

It will be understood that a microprocessor may be configurable in accordance with different, and independent or partially independent, predefined sets of operating states. Various operating configurations that affect power consumption, performance, and/or responsiveness, can be assigned to different classes of power states, each class of which may be implemented independently in accordance with a corresponding hierarchical coordination system, each having its own independently defined domains, domain masters, and kinship group coordination models.

Generally, a class of predefined operating states can be broken up into at least two categories: (1) predominantly local operating states that affect only resources local to the core or that, with respect to common practical applications, predominately only affect the performance of the specific core, and (2) restricted operating states that impact one or more resources shared by other cores or that, with respect to common practical applications, are relatively more likely to interfere with the performance of other cores. Operating states that impact shared resources are associated with a relatively greater probability of interfering with the power, performance, efficiency, or responsiveness of other cores sharing that resource. Implementation of predominantly local operating states generally does not merit coordination with, or prior permission from, other cores. Implementation of restricted operating states, by contrast, merits coordination with, and readiness by, other cores.

In more advanced embodiments, predefined operating states can be broken up into more hierarchical categories, depending on how and the extent to which various resources are shared. For instance, a first set of operating states may define configurations of resources local to a core, a second set of one operating states may define configurations of resources shared by cores of a die but that are otherwise local to that die, a third set of operating states may define configurations of resources shared by cores of a package, and so on. Implementation of an operating state merits coordination with, and readiness by, the all other cores sharing a resource configured by the applicable operating state.

Generally, a composite operating state, for any given domain, is an extremum (i.e., maximum or minimum) of the applicable operating state of each enabled physical core belonging to that domain. In one embodiment, a physical core's applicable operating state is the core's most recent and still valid target or requested operating state, if any, or, if the core does not have a most recent valid target or requested operating state, some default value. The default value may be zero (e.g., where the composite operating state is calculated as a minimum), the maximum of the predefined operating states (e.g., where the composite operating state is calculated as a maximum), or the core's currently implemented operating state. In one example, a core's applicable operating state is a power or operating state, such as a voltage ID (VID) or clock ratio value, desired or requested by the core. In another example, a core's applicable operating state is the most recent valid C-state the core has received from applicable system software.

In another embodiment, a physical core's applicable operating state is an extremum of the core's most recent and still valid target or requested operating state, if any, and the most extreme operating state that would affect resources local to the highest domain, if any, for which the core has master credentials.

Accordingly, the composite operating state for the processor as a whole would be the maximum or minimum of the applicable power states of all of the enabled physical cores of that processor. A composite power state of a package would be the maximum or minimum of the applicable power states of all of the enabled physical cores of that package. A composite power state of a die would be the maximum or minimum of the applicable power states of all of the enabled physical cores of that die.

In the decentralized power state management embodiments described herein, a portion or routine of each core's power management logic is synchronization logic that is configured, at least conditionally, to exchange power state information with other nodally connected cores (i.e., other cores of a common kinship group) to determine a compound power state. A compound power state is an extremum of at least the applicable power states of the cores corresponding to the native and at least one nodally-linked instance of the synchronization logic. Under some but not necessarily all circumstances, a compound power state calculated and returned by a synchronization routine will correspond exactly to a composite power state for an applicable domain.

Each invoked instance of synchronization logic is configured to at least conditionally induce dependent instances of synchronization logic in not-yet-synched nodally-connected cores, starting with nodally-connected cores of the most immediate kinship group and proceeding to nodally-connected cores of progressively higher-level kinship groups, if any, to which the core on which the instance of synchronization logic belongs. Not-yet synched nodally connected cores are cores that are nodally connected to itself for which a synchronized instance of the synchronization logic has not yet been invoked, as part of a composite power state discovery process.

This discovery process progresses with each instance of synchronization logic recursively inducing (at least conditionally) yet further dependent instances of the synchronization logic on not yet-synched nodally distal cores until there are synchronized instances of the synchronization logic running on each of the cores of the applicable potentially impacted domain. Upon discovery of a composite power state for the applicable domain, an instance of power management logic running on a core, designated as being authorized to enable or carry out implementation of the composite power state for that domain, enables and/or carries out the implementation.

V. Specific Illustrated Embodiments

Attention is now turned to the specific embodiments illustrated in the Figures.

In one embodiment, each instance of synchronization logic communicates with synchronized instances of the logic on other cores via sideband communication or bypass bus wires (the inter-core communication wires 112, inter-die communication wires 118, and inter-package communication wires 1133), which are distinct from the system bus, to perform the power management in a decentralized, distributed fashion. This allows the cores to be physically located on multiple dies or even on multiple packages, thereby potentially reducing die size and improving yields and providing a high degree of scalability of the number of cores in the system without putting undue pressure on the pad and pin limitations of modern microprocessor dies and packages.

Referring now to FIG. 1, a block diagram illustrating an embodiment of a computer system 100 that performs decentralized power management distributed among multiple processing cores 106 of a multi-core microprocessor 102 according to the present invention is shown. The system 100 includes a single chipset 114 coupled to the multi-core microprocessor 102 by a system bus 116. The multi-core microprocessor 102 package includes two dual-core dies 104, denoted die 0 and die 1. The dies 104 are mounted on a substrate of the package. The substrate includes wire nets (or simply "wires"), or traces, which connect pads of the dies 104 to pins of the package 102. The pins may be connected to the bus 116, among other things. The substrate wires also include inter-die communication wires 118 (discussed more below) that interconnect the dies 104 to facilitate communication between them to perform the decentralized power management distributed among the cores 106 of the multi-core microprocessor 102.

Each of the dual-core dies 104 includes two processing cores 106. Die 0 includes core 0 and core 1, and die 1 includes core 2 and core 3. Each die 104 has a designated master core 106. In the embodiment of FIG. 1, core 0 is the master core 106 of die 0, and core 2 is the master core 106 of die 1. In one embodiment, each core 106 includes configuration fuses. The manufacturer of the die 104 may blow the configuration fuses to designate which of the cores 106 is the master core of the die 104. Additionally, the manufacturer of the die 104 may blow the configuration fuses to designate to each core 106 its instance, i.e., whether the core 106 is core 0, core 1, core 2, or core 3. As discussed above, the term "pal" is used to refer to cores 106 on the same die 104 that communicate with one another; thus, in the embodiment of FIG. 1, core 0 and core 1 are pals, and core 2 and core 3 are pals. The term "buddy" is used herein to refer to master cores 106 on different dies 104 that communicate with one another; thus, in the embodiment of FIG. 1, core 0 and core 2 are buddies. According to one embodiment, the even-numbered core 106 is the master core of each die 104. According to one embodiment, core 0 is designated the boot service processor (BSP) of the multi-core microprocessor 102. It alone is authorized to coordinate certain restricted activities with the chipset 114, including enable implementation of certain composite power states. According to one embodiment, the BSP core 106 informs the chipset 114 that it may request permission to remove the bus 116 clock to reduce power consumption and/or refrain from generating snoop cycles on the bus 116, as discussed below with respect to block 322 of FIG. 3. In one embodiment, the BSP is the core 106 whose bus request output is coupled to the BREQ0 signal on the bus 116.

The two cores 106 within each die 104 communicate via inter-core communication wires 112 that are internal to the die 104. More specifically, the inter-core communication wires 112 enable the cores 106 within a die 104 to interrupt one another and to send one another messages to perform the decentralized power management distributed among the cores 106 of the multi-core microprocessor 102. In one embodiment, the inter-core communication wires 112 comprise parallel buses. In one embodiment, the inter-core communication wires 112 are similar to those described in Ser. No. 13/299,171.

Additionally, the cores 106 communicate via the inter-die communication wires 118. More specifically, the inter-die communication wires 118 enable the master cores 106 on distinct dies 104 to interrupt one another and to send one another messages to perform the decentralized power management distributed among the cores 106 of the multi-core microprocessor 102. In one embodiment, the inter-die communication wires 118 run at the bus 116 clock rate. In one embodiment, the cores 106 transmit 32-bit messages to one another. The transmitting, or broadcasting, core 106 asserts its single-wire inter-die communication wire 118 for one bus 116 clock to indicate it is about to transmit a message, and then sends a sequence of 31 bits on the next respective 31 bus 116 clocks. At the end of each inter-die communication wire 118 is a 32-bit shift register that accumulates the single bits as they are received into the 32-bit messages. In one embodiment, the 32-bit message comprises a plurality of fields. One field specifies a 7-bit requested VID value used according to the shared VRM distributed management mechanism described in Ser. No. 13/299,225. Other fields include messages related to power state (e.g., C-state) synchronization, such as C-state request values and acknowledgements, which are exchanged between the cores 106 as discussed herein. Additionally, a special message value enables a transmitting core 106 to interrupt a receiving core 106.

In the embodiment of FIG. 1, each die 104 includes four pads 108 coupled to four respective pins, denoted "P1", "P2", "P3", and "P4". Of the four pads 108, one is an output pad (denoted "OUT") and three are input pads (denoted IN 1, IN 2, and IN 3). The inter-die communication wires 118 are configured as follows. The OUT pad of die 0 and the IN 1 pad of die 1 are coupled to pin P1 via a single wire net; the OUT pad of die 1 and the IN 3 pad of die 0 are coupled to pin P2 via a single wire net; the IN 2 pad of die 0 and the IN 3 pad of die 1 are coupled to pin P3 via a single wire net; and the IN 1 pad of die 0 and the IN 2 pad of die 1 are coupled to pin P4 via a single wire net. In one embodiment, the core 106 includes an identifier in each message it transmits out of its OUT pad 108 on its inter-die communication wire 118 (or inter-package communication wires 1133 described below with respect to FIG. 11). The identifier uniquely identifies the destination core 106 to which the message is destined, which is useful in embodiments described herein in which the message is broadcast to multiple recipient cores 106. In one embodiment, each die 104 is assigned one of the four pads 108 as its output pad (OUT) based on a configuration fuse blown during manufacturing of the multi-core microprocessor 102.

Figure 9:
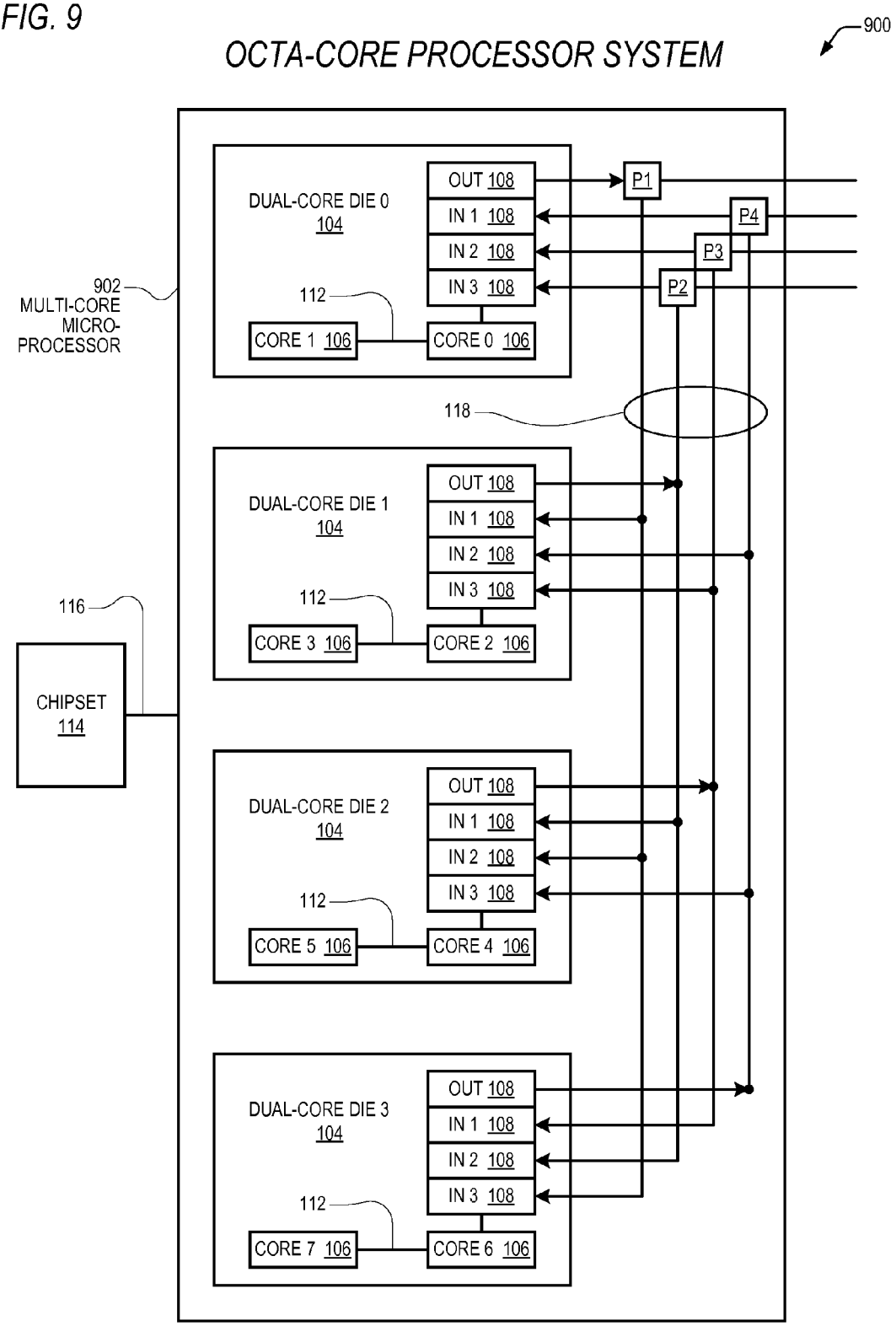
FIG. 9 is a block diagram illustrating another embodiment of a computer system that performs decentralized power management distributed among multiple processing cores of an octa-core microprocessor having four dual-core dies on a single package.
Figure 19:
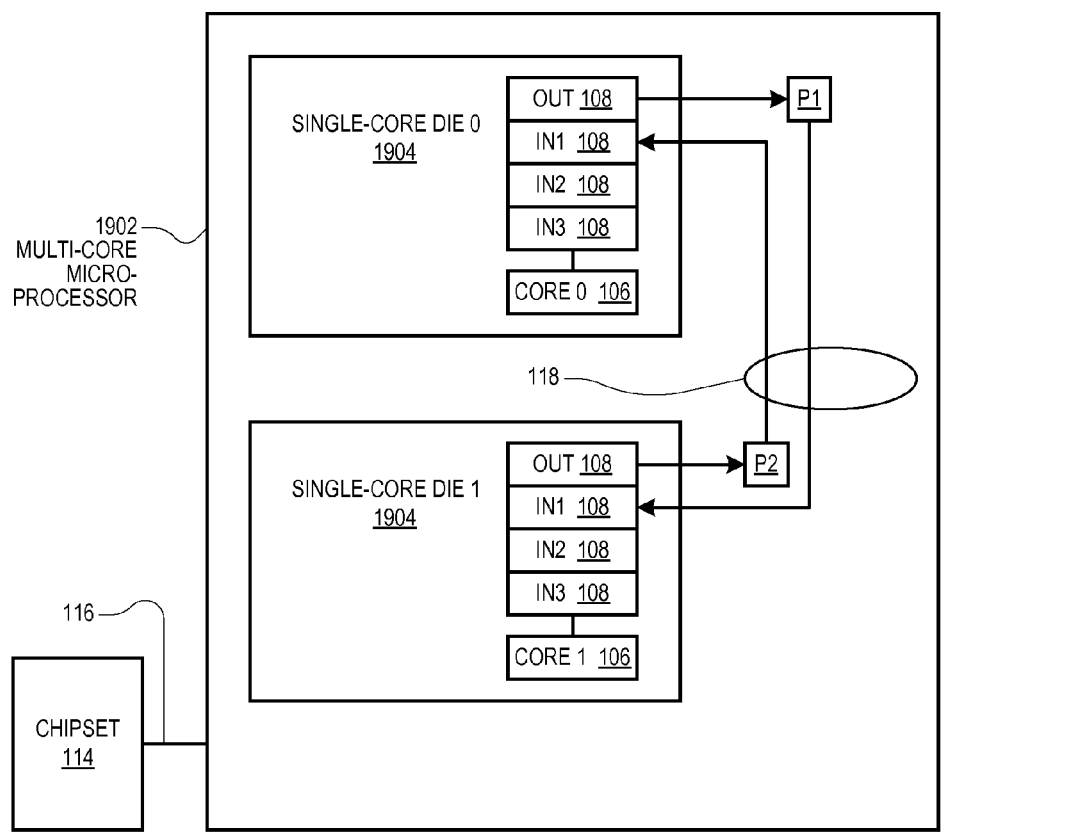
FIG. 19 is a block diagram illustrating yet another embodiment of a computer system that performs decentralized power management distributed among the cores of a dual-core microprocessor having two single-core dies.
Figure 20:
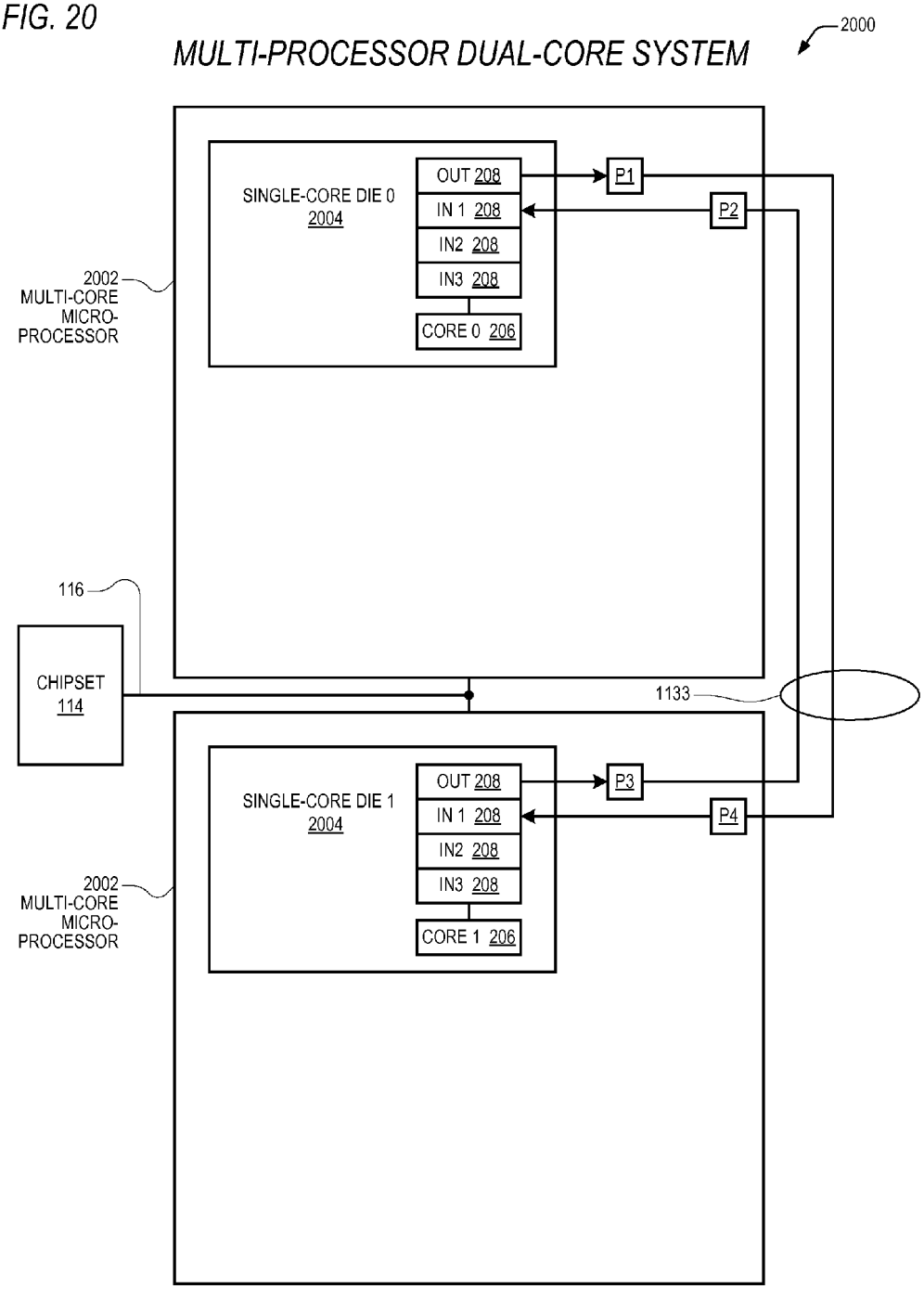
FIG. 20 is a block diagram illustrating yet another embodiment of a computer system that performs decentralized power management distributed among the cores of a dual-core microprocessor having two single-core, single-die packages.

When master core 0 of die 0 wants to communicate with master core 2 of die 1, it transmits information on its OUT pad to the IN 1 pad of die 1; similarly, when master core 2 of die 1 wants to communicate with master core 0 of die 0, it transmits information on its OUT pad to the IN 3 pad of die 0. Thus, in the embodiment of FIG. 1, only one input pad 108 per die 104 is needed rather than three. However, an advantage of manufacturing the dies 104 with three input pads 108 is that it enables the same dies 104 to be configured in both a quad-core multi-core microprocessor 102 of FIG. 1 and an octa-core multi-core microprocessor 902, such as shown in FIG. 9. Additionally, in the embodiment of FIG. 1, two of the pins P are not needed. However, an advantage of manufacturing the dies 104 with four pins P is that it enables the same quad-core microprocessor 102 to be configured in both a single quad-core microprocessor 102 of FIG. 1 and in an octa-core system 1100, such as shown in FIG. 11, having two quad-core microprocessors 1102. Nevertheless, quad-core embodiments are contemplated in which the unused pins P and pads 108 may be removed to reduce pad and pin count when necessary, such as shown in the embodiments of FIGS. 12 and 14 through 16. Additionally, dual-core embodiments, such as shown in the embodiments of FIGS. 19 and 20, are contemplated in which the unused pins P and pads 108 may be removed to reduce pad and pin count, or allocated for another purpose, when necessary.

According to one embodiment, the bus 116 includes signals that enable the chipset 114 and multi-core microprocessor 102 to communicate via a bus protocol similar to the well-known Pentium 4 bus protocol. The bus 116 includes a bus clock signal supplied by the chipset 114 to the multi-core microprocessor 102 which the cores 106 use to generate their internal core clock signals, whose frequencies are typically a ratio of the bus block frequency. The bus 116 also includes a STPCLK signal which the chipset 114 asserts to request permission from the cores 106 to remove the bus clock signal, i.e., permission to stop providing the bus clock signal. The multi-core microprocessor 102 indicates to the chipset 114 that it may assert STPCLK by performing an I/O Read transaction on the bus 116 from a predetermined I/O port address, which only one of the cores 106 performs. As discussed below, advantageously, the multiple cores 106 communicate with one another via the inter-core communication wires 112 and the inter-die communication wires 118 to determine when the single core 106 can perform the I/O Read transaction. After the chipset 114 asserts STPCLK, according to one embodiment, each of the cores 106 issues a STOP GRANT message to the chipset 114; once each core 106 has issued a STOP GRANT message, the chipset 114 may remove the bus clock. In another embodiment, the chipset 114 has a configuration option such that it expects only a single STOP GRANT message from the multi-core microprocessor 102 before it removes the bus clock.

Figure 2:
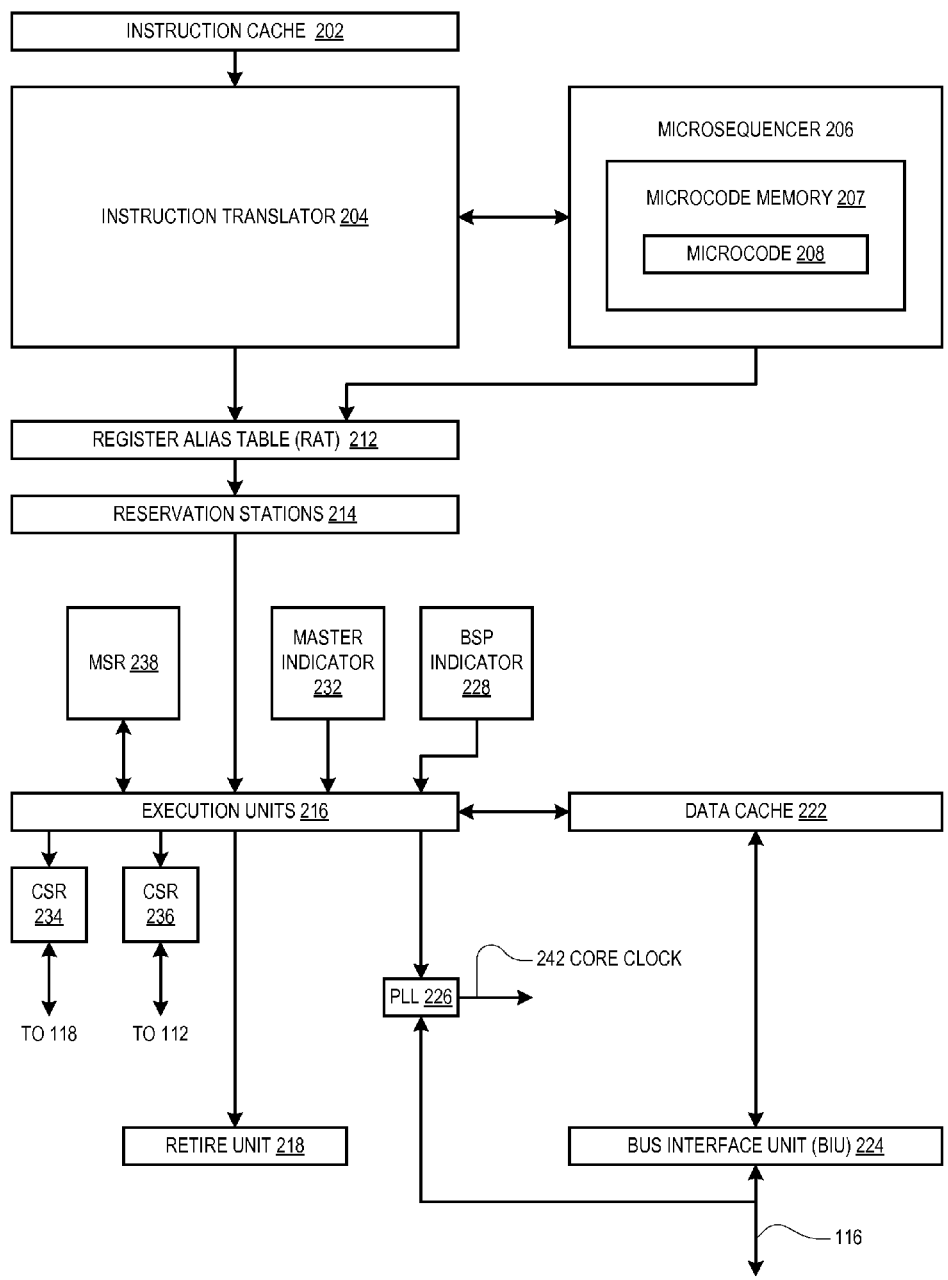
FIG. 2 is a block diagram illustrating in detail a representative one of the cores of FIG. 1.

Referring now to FIG. 2, a block diagram illustrating in detail a representative one of the cores 106 of FIG. 1 according to the present invention is shown. According to one embodiment, the core 106 microarchitecture comprises a superscalar, out-of-order execution pipeline of functional units. An instruction cache 202 caches instructions fetched from a system memory (not shown). An instruction translator 204 is coupled to receive instructions, such as x86 instruction set architecture instructions, from the instruction cache 202. A register alias table (RAT) 212 is coupled to receive translated microinstructions from the instruction translator 204 and from a microsequencer 206 and to generate dependency information for the translated microinstructions. Reservation stations 214 are coupled to receive the translated microinstructions and dependency information from the RAT 212. Execution units 216 are coupled to receive the translated microinstructions from the reservation stations 214 and to receive instruction operands for the translated microinstructions. The operands may come from registers of the core 106, such as general purpose registers and readable and writeable model-specific registers (MSR) 238, and from a data cache 222 coupled to the execution units 216. A retire unit 218 is coupled to receive instruction results from the execution units 216 and to retire the results to architectural state of the core 106. The data cache 222 is coupled to a bus interface unit (BIU) 224 that interfaces the core 106 to the bus 116 of FIG. 1. A phase-locked-loop (PLL) 226 receives the bus clock signal from the bus 116 and from it generates a core clock signal 242 to the various functional units of the core 106. The PLL 226 may be controlled, such as disabled, via the execution units 216.

The execution units 216 receive a BSP indicator 228 and a master indicator 232 that indicate whether the core 106 is the master core of the die 104 and the BSP core of the multi-core microprocessor 102, respectively. As discussed above, the BSP indicator 228 and master indicator 232 may comprise programmable fuses. In one embodiment, the BSP indicator 228 and master indicator 232 are stored in a model specific register (MSR) 238 that is initially populated with the programmable fuse values, but which may be updated by software writes to the MSR 238. The execution units 216 also read and write control and status registers (CSR) 234 and 236 to communicate with the other cores 106. In particular, the core 106 uses the CSR 236 to communicate with cores 106 on the same die 104 via the inter-core communication wires 112, and the core 106 uses the CSR 234 to communicate with cores 106 on other dies 104 via the inter-die communication wires 118 through the pads 108, as described in detail below.

The microsequencer 206 includes a microcode memory 207 configured to store microcode, including power management logic microcode 208. For purposes of the present disclosure, the term "microcode" used herein refers to instructions that are executed by the same core 106 that executes the architectural instruction (e.g., the MWAIT instruction) that instructs the core 106 to transition to a power management-related state, referred to herein as a sleeping state, idle state, C-state, or power state. That is, the instance of a state transition instruction is specific to the core 106, and the microcode 208 executed in response to the state transition instruction instance executes on that core 106. The processing cores 106 are symmetric in that they each have the same instruction set architecture and are configured to execute user programs comprising instructions from the instruction set architecture. In addition to the cores 106, the multi-core microprocessor 102 may include an adjunct or service processor (not shown) that does not have the same instruction set architecture as the cores 106. However, according to the present invention, the cores 106 themselves, rather than the adjunct or service processors and rather than any other non-core logic device, perform the decentralized power management distributed among multiple processing cores 106 of the multi-core microprocessor 102 in response to the state transition instructions, which may advantageously provide enhanced scalability, configurability, yield properties, power reduction, and/or die real estate reduction over a design having dedicated hardware for performing the power management on behalf of the cores.

The power management logic microcode 208 instructions are invoked in response to at least two conditions. First, the power management logic microcode 208 may be invoked to implement an instruction of the instruction set architecture of the core 106. In one embodiment, the x86 MWAIT and IN instructions, among others, are implemented in microcode 208. That is, when the instruction translator 204 encounters an x86 MWAIT or IN instruction, the instruction translator 204 stops fetching the currently running user program instructions and transfers control to the microsequencer 206 to begin fetching a routine in the power management logic microcode 208 that implements the x86 MWAIT or IN instruction. Second, the power management logic microcode 208 may be invoked in response to an interrupting event. That is, when an interrupting event occurs, the core 106 stops fetching the current user program instructions and transfers control to the microsequencer 206 to begin fetching a routine in the power management logic microcode 208 that handles the interrupting event. Interrupting events include architectural interrupts, exceptions, faults, or traps, such as those defined by the x86 instruction set architecture. An example of an interrupting event is detection of an I/O Read transaction on the bus 116 to one of a number of predetermined I/O addresses associated with power management. Interrupting events also include non-architecturally defined events. In one embodiment, non-architecturally defined interrupting events include: an inter-core interrupt request (such as described in connection with FIGS. 5 and 6) signaled via inter-core communication wires 118 of FIG. 1 or signaled via inter-die communication wires 118 of FIG. 1 (or signaled via inter-package communication wires 1133 of FIG. 11, discussed below); and detection of a STPCLK assertion or deassertion by the chipset. In one embodiment, the power management logic microcode 208 instructions are instructions of the micro-architectural instruction set of the core 106. In another embodiment, the microcode 208 instructions are instructions of a different instruction set, which get translated into instructions of the micro-architectural instruction set of the core 106.

The system 100 of FIG. 1 performs decentralized power management distributed among the multiple processing cores 106. More specifically, each core invokes its native power management logic microcode 208 to respond to a state transition request to transition to a target power state. A target power state is any requested one of a plurality of predefined power states (such as C-states). The predefined power states include a reference or active operating state (such as ACPI's C0 state) and a plurality of progressively and relatively less responsive states (such as ACPI's C1, C2, C3, etc. states).

Figure 3:
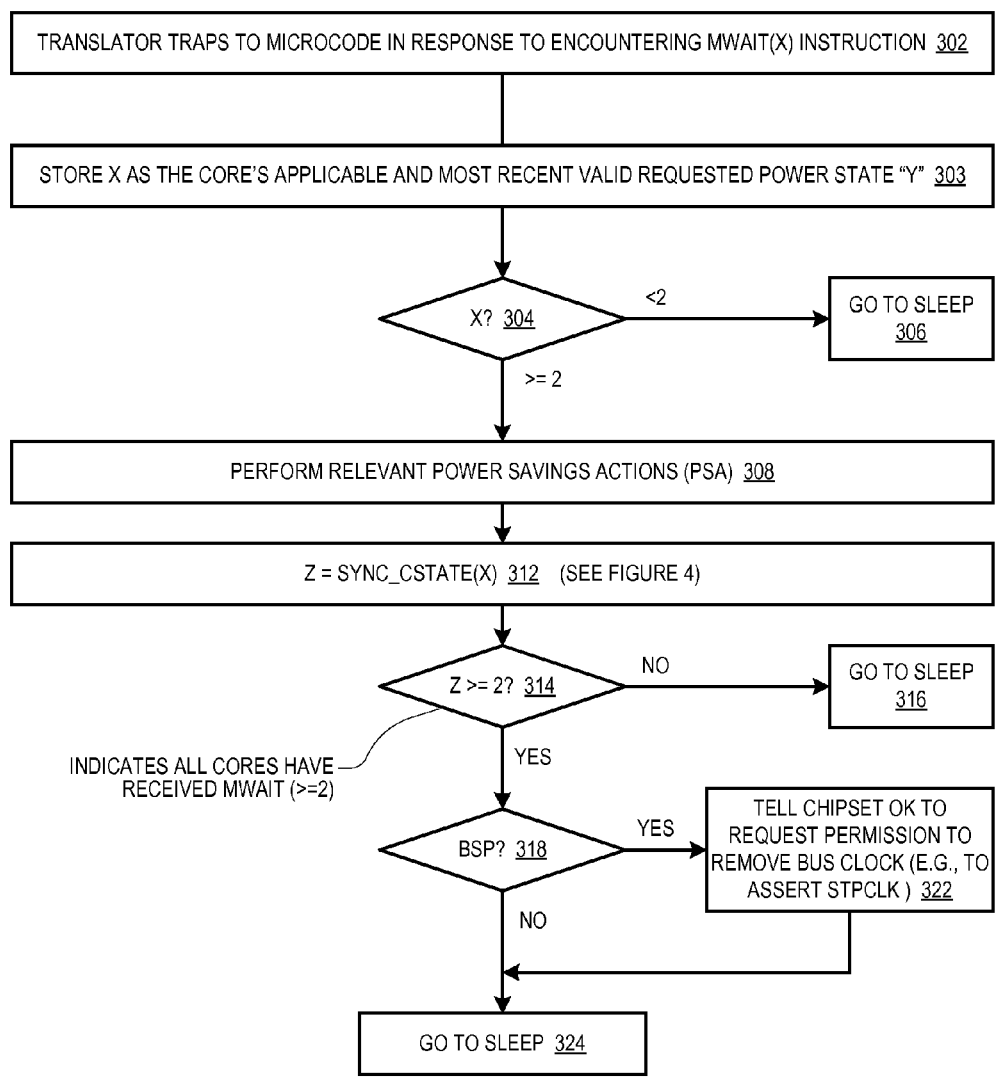
FIG. 3 is a flowchart illustrating operation, by a core, of one embodiment of a power-state management routine of a system performing decentralized power management distributed among the multiple processing cores of the multi-core microprocessor.

Referring now to FIG. 3, a flowchart illustrating operation of the system 100 of FIG. 1 to perform decentralized power management distributed among the multiple processing cores 106 of the multi-core microprocessor 102 according to the present invention is shown. Specifically, the flowchart illustrates operation of a portion of the power management logic microcode 208 in response to encountering an MWAIT instruction or similar command, to transition to a new power state. More specifically, the portion of the power management logic microcode 208 illustrated in FIG. 3 is a state transition request handling logic (STRHL) routine of the power management logic.

To facilitate a better appreciation of FIG. 3, aspects of the MWAIT instruction and C-state architecture are explained before describing each of FIG. 3's individual blocks. The MWAIT instruction may be included in the operating system (e.g., Windows®, Linux®, MacOS®) or other system software. For example, if the system software knows that the workload on the system is presently low or non-existent, the system software may execute an MWAIT instruction to allow the core 106 to enter a low power state until an event, such as an interrupt from a peripheral device, requires servicing by the core 106. For another example, the software executing on the core 106 may be sharing data with software executing on another core 106 such that synchronization, e.g., via a semaphore, is required between accesses to the data shared by the two cores 106; if it is possible that a significant amount of time may pass before the other core 106 performs the store to the semaphore, the software executing on the instant core 106 may enable the instant core 106, via the MWAIT instruction, to enter the low power state until the store to the semaphore occurs.

The MWAIT instruction is described in detail on pages 3-761 through 3-764 of the Intel® 64 and IA-32 Architectures Software Developer's Manual, Volume 2A: Instruction Set Reference, A-M, March 2009, and the MONITOR instruction is described in detail on pages 3-637 through 3-639 of the same, which are hereby incorporated by reference in their entirety for all purposes.

The MWAIT instruction may specify a target C-state. According to one embodiment, C-state 0 is a running state, and C-states greater than 0 are sleeping states; C-states 1 and higher are halt states in which the core 106 ceases to fetch and execute instructions; and C-states 2 and higher are states in which the core 106 may perform additional actions to reduce its power consumption, such as disabling it cache memories and lowering its voltage and/or frequency.

According to one embodiment, C-states of 2 or higher are considered and predetermined to be a restricted power state. In C-state 2 or higher, the chipset 114 may remove the bus 116 clock, thereby effectively disabling the core 106 clocks, in order to greatly reduce power consumption by the cores 106. With each succeeding higher C-state, the core 106 is allowed to perform more aggressive power saving actions that require respectively longer times from which to recover to the running state. Examples of the events that may cause the core 106 to exit the low power state are an interrupt and a store by another processor to an address range specified by a previously executed MONITOR instruction.

Notably, the ACPI numbering scheme for C-states uses higher C numbers to represent progressively less responsive, deeper sleep states. Using such a numbering scheme, the composite power state of any given constituency group (i.e., a die, a package, a platform) would be the minimum of the applicable C-states of all of the enabled cores of that constituency group, where each core's applicable C-state is its most recent valid requested C-state, if any, and zero, if the core does not have a valid most recent valid requested C-state.

However, other classes of power states use progressively higher numbers to represent progressively more responsive states. For example, Ser. No. 13/299,225 describes a coordination system for indicating a desired voltage identifier (VID) to a voltage regulator module (VRM). Higher VIDs correspond to higher voltage levels, which in turn correspond to faster (and therefore more responsive) performance states. But coordinating a composite VID involves determining the maximum of the cores' requested VID values. Because a power state numbering scheme can be specified in either ascending or descending order, portions of this specification define composite power states as an "extremum," which is either the minimum or the maximum, of the applicable power states of the relevant cores. However, it will be appreciated that even requested VID and clock ratio values are "orderable" (using, for example, the negatives of the original values) in a direction opposite to their conventional order; thus even more particularly defined hierarchical coordination systems herein are generally applicable to power states regardless of their conventionally defined direction.

Although FIG. 3 describes an embodiment in which the cores 106 respond to an MWAIT instruction to perform the decentralized power management, the cores 106 may also respond to other forms of input that instruct the core 106 that it may enter a low power state. For example, the bus interface unit 224 may generate a signal to cause the core 106 to trap to the microcode 208 in response to detecting an I/O read transaction on the bus 116 to a predetermined I/O port range. Furthermore, embodiments are contemplated in which the core 106 traps to the microcode 208 in response to other external signals received by the core 106, and are not limited to x86 instruction set architecture embodiments or to embodiments of systems that include a Pentium 4-style processor bus. Furthermore, a core 106's given target state may be internally generated, as is frequently the case with desired voltage and clock values.

Focusing now on the individual functional blocks of FIG. 3, flow begins at block 302. At block 302, the instruction translator 204 of FIG. 2 encounters an MWAIT instruction and traps to the power management logic microcode 208, and more specifically to the STRHL routine, that implements the MWAIT instruction. The MWAIT instruction specifies a target C-state, denoted "X," and instructs the core 106 that it may enter an optimized state while waiting for an event to occur. Specifically, the optimized state may be a low power state in which the core 106 consumes less power than the running state in which the core 106 encounters the MWAIT instruction.

Flow proceeds to block 303. The microcode store "X" as the core's applicable or most recent valid requested power state, denoted as "Y." It is noted that if the core 106 has not encountered an MWAIT instruction, or if since that time that instruction has been superceded or become stale (by, for example, a subsequent STPCLK deassertion) and the core is in a normal running state, the value "Y" stored as the core's applicable or most recent valid requested power state is 0.

Figure 5:
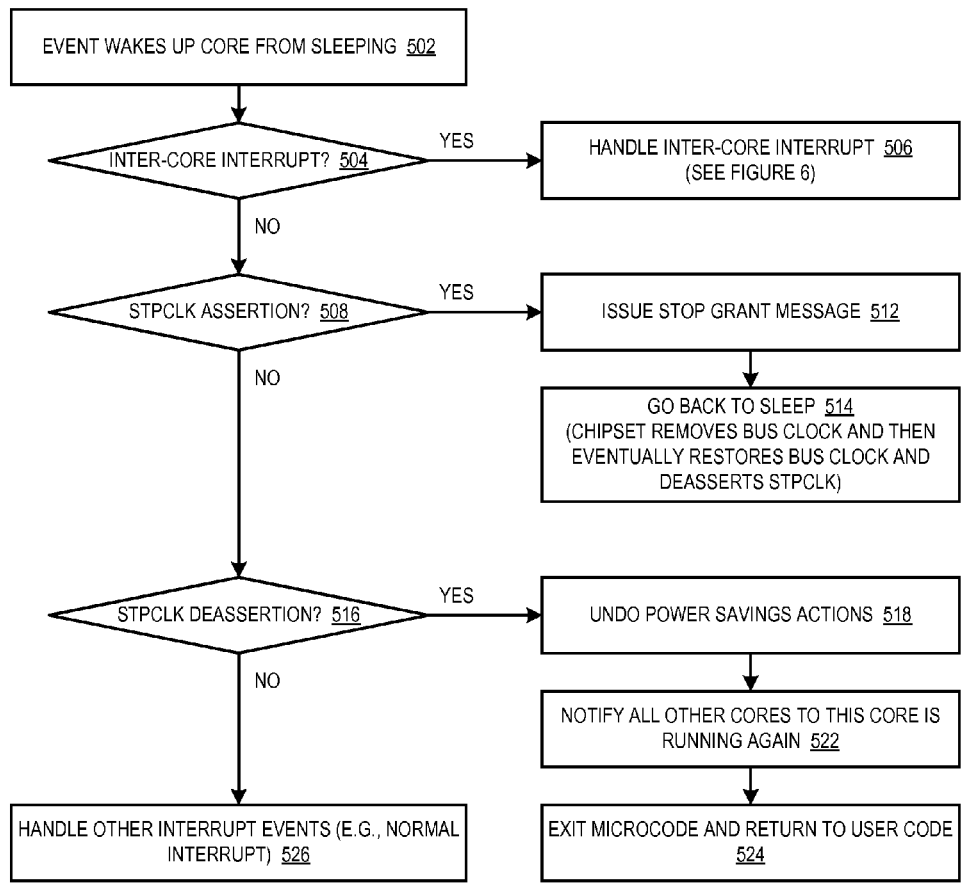
FIG. 5 is a flowchart illustrating operation, by a core, of one embodiment of a wake-and-resume routine in response to an event that wakes it up from a sleep state.

Flow proceeds to block 304. At block 304, the microcode 208, and more specifically the STRHL routine, examines "X," a value corresponding to the target C-state. If "X" is less than 2 (i.e., the target C-state is 1), flow proceeds to block 306; whereas, if the target C-state is greater than or equal to 2 (i.e., "X" corresponds to a restricted power state), flow proceeds to block 308. At block 306, the microcode 208 puts the core 106 to sleep. That is, the STRHL routine of microcode 208 writes control registers within the core 106 to cause it to cease fetching and executing instructions. Thus, the core 106 consumes less power than when it is in a running state. Preferably, when the core 106 is sleeping, the microsequencer 206 also does not fetch and execute microcode 208 instructions. Flow ends at block 306. FIG. 5 describes operation of the core 106 in response to being awaken from sleep.

Block 308 represents a path the STRHL routine of microcode 208 takes if "X" is 2 or more, corresponding to a restricted power state. As explained above, in one embodiment, a C-state of 2 or more involves removing the bus 116 clock. The bus 116 clock is a resource shared by the cores 106. Therefore, when a core is provided with a target C-state of 2 or higher, the cores 106 advantageously communicate in a distributed and coordinated fashion as described herein to verify that each core 106 has been instructed that it may transition to a C-state of 2 or greater before communicating to the chipset 114 that it may remove the bus 116 clock.

In block 308, the STRHL routine of microcode 208 performs relevant power savings actions (PSA) based on the target C-state specified by the MWAIT instruction encountered at block 302. Generally, the PSA taken by the core 106 include actions that are independent of the other cores 106. For example, each core 106 includes its own cache memories that are local to the core 106 itself (e.g., instruction cache 202 and data cache 222), and the PSA include flushing the local caches, removing their clocks, and powering them down. In another embodiment, the multi-core microprocessor 102 may also include caches shared by multiple cores 106. In this embodiment, the shared caches cannot be flushed, have their clocks removed, or powered down until the cores 106 communicate with one another to determine that all the cores 106 have received an MWAIT specifying an appropriate target C-state, in which case they may flush the shared caches, remove their clocks, and power them down prior to informing the chipset 114 that it may request permission to remove the bus 116 clock and/or refrain from generating snoop cycles on the bus 116 (see block 322). In one embodiment, the cores 106 share a voltage regulator module (VRM). Ser. No. 13/299,225 describes an apparatus and method for managing a VRM shared by multiple cores in a distributed, decentralized fashion. In one embodiment, each core 106 has its own PLL 226, as in the embodiment of FIG. 2, such that the core 106 can reduce its frequency or disable the PLL 226 to save power without affecting the other cores 106. However, in other embodiments, the cores 106 on a die 104 may share a PLL. Ser. No. 13/299,225 describes one apparatus and method for managing a PLL shared by multiple cores in a distributed, decentralized fashion. Embodiments of power state management and associated synchronization logic described herein may also (or alternatively) be applied to manage a PLL shared by multiple cores in a distributed, decentralized fashion.

Flow proceeds to block 312. At block 312, the STRHL routine of the power state management microcode 208 calls another power state management microcode 208 routine denoted sync_cstate, which is described in detail with respect to FIG. 4, to communicate with the other nodally connected cores 106 and obtain a composite C-state for the multi-core microprocessor 102, denoted Z in FIG. 3. Each invoked instance of the sync_cstate routine is referred to herein as a "native" instance of the sync_cstate routine with respect to the core on which it is running.

The STRHL routine of microcode 208 invokes the sync_cstate routine with an input parameter or probe power state value equal to the core's applicable power state, i.e., its most recent valid requested target power state, which is the value of "X" received at block 302 that was specified by the MWAIT instruction. Invoking the sync_cstate routine starts a composite power state discovery process, as described further in connection with FIG. 4.

Each invoked sync_cstate routine calculates and returns to any process that calls or invokes it (here, the STRHL routine) a "compound" C-state. The "compound" C-state is the minimum of the probe C-state value it received from the invoking process, the applicable C-state of the core on which the sync_cstate routine is running, and any compound C-states it received from any dependently induced instances of the sync_cstate routine. Under some circumstances, described below, the compound C-state is the composite power state of the domain common to both the native sync_cstate routine and the synchronized sync_cstate routine from which it depends. In other circumstances, described below, the compound C-state may only be a partial composite C-state of the domain.

In general, a composite power state of a domain is an extremum (in the ACPI power-state scheme, the minimum value) of the applicable power states of all of the cores of that domain. For example, the composite C-state of a die 104 is the minimum value of the applicable C-states (e.g., the most recent valid requested C-states, if all cores have such values) of all of the cores 106 of the die. The composite C-state for the multi-core microprocessor 102 as a whole is the minimum value of the applicable C-states of all of the cores 106 of the multi-core microprocessor 102.

A compound power state, however, may be either a composite power state for an applicable domain, or just a partial composite power state. A partial composite power state would be an extremum of the applicable power states of two or more, but less than all, of the cores of an applicable domain. In parts, this specification refers to an "at least partial composite power state" to encompass calculated compound power states of either variety. The potential, albeit subtle, distinction between a compound power state and a composite power state will become more apparent in connection with FIGS. 4C, 10 and 17.

It is noted, in advance, that a non-zero value composite C-state for a multi-core microprocessor 102 indicates that every core 106 has seen an MWAIT that specifies a non-running C-state, i.e., a C-state with a value of 1 or greater; whereas a zero value composite C-state indicates that not every core 106 has seen an MWAIT. Furthermore, a value of greater than or equal to 2 indicates that all the cores 106 of the multi-core microprocessor 102 have received an MWAIT instruction specifying a C-state of 2 or greater.

Flow proceeds to decision block 314. At decision block 314, the STRHL routine of the microcode 208 examines the compound C-state "Z" determined at block 312. If "Z" is greater than or equal to 2, then flow proceeds to decision block 318. Otherwise, flow proceeds to block 316.

At block 316, the STRHL routine of the microcode 208 puts the core 106 to sleep. Flow ends at block 316.

At decision block 318, the STRHL routine of the microcode 208 determines whether the core 106 is the BSP. If so, flow proceeds to block 322; otherwise, flow proceeds to block 324.

At block 322, the BSP 106 informs the chipset 114 that it may request permission to remove the bus 116 clock and/or refrain from generating snoop cycles on the bus 116.

In one embodiment, according to the well-known Pentium 4 bus protocol, the BSP 106, which is uniquely authorized to enable higher power-management states, informs the chipset 114 that it may request permission to remove the bus 116 clock and/or refrain from generating snoop cycles on the bus 116 by initiating an I/O read transaction on the bus 116 to a predetermined I/O port. Thereafter, the chipset 114 asserts the STPCLK signal on the bus 116 to request permission to remove the bus 116 clock. In one embodiment, after informing the chipset 114 that it can assert STPCLK at block 322 (or block 608), the STRHL routine of the microcode 208 running on the BSP core 106 waits for the chipset 114 to assert STPCLK, rather than going to sleep (at block 324 or block 614), and then notifies the other cores 106 of the STPCLK assertion, issues its STOP GRANT message, and then goes to sleep. Depending upon the predetermined I/O port address specified by the I/O read transaction, the chipset 114 may subsequently refrain from generating snoop cycles on the bus 116.

Flow proceeds to block 324. At block 324, the microcode 208 puts the core 106 to sleep. Flow ends at block 324.

Figure 4A:
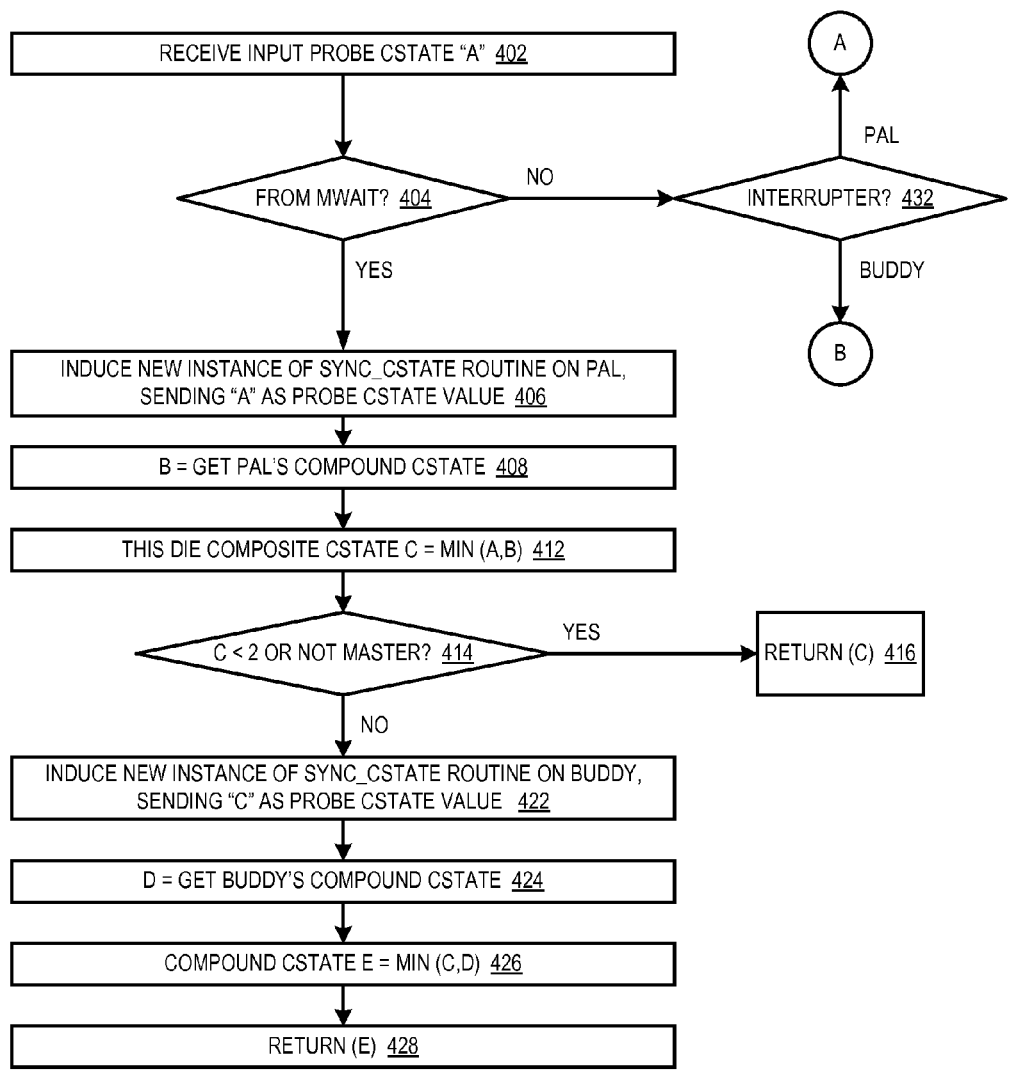
FIGS. 4A-4C is a flowchart illustrating operation, by a core, of one embodiment of a power-state synchronization routine integral to a composite power state discovery process of the system of FIG. 3.
Figure 4B:
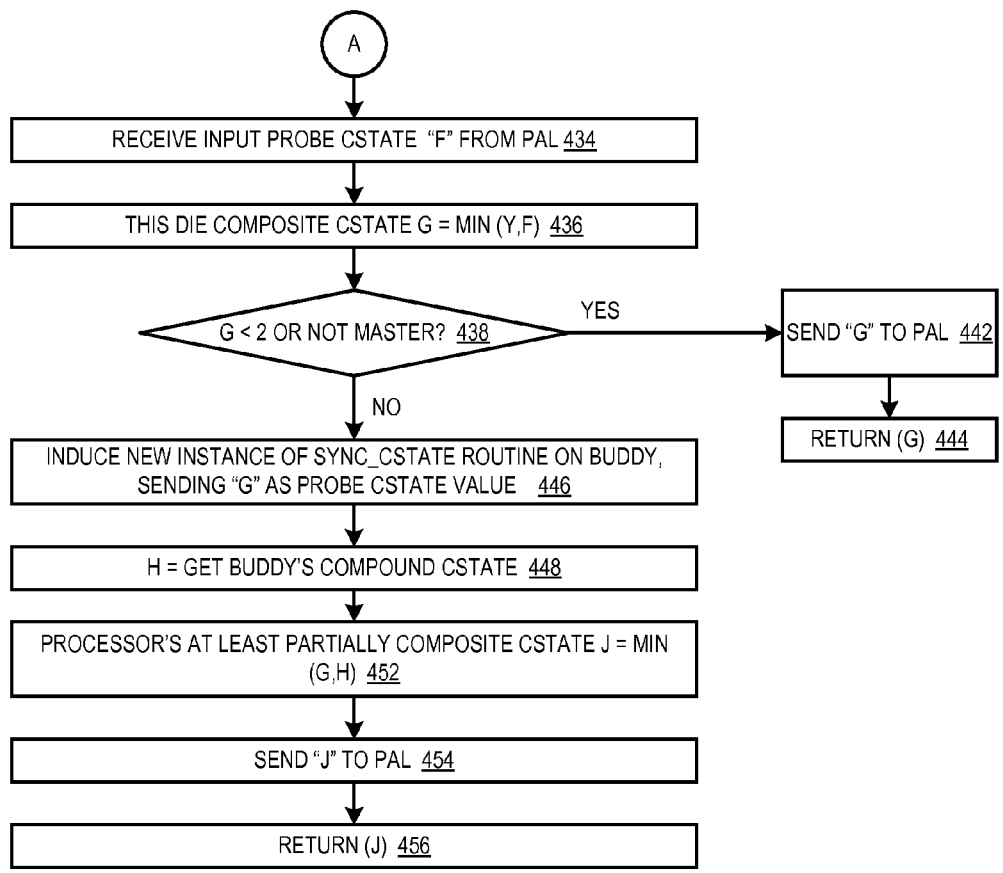

Referring now to FIG. 4, a flowchart illustrates operation of another component of the system 100 of FIG. 1 to perform decentralized power management distributed among the multiple processing cores 106 of the multi-core microprocessor 102. More specifically, the flowchart illustrates operation of an instance the sync_cstate routine of the power-state management microcode 208 of FIG. 3 (and FIG. 6). Although FIG. 4 is a flowchart illustrating the functionality of a single instance of the sync_cstate routine of the microcode 208, it will be understood from below that it carries out a composite C-state discovery process through multiple synchronized instances of that routine. Flow begins at block 402.

At block 402, an instance of the sync_cstate routine of the microcode 208 ("sync_cstate microcode 208") on a core 106 is invoked and receives an input probe C-state, denoted "A" in FIG. 4. An instance of the sync_cstate routine may be invoked natively from the MWAIT instruction microcode 208, as described with respect to FIG. 3, in which case the sync_cstate routine constitutes an initial instance of the sync_cstate routine. Additionally, an instance of the sync_cstate routine may be induced by a synchronization request originating from another core, referred to herein as an externally generated synchronization request, in which case the sync_cstate routine constitutes a dependent instance of the sync_cstate routine. More particularly, a pre-existing instance of the sync_cstate routine running on another, nodally-connected core may induce the native instance of the sync_cstate routine by sending an appropriate inter-core interrupt to the native core. As described in more detail with respect to FIG. 6, an inter-core interrupt handler (ICIH) of the power-state-ment management microcode 208 handles the inter-core interrupt received from the nodally connected core 106.

Flow proceeds to decision block 404. At decision block 404, if this instance (i.e., "the native instance") of the sync_cstate routine is an initial instance, that is, if it was invoked from the MWAIT instruction microcode 208 of FIG. 3, then flow proceeds to block 406. Otherwise, the native instance is a dependent instance that was induced by an external or non-native instance of the sync_cstate routine running on a nodally-connected core, and flow proceeds to decision block 432.

At block 406, the sync_cstate microcode 208 induces a dependent sync_cstate routine on its pal core by programming the CSR 236 of FIG. 2 to send to its pal the "A" value received at block 402 and to interrupt the pal. This requests the pal to calculate and return a compound C-state to the native core 106, as described in more detail below.

Flow proceeds to block 408. At block 408, the sync_cstate microcode 208 programs the CSR 236 to detect that the pal has returned a compound C-state to the core 106 and, if so, obtains the pal's compound C-state, denoted "B" in FIG. 4. It is noted that if the pal is in its most active running state, then the value of "B" will be zero. In one embodiment, the microcode 208 waits for the pal to respond to the request made at block 406 in a loop that polls the CSR 236 for a predetermined value to detect that the pal has returned a compound C-state. In one embodiment, the loop includes a timeout counter; if the timeout counter expires, then the microcode 208 assumes the pal core 106 is no longer enabled and operational, does not include an applicable or assumed C-state for that pal in any subsequent sync_cstate calculation, and subsequently does not attempt to communicate with the pal core 106. Furthermore, the microcode 208 operates similarly in communications with other cores 106 (i.e., buddy cores and chum cores), regardless of whether it is communicating with another core 106 via the inter-core communication wires 112 or the inter-die communication wires 118 (or the inter-package communication wires 1133 described below).

Flow proceeds to block 412. At block 412, the sync_cstate microcode 208 computes a compound C-state for the die 104 of which the core 106 is a part, by computing the minimum value of the "A" and "B" values, which is denoted "C." In a dual-core die, "C" will necessarily be the composite C-state because the "A" and "B" values represent the applicable C-states of all (two) of the cores on the die.

Flow proceeds to decision block 414. At decision block 414, if the "C" value computed at block 412 is less than 2 or the native core 106 is not the master core 106, flow proceeds to block 416. Otherwise, the "C" value is at least two and the native core 106 is a master core, and flow proceeds to block 422.

At block 416, the routine returns to the calling process that invoked it (here, the STRHL routine) the "C" value computed at block 412. Flow ends at block 416.

At block 422, the sync_cstate microcode 208 induces a dependent instance of the sync_cstate routine on its buddy core by programming the CSR 234 of FIG. 2 to send to its buddy the "C" value computed at block 412 and to interrupt the buddy. This requests the buddy to calculate and return a compound C-state and to provide it back to this core 106, as described in more detail below.

At this point, it should be noted that the sync_cstate microcode 208 does not induce dependent instances of the sync_cstate routine in buddy cores until it has already determined its own die's composite C-state. Indeed, all of the sync_cstate routines described in this specification operate in accordance with a consistent nested domain traversal order. That is, each sync_cstate routine progressively and conditionally discovers composite C-states, first of the lowest domain of which it is a part (e.g., the die), then, if it is the master of that domain, of the next higher level domain in which it is nested (e.g., in the case of FIG. 1, the processor itself), and so on. FIG. 13, discussed later, further illustrates this traversal order, with the sync_cstate routine conditionally and progressively discovering composite C-states first of the die of which the core is a part, then (if the core is also a master of that die) of the package of which it is a part, and then finally (if the core is also the BSP of the processor) of the entire processor or system.

Flow proceeds to block 424. At block 424, the sync_cstate microcode 208 programs the CSR 234 to detect that the buddy has returned a compound C-state and obtains the compound C-state, denoted "D" in FIG. 4. "D" will, under some circumstances, but not necessarily all (as explained below in connection with a corresponding value "L" in Figure C), constitute the buddy's die composite C-state.

Flow proceeds to block 426. At block 426, the sync_cstate microcode 208 computes a compound C-state for the multi-core microprocessor 102 by computing the minimum value of the "C" and "D" values, which is denoted "E." Assuming that "D" was the buddy's die composite C-state, then "E" will necessarily constitute the composite C-state of the processor, because "E" will be the minimum of "C"—which we know, as explained above, to be this die's composite C-state and "D"— the buddy's die composite C-state, and there are no cores on the processor that have been omitted from the calculation. If not, then "E" may constitute only a partial composite C-state of the processor (i.e., the minimum of applicable C-states of the cores on this die and the buddy core, but not also of the buddy's pal). Flow proceeds to decision block 428.

At block 428, the routine returns to its caller the "E" value computed at block 426. Flow ends at block 428.

Figure 6:
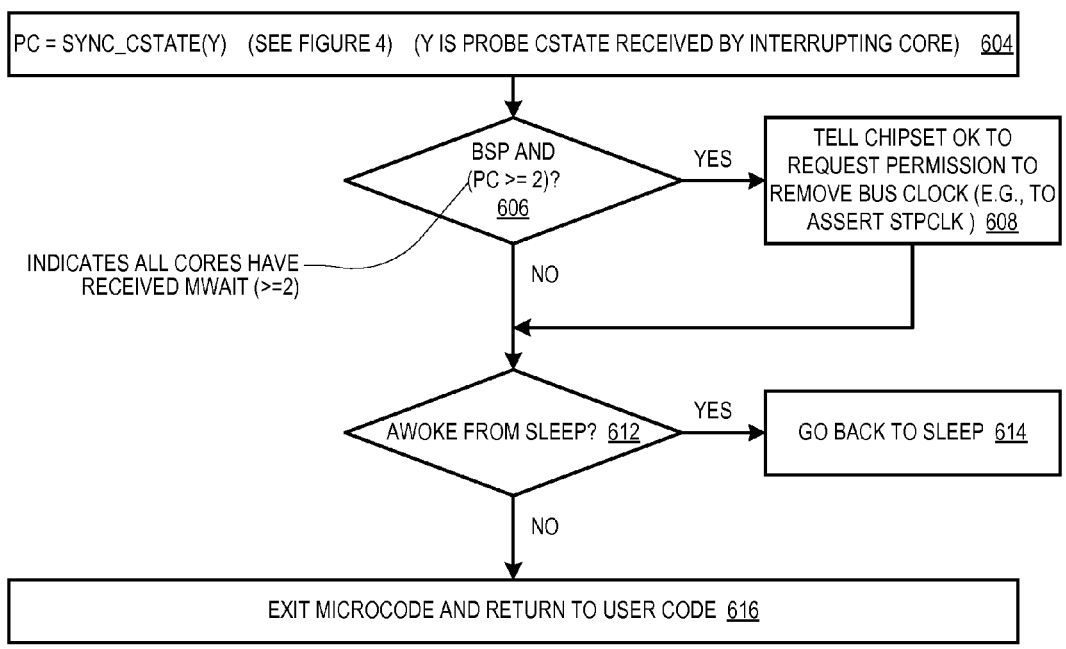
FIG. 6 is a flowchart illustrating operation, by a core, of an inter-core interrupt handling routine in response to receiving an inter-core interrupt.

At decision block 432, if the inter-core interrupt handler of FIG. 6 invoked the sync_cstate routine in response to an interrupt from the core's pal (i.e., a pal invoked the routine), flow proceeds to block 434. Otherwise, the inter-core interrupt handler invoked the sync_cstate routine in response to an interrupt from the core's buddy (i.e., the buddy induced the routine), and flow proceeds to block 466.

At block 434, the core 106 was interrupted by its pal, so the sync_cstate microcode 208 programs the CSR 236 to obtain the probe C-state passed by the pal and its inducing routine, denoted "F" in FIG. 4. Flow proceeds to block 436.

At block 436, the sync_cstate microcode 208 computes a compound C-state for its die 104 by computing the minimum value of its own applicable C-state "Y" and the probe C-state "F" it received from its pal, the result of which is denoted "G." In a dual-core die, "G" will necessarily be the composite C-state for the die 104 that includes the core 106, because "Y" and "F," in that case, necessarily represent respective applicable C-states for all of the (two) cores of that die.

Flow proceeds to decision block 438. At decision block 438, if the "G" value computed at block 436 is less than 2 or the core 106 is not the master core 106, flow proceeds to block 442. Otherwise, if "G" is at least two and the core is a master core, then flow proceeds to block 446.

At block 442, in response to the request via the inter-core interrupt from its pal, the sync_cstate microcode 208 programs the CSR 236 to send to its pal the "G" value computed at block 436. Flow proceeds to block 444. At block 444 the sync_cstate microcode 208 returns to the process that invoked it the "G" value computed at block 436. Flow ends at block 444.

At block 446, the sync_cstate microcode 208 induces a dependent instance of the sync_cstate routine on its buddy core by programming the CSR 234 of FIG. 2 to send to its buddy the "G" value computed at block 436 and to interrupt the buddy. This requests the buddy to calculate and return a compound C-state to this core 106, as described in more detail below. Flow proceeds to block 448.

Figure 4C:
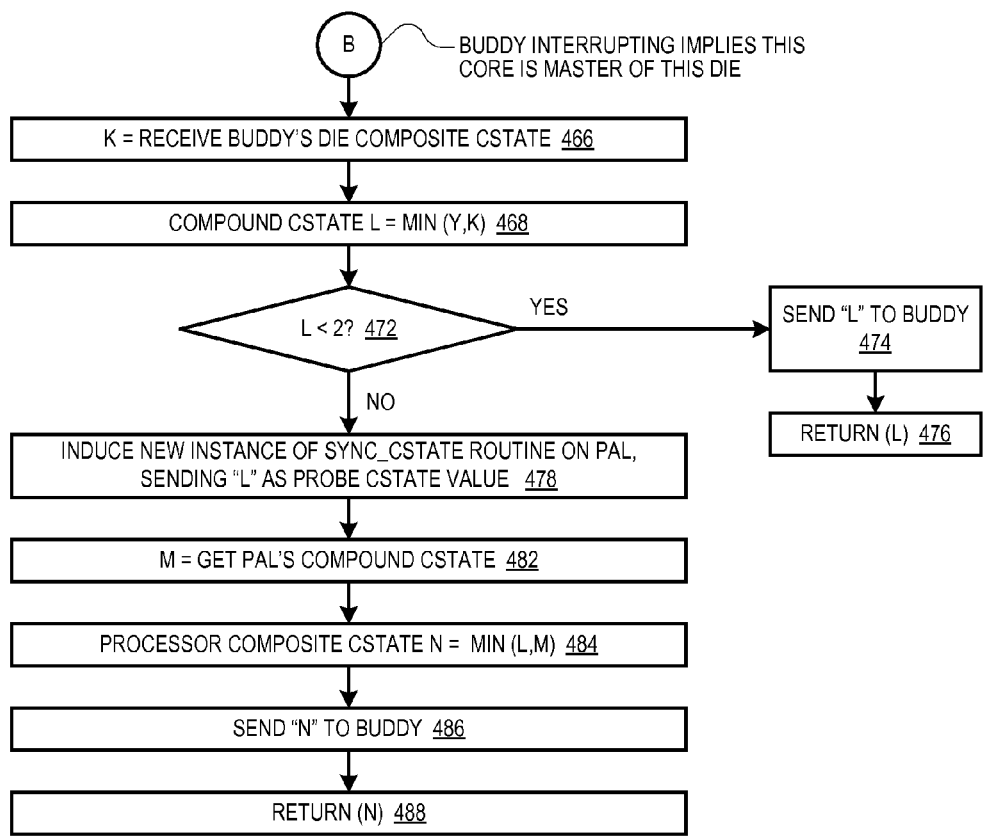

At block 448, the sync_cstate microcode 208 programs the CSR 234 to detect that the buddy has returned a compound C-state to the core 106 and obtains the compound C-state, denoted "H" in FIG. 4. In at least some but not necessarily all circumstances (as explained in connection with a corresponding value "L" in FIG. 4C), "H" will constitute the composite C-state of the buddy's die. Flow proceeds to block 452.

At block 452, the sync_cstate microcode 208 computes a compound C-state for the multi-core microprocessor 102 by computing the minimum value of the "G" and "H" values, which is denoted "J." Assuming that "H" was the buddy's die composite C-state, then "J" will necessarily constitute the composite C-state for the processor, because "J" will be the minimum of "G"—which we know, as explained above, to be this die's composite C-state and "H"—the buddy's die composite C-state, and there are no cores on the processor that have been omitted from the calculation. If not, then "J" may constitute only a partial composite C-state of the processor (i.e., the minimum of applicable C-states of the cores on this die and the buddy core, but not also of the buddy's pal). Accordingly, "H" constitutes the processor's "at least partially composite" C-state.

Flow proceeds to block 454. At block 454, in response to the request via the inter-core interrupt from its pal, the sync_cstate microcode 208 programs the CSR 236 to send to its pal the "J" value computed at block 452. Flow proceeds to block 456. At block 456 the routine returns to the process that invoked it the "J" value computed at block 452. Flow ends at block 456.

At block 466, the core 106 was interrupted by its buddy, so the sync_cstate microcode 208 programs the CSR 234 to obtain the input probe C-state passed by the buddy in inducing the routine, denoted "K" in FIG. 4.

Due to the hierarchical traversal order of the sync_cstate routine, the buddy would not have interrupted this core unless it had already discovered the composite C-state of its die, so "K" is necessarily the composite C-state of the inducing buddy. Also, it is noted that because it was interrupted by a buddy, this implies that the core 106 is the master core 106 of its die 104.

Flow proceeds to block 468. At block 468, the sync_cstate microcode 208 computes an at least partial composite C-state of the processor by computing the minimum value of its own applicable C-state "Y" and the received buddy composite C-state "K" value, the result of which is denoted "L."

If "L" is 1, "L" may not be the composite C-state of the processor because it does not incorporate the applicable C-state of its pal. If an applicable C-state of its pal is 0, then the (not precisely discovered) composite C-state for the processor is necessarily 0. However, the composite C-state of the processor, even though not necessarily precisely discovered, can be no greater than "L." In the power-management logic disclosed in this particular threshold-triggering embodiment, once a compound C-state less than 2 is discovered, it is known that the processor's composite C-state is also less than 2. Implementation of a C-state of less than 2 will have only predominantly local effects, so a more precise determination of the composite C-state is not merited. Therefore the composite C-state discovery process may be wound down and terminated, as shown herein.

If "L" is 0, however, then it is necessarily the composite C-state of the processor because (as stated above) the composite C-state of the processor cannot exceed any compound C-state of the processor. It is in recognition of such subtleties that portions of the specification refer to the sync_cstate routine as calculating an "at least partial composite value." Flow proceeds to decision block 472.

At decision block 472, if the "L" value computed at block 468 is less than 2, flow proceeds to block 474. Otherwise, flow proceeds to block 478. It should be noted that other embodiments of the invention could omit such threshold conditions (e.g., L<2?) for continuing a composite C-state discovery process. In such embodiments, each enabled core of the processor would unconditionally determine the composite C-state of the processor.

At block 474, in response to the request via the inter-core interrupt from its buddy, the sync_cstate microcode 208 programs the CSR 234 to send to its buddy the "L" value computed at block 468. Again, it is noted that when the buddy receives "L," it is receiving what may constitute only a partial composite value of the processor. However, because "L" is less than 2, than the composite value of the processor is also necessarily less than 2, obviating any impetus (if "L" is 1) for a more precise determination of the processor's composite value. Flow proceeds to block 476. At block 476 the routine returns to its caller the "L" value computed at block 468. Flow ends at block 476.

At block 478, the sync_cstate microcode 208 invokes a dependent sync_cstate routine on its pal core by programming the CSR 236 to send to its pal the "L" value computed at block 468 and to interrupt the pal. This requests the pal to calculate and provide a compound C-state to the core 106. It is noted that in the quad-core embodiment of FIG. 1 for which the sync_cstate microcode 208 of FIG. 4 is illustrated, this would be equivalent to asking the pal to provide its most recent requested C-state, if any.

Flow proceeds to block 482. At block 482, the sync_cstate microcode 208 programs the CSR 236 to detect that the pal has returned a compound C-state to the core 106 and obtains the pal's compound C-state, denoted "M" in FIG. 4. It is noted that if the pal is in its most active running state, then the value of "M" will be zero. Flow proceeds to block 484.

At block 484, the sync_cstate microcode 208 computes a compound C-state for the multi-core microprocessor 102 by computing the minimum value of the "L" and "M" values, which is denoted "N." It is noted that in the quad-core embodiment of FIG. 1 for which the sync_cstate microcode 208 of FIG. 4 is illustrated, "N" is necessarily the composite C-state of the processor, because it comprises the minimum of the buddy's die composite C-state K, the core's own applicable C-state A, and the pal's applicable C-state (the latter of which is incorporated into the compound power state M returned by the pal), which together include the applicable C-states of all four cores.

Flow proceeds to block 486. At block 486, in response to the request via the inter-core interrupt from its buddy, the sync_cstate microcode 208 programs the CSR 234 to send to its buddy the "N" value computed at block 484. Flow proceeds to block 488. At block 488 the routine returns to its caller the "N" value computed at block 484. Flow ends at block 488.

Referring now to FIG. 5, a flowchart illustrating operation of the system 100 of FIG. 1 to perform decentralized power management distributed among the multiple processing cores 106 of the multi-core microprocessor 102 according to the present invention is shown. More specifically, the flowchart illustrates operation by a core of a wake-and-resume routine of the power-state management microcode 208 in response to an event that wakes up the core 106 from a sleeping state such as is entered from blocks 306, 316, or 324 of FIG. 3, or from block 614 of FIG. 6. Flow begins at block 502.

At block 502, the core 106 wakes up from its sleeping state in response to an event and resumes by fetching and executing an instruction handler of microcode 208. The event may include, but is not limited to: an inter-core interrupt, i.e., an interrupt from another core 106 via the inter-core communication wires 112 or the inter-die communication wires 118 (or the inter-package communication wires 1133 of the embodiment of FIG. 11); the assertion of the STPCLK signal on the bus 116 by the chipset 114; the deassertion of the STPCLK signal on the bus 116 by the chipset 114; and another type of interrupt such as the assertion of an external interrupt request signal, such as might be generated by a peripheral device such as a USB device. Flow proceeds to decision block 504.

At decision block 504, the wake-and-resume routine determines whether the core 106 was awakened by an interrupt from another core 106. If so, flow proceeds to block 506; otherwise, flow proceeds to decision block 508.

At block 506, an inter-core interrupt routine handles the inter-core interrupt as described in detail with respect to FIG. 6. Flow ends at block 506.

At decision block 508, the wake-and-resume routine determines whether the core 106 was awakened by the assertion of the STPCLK signal on the bus 116 by the chipset 114. If so, flow proceeds to block 512; otherwise, flow proceeds to decision block 516.

At block 512, in response to the I/O read transaction performed at block 322 of FIG. 3 or at block 608 of FIG. 6, the chipset 114 has asserted STPCLK to request permission to remove the bus 116 clock. In response, the core 106 microcode 208 issues a STOP GRANT message on the bus 116 to inform the chipset 114 that it may remove the bus 116 clock. As described above, in one embodiment, the chipset 114 waits until all the cores 106 have issued a STOP GRANT message until it removes the bus 116 clock, whereas in another embodiment the chipset 114 removes the bus 116 clock after a single core 106 has issued the STOP GRANT message. Flow proceeds to block 514.

At block 514, the core 106 goes back to sleep. Proximately, the chipset 114 will remove the bus 116 clock in order to reduce power consumption by the multi-core microprocessor 102, as discussed above. Eventually, the chipset 114 will restore the bus 116 clock and then deassert STPCLK in order to cause the cores 106 to return to their running states so that they can execute user instructions. Flow ends at block 514.

At decision block 516, the wake-and-resume routine determines whether the core 106 was awakened by the deassertion of the STPCLK signal on the bus 116 by the chipset 114. If so, flow proceeds to block 518; otherwise, flow proceeds to block 526.

At block 518, in response to an event, such as a system timer interrupt or peripheral interrupt, the chipset 114 has restored the bus 116 clock and deasserted STPCLK to cause the cores 106 to start running again. In response, the wake-and-resume routine undoes the power savings actions performed at block 308. For example, the microcode 208 may restore power to the core 106 local caches, increase the core 106 clock frequency, or increase the core 106 operating voltage. Additionally, the core 106 may restore power to shared caches, for example if the core 106 is the BSP. Flow proceeds to block 522.

At block 522, the wake-and-resume routine reads and writes the CSR 234 and 236 to notify all the other cores 106 that this core 106 is awake and running again. The wake-andresume routine may also store "0" as the core's applicable or most recent valid requested C-state. Flow proceeds to block 524.

At block 524, the wake-and-resume routine exits and returns control back to the instruction translator 204 to resume translating fetched user program instructions, e.g., x86 instructions. Specifically, typically user instruction fetch and execution will resume at the instruction after the MWAIT instruction. Flow ends at block 524.

At block 526, the wake-and-resume routine handles other interrupting events, such as those mentioned above with respect to block 502. Flow ends at block 526.

Referring now to FIG. 6, a flowchart illustrating operation of the system 100 of FIG. 1 to perform decentralized power management distributed among the multiple processing cores 106 of the multi-core microprocessor 102 according to the present invention is shown. More specifically, the flowchart illustrates operation of an inter-core interrupt handling routine (ICIHR) of the microcode 208 in response to receiving an inter-core interrupt, i.e., an interrupt from another core 106 via the inter-core communication wires 112 or inter-die communication wires 118, such as may be generated at blocks 406, 422, 446, or 478 of FIG. 4. The microcode 208 may take an inter-core interrupt by polling (if the microcode 208 is already running), or the microcode 208 may take an inter-core interrupt as a true interrupt in between user program instructions, or the interrupt may cause the microcode 208 to wake up from a state in which the core 106 is sleeping.

Flow begins at block 604. At block 604, the ICIHR of the interrupted core 106 calls a native sync_cstate routine, in accordance with FIG. 4, to continue a synchronized power state discovery process initiated on another core. In response, it obtains an at least partial composite C-state for the multi-core microprocessor 102, denoted "PC" in FIG. 6. The ICIHR calls the sync_cstate microcode 208 with an input value "Y", which is the probe C-state passed by the external sync_cstate routine from which the native sync_cstate routine will depend. Incidentally, a value of greater than or equal to 2 indicates that "PC" is a complete, and not merely partial, composite C-state all the cores 106 of the multi-core microprocessor 102, and that all of the cores 106 of the processor have received an MWAIT instruction specifying a C-state of "PC" or greater.

Flow proceeds to block 606. At block 606, the microcode 208 determines whether the value of "PC" obtained at block 604 is greater than or equal to 2 and whether core 106 is authorized to implement or enable implementation of "PC" C-state (e.g., the core 106 is the BSP). If so, flow proceeds to block 608; otherwise, flow proceeds to decision block 612.

At block 608, the core 106 (e.g., as the BSP core 106 authorized to do so) informs the chipset 114 that it may request permission to remove the bus 116 clock as at block 322 above. Flow proceeds to decision block 612.

At decision block 612, the microcode 208 determines whether it was awakened from sleep. If so, flow proceeds to block 614; otherwise, flow proceeds to block 616.

At block 614, the microcode 208 goes back to sleep. Flow ends at block 614.

At block 616, the microcode 208 exits and returns control back to the instruction translator 204 to resume translating fetched user program instructions. Flow ends at block 616.

Figure 7:
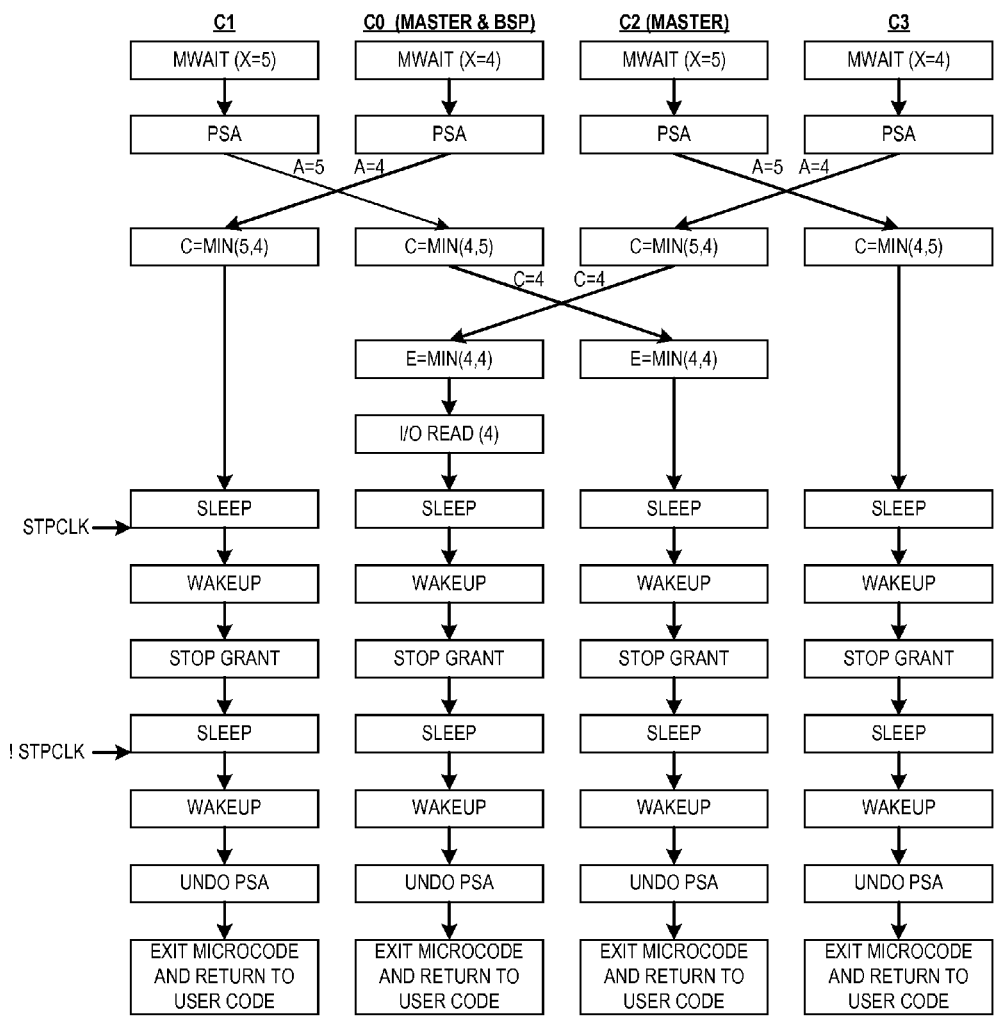
FIG. 7 is a flow diagram illustrating an example of operation of a composite power-state discovery process according to the description of FIGS. 3 through 6.

Referring now to FIG. 7, a flow diagram illustrating an example of operation of the system 100 of FIG. 1 according to the description of FIGS. 3 through 6 according to the present invention is shown. In the example of FIG. 7, the user programs executing on the cores 106 effectively simultaneously each execute an MWAIT instruction. In contrast, in the example of FIG. 8, the user programs executing on the cores 106 effectively each execute an MWAIT instruction at different times, namely after another core has gone to sleep after executing an MWAIT instruction. Together, the examples illustrate features of the microcode 208 of the cores 106 and their ability to handle different sequences of MWAIT instructions on the various cores 106. FIG. 7 includes four columns, one corresponding to each of the four cores 106 of FIG. 1. As shown and as described above with respect to FIG. 1, core 0 and core 2 are the master core of their die 104, and core 0 is the BSP of the multi-core microprocessor 102. Each column of FIG. 7 indicates actions taken by the respective core 106. The downward flow of actions in each row of FIG. 7 indicates the passage of time.

Initially, each core 106 encounters an MWAIT instruction (at block 302) with various C-states specified. In the example of FIG. 7, the MWAIT instructions to core 0 and to core 3 specify a C-state of 4, and the MWAIT instructions to core 1 and to core 2 specify a C-state of 5. Each of the cores 106 responsively performs it relevant power saving actions (at block 308) and stores the received target C-state ("X") as its applicable and most recent valid requested C-state "Y".

Next, each core 106 sends its applicable C-state "Y" as a probe C-state to its pal (at block 406), as indicated by the arrows with the labeled values of "A". Each core 106 then receives its pal's probe C-state (at block 408) and computes its die 104 composite C-state "C" (at block 412). In the example, the "C" value computed by each core 106 is 4. Since core 1 and core 3 are not master cores, they both go to sleep (at block 324).

Since core 0 and core 2 are the master core, they send each other (i.e., their buddy) their respective "C" value (at block 422), as indicated by the arrows with the labeled values of "C". They each receive their buddy's die composite C-state (at block 424) and compute the multi-core microprocessor 102 composite C-state "E" (at block 426). In the example, the "E" value computed by each of core 0 and core 2 is 4. Since core 2 is not the BSP core 106, it goes to sleep (at block 324).

Because core 0 is the BSP, it informs the chipset 114 that is may request permission to remove the bus 116 clock (at block 322), e.g., to assert STPCLK. More specifically, core 0 informs the chipset 114 that the multi-core microprocessor 102 composite C-state is 4. Core 0 then goes to sleep (at block 324). Depending upon the predetermined I/O port address specified by the I/O read transaction initiated at block 322, the chipset 114 may subsequently refrain from generating snoop cycles on the bus 116.

While all of the cores 106 are sleeping, the chipset 114 asserts STPCLK, which wakes up each of the cores 106 (at block 502). Each of the cores 106 responsively issues a STOP GRANT message to the chipset 114 (at block 512) and goes back to sleep (at block 514). The cores 106 may sleep for an indeterminate amount of time, advantageously consuming less power than they normally would without the benefit of the power saving actions and sleeping.

Eventually, a wakeup event occurs. In the example, the chipset 114 deasserts STPCLK, which wakes up each of the cores 106 (at block 502). Each of the cores 106 responsively undoes its previous power saving actions (at block 518) and exits its microcode 208 and returns to fetching and executing user code (at block 524).

Figure 8:
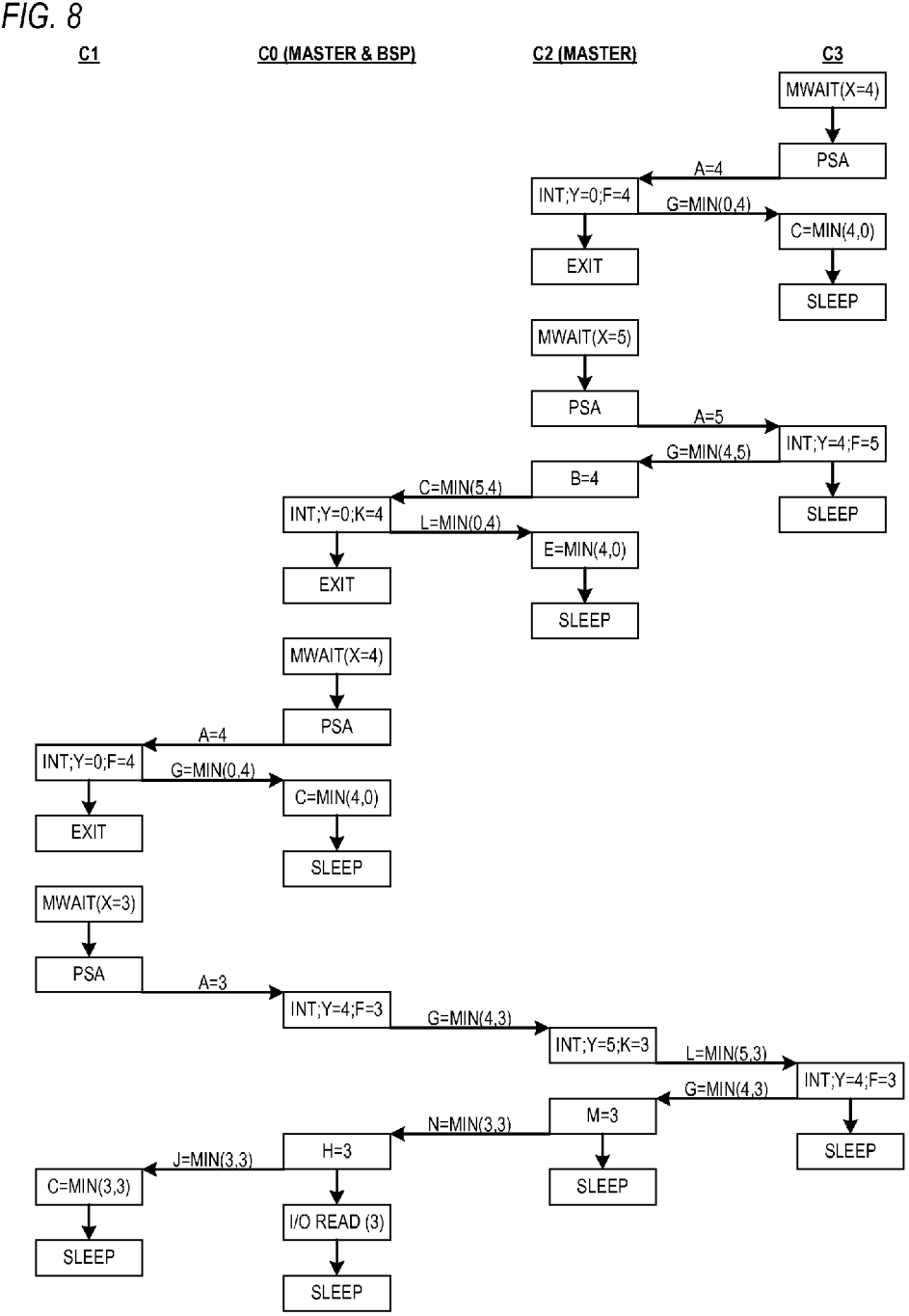
FIG. 8 is a flowchart is a flow diagram illustrating another example of operation of a composite power-state discovery process according to the description of FIGS. 3 through 6.

Referring now to FIG. 8, a flow diagram illustrating a second example of operation of the system 100 of FIG. 1 according to the description of FIGS. 3 through 6 according to the present invention is shown. The flow diagram of FIG. 8 is similar to FIG. 7; however, in the example of FIG. 8, the user programs executing on the cores 106 effectively each execute an MWAIT instruction at different times, namely after another core has gone to sleep after executing an MWAIT instruction.

Core 3 initially encounters an MWAIT instruction (at block 302) with a specified target C-state "X" of 4. Core 3 responsively performs its relevant power saving actions (at block 308) and stores "X" as its applicable C-state, denoted further below as "Y". Core 3 then sends its applicable C-state as a probe C-state to its pal, core 2, (at block 406), as indicated by the arrow with the labeled value of "A", which interrupts core 2.

Core 2 is interrupted by its pal core 3 (at block 604). Since core 2 is still in a running state, its own applicable C-state is 0, denoted "Y" (in block 604). Core 2 receives the probe C-state of core 3 (at block 434), denoted "F" and having a value of 4. Core 2 then computes its die 104 composite C-state "G" (at block 436) and returns the "G" value of 0 back to its pal core 3 (at block 442). Core 2 then exits its microcode 208 and returns to user code (at block 616).

Core 3 receives its pal core 2's synch C-state "B" of 0 (at block 408). Core 3 then also computes its die 104 composite C-state "C" (at block 412). Since the value of "C" is 0, core 3 goes to sleep (at block 316).

Core 2 subsequently encounters an MWAIT instruction (at block 302) with a specified target C-state "X" of 5. Core 2 responsively performs its relevant power saving actions (at block 308) and stores "X" as its applicable C-state, later denoted for Core 2 as "Y". Core 2 then sends "Y" (which is 5) as a probe C-state to its pal, core 3, (at block 406), as indicated by the arrow with the labeled value of "A", which interrupts core 3.

Core 3 is interrupted by its pal core 2 which wakes up core 3 (at block 502). Since core 3 previously encountered an MWAIT instruction specifying a C-state of 4, and that value is still valid, its applicable C-state is 4, denoted "Y" (in block 604). Core 3 receives the probe C-state of core 2 (at block 434), denoted "F" and having a value of 5. Core 3 then computes its die 104 composite C-state "G" (at block 436) as a minimum of the probe C-state (i.e., 5) and its own applicable C-state (i.e., 5) and returns the "G" value of 4 as a compound C-state to its pal core 2 (at block 442). Core 3 then goes back to sleep (at block 444).

Core 2 receives its pal core 3's compound C-state (at block 408), denoted "B" and having a value of 4, and then computes its die 104 composite C-state "C" value (at block 412) as a minimum of the compound C-state (i.e., 4) and its own applicable C-state (i.e., 4). Because core 2 has discovered a composite C-state of at least 2 for its lowest-level domain, but core 2, as a master of that domain, also belongs to a higher-level kinship group, it then sends its "C" value of 4 to its buddy core 0 (at block 422), which interrupts core 0.

Core 0 is interrupted by its buddy core 2 (at block 604). Since core 0 is in a running state, its applicable C-state is 0, denoted "Y" (in block 604). Core 0 receives the probe C-state of core 2 (at block 466), denoted "K" and having a value of 4. Core 0 then computes its compound C-state "L" (at block 468) and sends the "L" value of 0 to its buddy core 2 (at block 474). Core 0 then exits its microcode 208 and returns to user code (at block 616).

Core 2 receives its buddy core 0's compound C-state (at block 424), denoted "D" and having a value of 0, and then computes its own compound C-state (at block 426), which is denoted "E". Because the "E" value is 0, core 2 goes to sleep (at block 316).

Core 0 subsequently encounters an MWAIT instruction (at block 302) with a specified target C-state "X" of 4. Core 0 responsively performs its relevant power saving actions (at block 308) and stores "X" as its applicable C-state, denoted "Y." Core 0 then sends "Y" (which is 4) as a probe C-state to its pal, core 1, (at block 406), as indicated by the arrow with the labeled value of "A", which interrupts core 1.

Core 1 is interrupted by its pal core 0 (at block 604). Since core 1 is still in a running state, its applicable C-state is 0, denoted "Y" (in block 604). Core 1 receives the probe C-state of core 0 (at block 434), denoted "F" and having a value of 4. Core 1 then computes its die 104 composite C-state "G" (at block 436) and returns the "G" value of 0 to its pal core 0 (at block 442). Core 1 then exits its microcode 208 and returns to user code (at block 616).

Core 0 receives its pal core 1's compound C-state "B" of 0 (at block 408). Core 0 then computes its die 104 composite C-state "C" (at block 412). Since the value of "C" is 0, core 0 goes to sleep (at block 316).

Core 1 subsequently encounters an MWAIT instruction (at block 302) with a specified target C-state "X" of 3. Core 1 responsively stores "X" as its applicable power state "Y" and performs its relevant power saving actions (at block 308). Core 1 then sends its applicable C-state "Y" of 3 to its pal, core 0, (at block 406), as indicated by the arrow with the labeled value of "A", which interrupts core 0.

Core 0 is interrupted by its pal core 1 which wakes up core 0 (at block 502). Since core 0 previously encountered an MWAIT instruction specifying a target C-state of 4, its applicable C-state is 4, denoted "Y" (in block 604). Core 0 receives the probe C-state of core 1 (at block 434), denoted "F" and having a value of 3. Core 0 then computes its die 104 composite C-state "G" (at block 436) and sends the "G" value of 3 to its buddy core 2 (at block 446), which interrupts core 2.

Core 2 is interrupted by its buddy core 0 (at block 604) which wakes up core 2 (at block 502). Since core 2 previously encountered an MWAIT instruction specifying a C-state of 5, its applicable C-state is 5, denoted "Y" (in block 604). Core 2 receives the probe C-state of core 0 (at block 466), denoted "K" and having a value of 3. Core 2 then computes a "compound" C-state "L" (at block 468) and sends the "L" value of 3 to its pal core 3 (at block 474), which interrupts core 3.

Core 3 is interrupted by its pal core 2 which wakes up core 3 (at block 502). Since core 3 previously encountered an MWAIT instruction specifying a C-state of 4, its applicable C-state is 4, denoted "Y" (in block 604). Core 3 receives the C-state of core 2 (at block 434), denoted "F" and having a value of 3. Core 3 then computes a compound C-state "G" (at block 436) and sends the "G" value of 3 to its pal core 2 (at block 442). Because "G" now accounts for the applicable C-states of each of the cores, "G" constitutes the multi-core processor 102 composite C-state. However, since core 3 is not the BSP and was awakened from sleep, core 3 goes back to sleep (at block 614).

Core 2 receives its pal core 3's compound C-state "M" of 3 (at block 482). Core 2 then computes a compound C-state "N" (at block 484). Core 2 then sends the "N" value of 3 to its buddy core 0 (at block 486). Again, as "N" accounts for the applicable C-states of each of the cores, "N" also necessarily constitutes the multi-core processor 102 composite C-state. However, since core 2 is not the BSP and was awakened from sleep, core 2 goes back to sleep (at block 614).

Core 0 receives its buddy core 2's C-state "H" of 3 (at block 448). Core 0 then also computes a compound C-state "J" of 3 (at block 452) and sends it to its pal core 1 (at block 454). Yet again, as "J" accounts for the applicable C-states of each of the cores, "J" also necessarily constitutes the multi-core processor 102 composite C-state. And because core 0 is the BSP, it informs the chipset 114 that is may request permission to remove the bus 116 clock (at block 608). More specifically, core 0 informs the chipset 114 that the multi-core microprocessor 102 composite C-state is 3. Core 0 then goes to sleep (at block 614).

Core 1 receives its pal core 0's C-state "B" of 3 (at block 408). Core 1 also computes a compound C-state "C" (at block 412), which is 3 and which also constitutes the multi-core processor 102 composite C-state. Since core 1 is not the BSP, core 1 goes to sleep (at block 316).

Now all the cores 106 are asleep as they were in the example of FIG. 7, and events progress from there similar to the manner described with respect to FIG. 7, i.e., the chipset 114 asserts STPCLK and wakes up the cores 106, and so forth.

Notably, by the time this last synchronized power state discovery process has completed, all of the cores have separately calculated the multi-core processor 102 composite C-state.

In one embodiment, the microcode 208 is configured such that it may not be interrupted. Thus, in the example of FIG. 7, when the microcode 208 of each core 106 is invoked to process its respective MWAIT instruction, the microcode 208 is not interrupted when another core 106 attempts to interrupt it. Instead, for example, core 0 sees that core 1 has sent its C-state and gets the C-state from core 1 at block 408, thinking that core 1 sent its C-state in response to core 0 interrupting core 1 at block 406. Likewise, core 1 sees that core 0 has sent its C-state and gets the C-state from core 0 at block 408 thinking that core 0 sent its C-state in response to core 1 interrupting core 0 at block 406. Because core 0 and core 1 each take into account the other core's 106 C-state when it computes an at least partial composite C-state, each core 106 computes an at least partial composite C-state. Thus, for example, core 1 computes an at least partial composite C-state regardless of whether core 0 sent its C-state to core 1 in response to receiving an interrupt from core 1 or in response to encountering an MWAIT instruction in which case the two C-states may have crossed simultaneously over the inter-core communication wires 112 (or over the inter-die communication wires 118, or over the inter-package communication wires 1133 in the embodiment of FIG. 11). Thus, advantageously, the microcode 208 operates properly to perform decentralized power management among the cores 106 of the multi-core microprocessor 102 regardless of the order of events with respect to reception of MWAIT instructions by the various cores 106.

As may be observed from the foregoing, broadly speaking, when a core 106 encounters an MWAIT instruction, it first exchanges C-state information with its pal and both cores 106 compute an at least partial composite C-state for the die 104, which in the case of a dual-core die, for example, will be the same value, based on the C-states of the two cores 106. Master cores 106, only after computing the die 104 composite C-state, then exchange C-state information with their buddy, and both compute a composite C-state for the multi-core microprocessor 102, which will be the same value, based on the composite C-states of the two dies 104. According to this methodology, advantageously, regardless of which order the cores 106 receive their MWAIT instructions, all the cores 106 compute the same composite C-state. Furthermore, advantageously, regardless of which order the cores 106 receive their MWAIT instructions, they coordinate with one another in a distributed fashion such that the multi-core microprocessor 102 communicates as a single entity to the chipset 114 that it may request permission to engage in power saving actions that are global to the multi-core microprocessor 102, such as removing the bus 116 clock. Advantageously, this distributed C-state synchronization to accomplish an aspect of power management is performed without the need for dedicated hardware on the die 104 outside of the cores 106 to perform the power management, which may provide the following advantages: scalability, configurability, yield properties, power reduction, and/or die real estate reduction.

Figure 18:
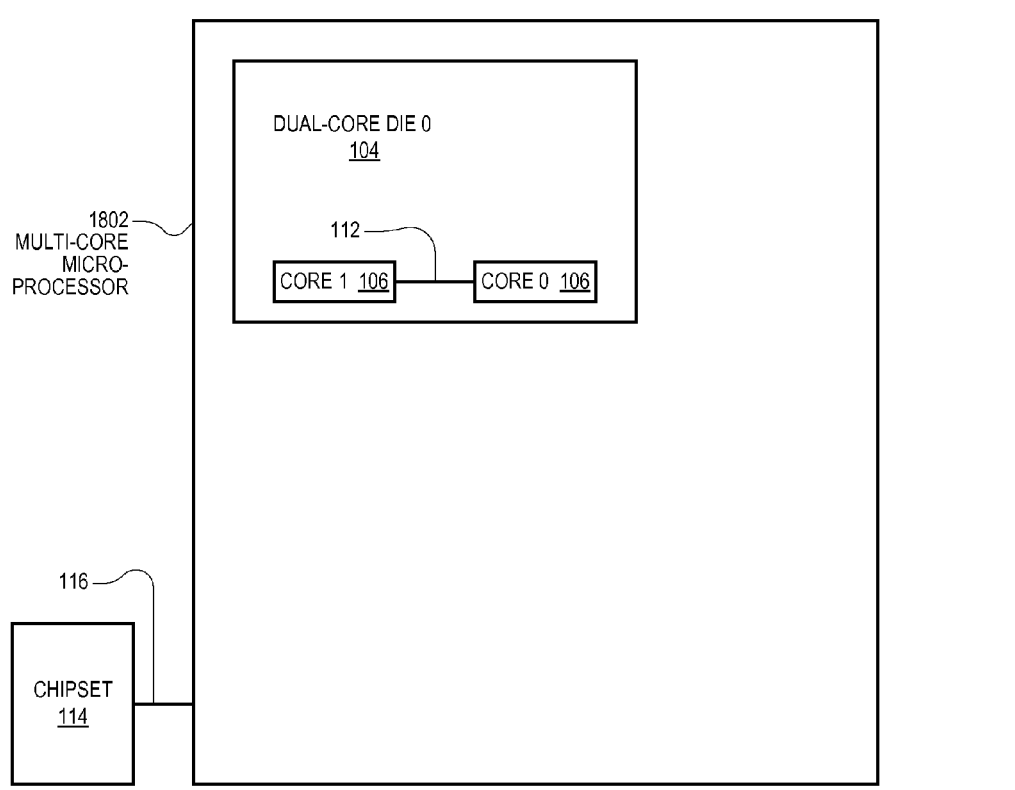
FIG. 18 is a block diagram illustrating yet another embodiment of a computer system that performs decentralized power management distributed among the cores of a dual-core, single die microprocessor.

It is noted that each core 106 of other multi-core microprocessor embodiments having different numbers and configurations of cores 106 may employ similar microcode 208 as described with respect to FIGS. 3 through 6. For example, each core 106 of a dual-core microprocessor 1802 embodiment having two cores 106 in a single die 104, such as shown in FIG. 18, may employ similar microcode 208 as described with respect to FIGS. 3 through 6 recognizing that each core 106 only has a pal and no buddy. Likewise, each core 106 of a dual-core microprocessor 1902 embodiment having two single-core dies 104, such as shown in FIG. 19, may employ similar microcode 208 as described with respect to FIGS. 3 through 6 recognizing that each core 106 only has a buddy and no pal (or alternatively redesignating the cores 106 as buddies). Likewise, each core 106 of a dual-core microprocessor 2002 embodiment having single-core single-die packages 104, such as shown in FIG. 20, may employ similar microcode 208 as described with respect to FIGS. 3 through 6 recognizing that each core 106 only has a chum and no buddy or pal (or alternatively redesignating the cores 106 as buddies).

Furthermore, each core 106 of other multi-core microprocessor embodiments having asymmetric configurations of cores 106 (such as those illustrated in FIGS. 21 and 22) may employ similar microcode 208 modified relative to FIGS. 3 through 6, such as described below with respect to FIGS. 10, 13 and 17. Furthermore, system embodiments are contemplated other than those described herein with having different numbers and configurations of cores 106 and/or packages which employ combinations of the operation of core 106 microcode 208 described below with respect to FIGS. 3 through 6 and 10, 13 and 17.

Referring now to FIG. 9, a block diagram illustrating an alternate embodiment of a computer system 900 that performs decentralized power management distributed among multiple processing cores 106 of a multi-core microprocessor 902 according to the present invention is shown. The system 900 is similar to the system of FIG. 1, and the multi-core microprocessor 902 is similar to the multi-core microprocessor 102 of FIG. 1; however, the multi-core microprocessor 902 is an octa-core microprocessor 902 that includes four dual-core dies 104, denoted die 0, die 1, die 2, and die 3, organized on a single microprocessor package. Die 0 includes core 0 and core 1, and die 1 includes core 2 and core 3, similar to FIG. 1; additionally, die 2 includes core 4 and core 5, and die 3 includes core 6 and core 7. Within each die, the cores are pals of each other, but a select core of each die is designated the master of that die.

The die masters on the package have inter-die communication wires connecting each die to every other die. This enables implementation of a coordination system in which the die masters comprise members of a peer-collaborative kinship group; that is, each die master is able to coordinate with any other die master on the package. The inter-die communication wires 118 are configured as follows. The OUT pad of die 0, the IN 1 pad of die 1, the IN 2 pin of die 2, and the IN 3 pin of die 3 are coupled to the pin P1 via a single wire net; the OUT pad of die 1, the IN 1 pad of die 2, the IN 2 pad of die 3, and the IN 3 pad of die 0 are coupled to the pin P2 via a single wire net; the OUT pad of die 2, the IN 1 pad of die 3, the IN 2 pad of die 0, and the IN 3 pad of die 1 are coupled to the pin P3 via a single wire net; the OUT pad of die 3, the IN 1 pad of die 0, the IN 2 pad of die 1, and the IN 3 pad of die 2 are coupled to the pin P4 via a single wire net.

When each of the master cores 106 wants to communicate with the other dies 104, it transmits information on its OUT pad 108 and the information is broadcast to the other dies 104 and received via the appropriate IN pad 108 by their respective master core 106. As may be observed from FIG. 9, advantageously, the number of pads 108 on each die 104 and the number of pins P on the package 902 (i.e., pads and pins related to the decentralized power management distributed among multiple cores described herein; whereas, of course the multi-core microprocessor 102 includes other pads and pins used for other purposes, such as data, address, and control buses) is no larger than the number of dies 104, which is a relatively small number. This is particularly advantageous in a pad-limited and/or pin-limited design, which may be common since standard pad/pin counts exist on standard dies/packages and it is economically efficient for a microprocessor manufacturer to attempt to conform to the standard values, and most of the pads/pins may be already used. Furthermore, alternate embodiments are described below in which the number of pads 108 on each die 104 is, or may be, less than the number of dies 104.

Figure 10A:
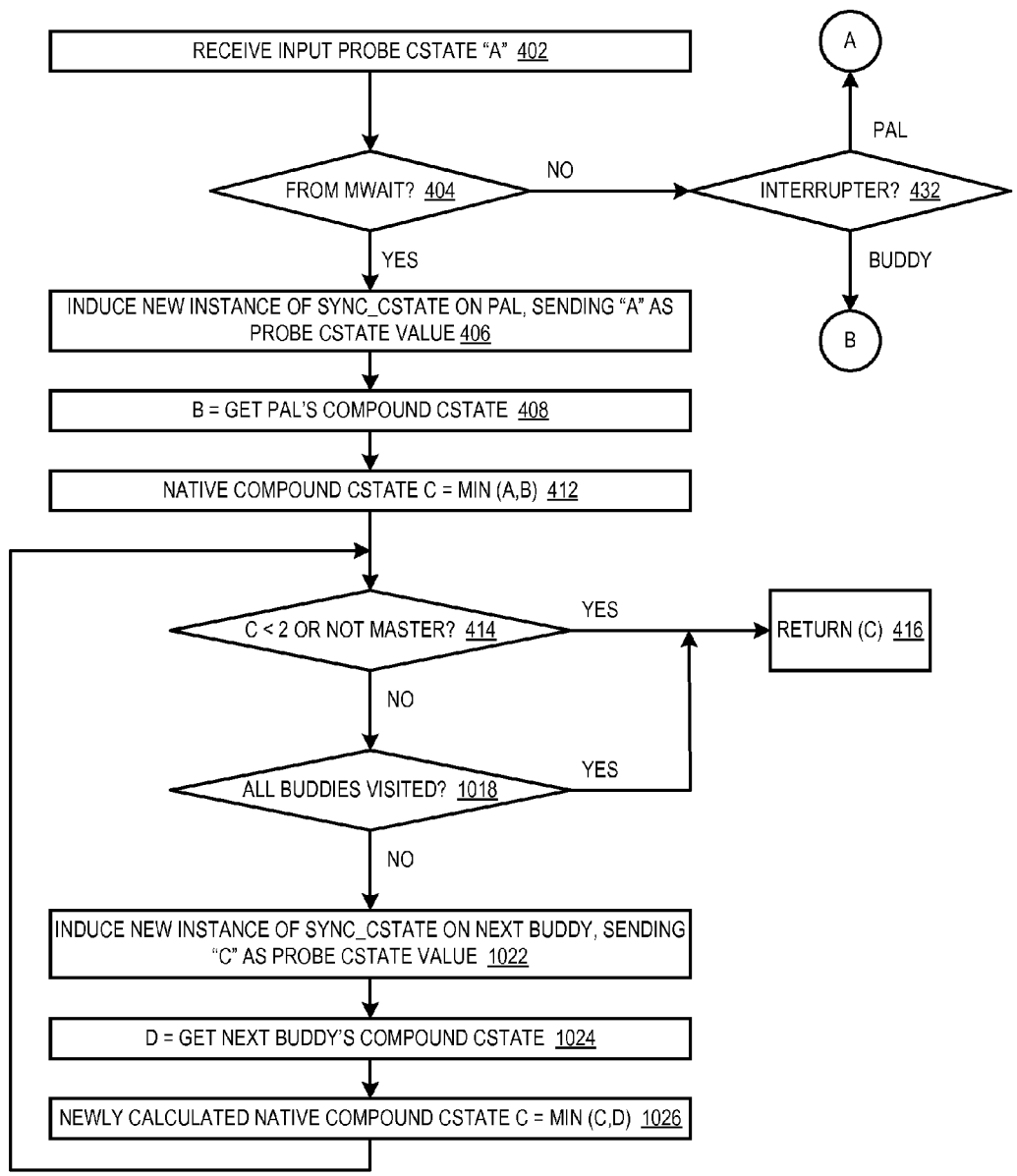
FIGS. 10A-10C is a flowchart illustrating operation, by a core, of one embodiment of a power-state synchronization routine integral to a composite power state discovery process of the system of FIG. 9.
Figure 10B:
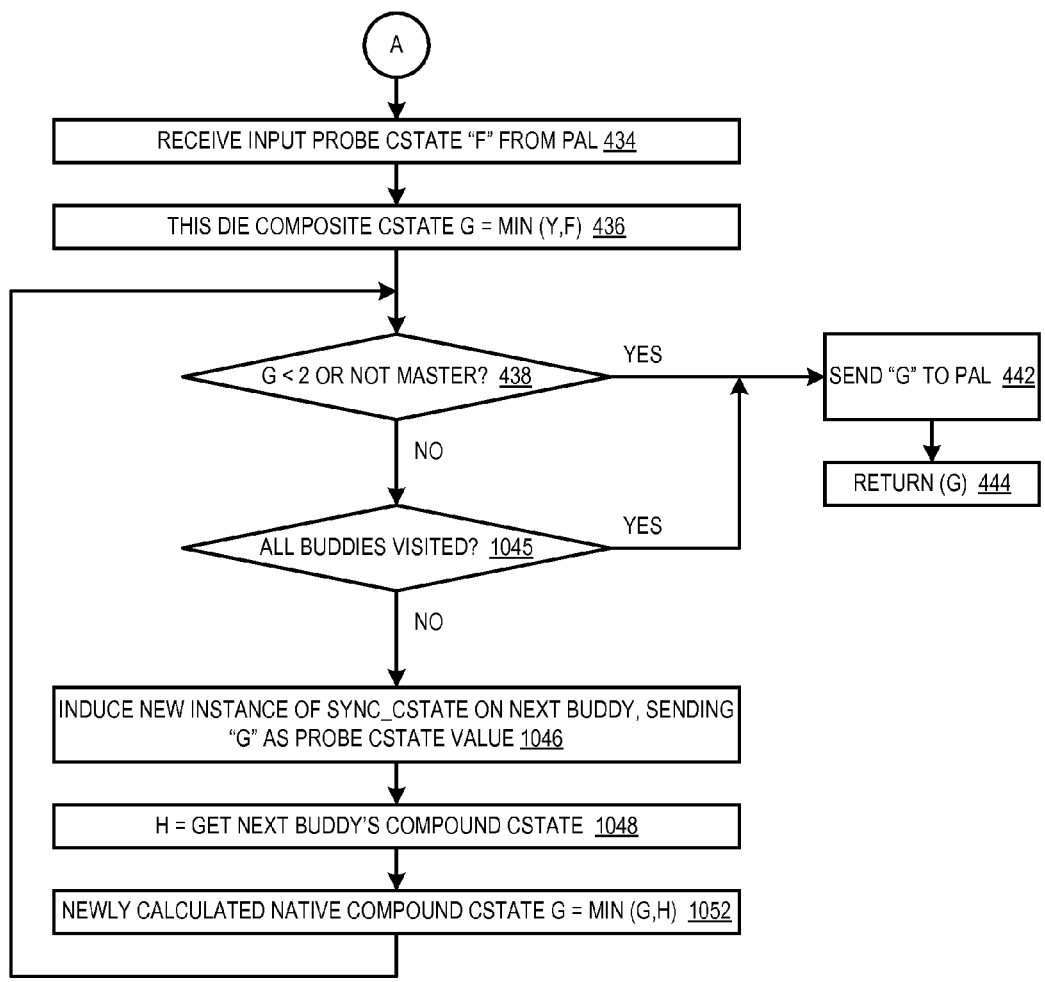
Figure 10C:
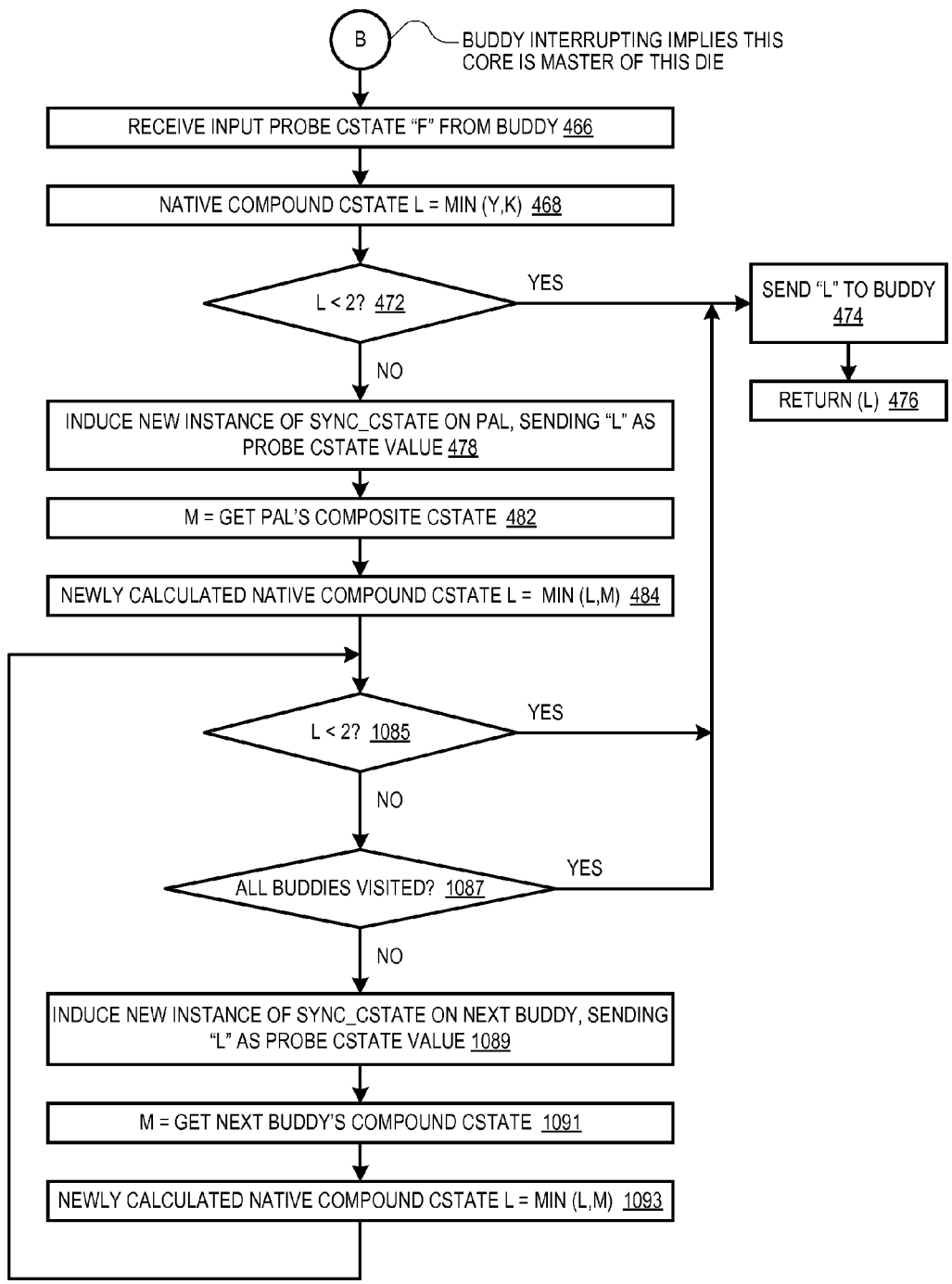

Referring now to FIG. 10, a flowchart illustrating operation of the system 900 of FIG. 9 to perform decentralized power management distributed among the multiple processing cores 106 of the octa-core microprocessor 902 according to the present invention is shown. More specifically, the flowchart of FIG. 10 illustrates operation of the sync_cstate microcode 208 of FIG. 3 (and FIG. 6), similar to the flowchart of FIG. 4, which are alike in many respects, and like-numbered blocks are similar. However, the sync_cstate microcode 208 of the cores 106 described in the flowchart of FIG. 10 accounts for the presence of eight cores 106 rather than the four cores 106 in the embodiment of FIG. 1, and the differences are now described. In particular, each master core 106 of a die 104 has three buddy cores 106 rather than one buddy core 106. Moreover, the master cores 106 together define a peer-collaborative kinship group in which any buddy can directly coordinate with any other buddy, without mediation by the package master or BSP.

Flow begins in FIG. 10 at block 402 and proceeds through block 416 as described with respect to FIG. 4. However, FIG. 10 does not include blocks 422, 424, 426, or 428. Rather, flow proceeds from decision block 414 out of the "NO" branch to decision block 1018.

At decision block 1018, the sync_cstate microcode 208 determines whether all of its buddies have been visited, i.e., whether the core 106 has exchanged a C-state with each of its buddies via blocks 1022 and 1024. If so, flow proceeds to block 416; otherwise, flow proceeds to block 1022.

At block 1022, the sync_cstate microcode 208 induces a new instance of sync_cstate on its next buddy by programming the CSR 234 of FIG. 2 to send to its next buddy the "C" value and to interrupt the buddy. In the case of the first buddy, the "C" value sent was computed at block 412; in the case of the remaining buddies, the "C" value was computed at block 1026. In the loop comprising blocks 414, 1018, 1022, 1024, and 1026, the microcode 208 keeps track of which of the buddies it has visited to insure that it visits each of them (unless the condition at decision block 414 is found to be true).

Flow proceeds to block 1024. At block 1024, the sync_cstate microcode 208 programs the CSR 234 to detect that the next buddy has returned a compound C-state and obtains the compound C-state, denoted "D".

Flow proceeds to block 1026. At block 1026, the sync_cstate microcode 208 computes a newly calculated native compound C-state, denoted "C", by computing the minimum value of the "C" and "D" values. Flow returns to decision block 414.

Flow proceeds in FIG. 10 from block 434 and proceeds through block 444 as described with respect to FIG. 4. However, FIG. 10 does not include blocks 446, 448, 452, 454, or 456. Rather, flow proceeds from decision block 438 out of the "NO" branch to decision block 1045.

At decision block 1045, the sync_cstate microcode 208 determines whether all of its buddies have been visited, i.e., whether the core 106 has exchanged a C-state with each of its buddies via blocks 1046 and 1048. If so, flow proceeds to block 442; otherwise, flow proceeds to block 1046.

At block 1046, the sync_cstate microcode 208 induces a new instance of the sync_cstate routine on its next buddy by programming the CSR 234 to send to its next buddy the "G" value and to interrupt the buddy. In the case of the first buddy, the "G" value sent was computed at block 436; in the case of the remaining buddies, the "G" value was computed at block 1052.

Flow proceeds to block 1048. At block 1048, the microcode 208 programs the CSR 234 to detect that the next buddy has returned a compound C-state to the core 106 and obtains the compound C-state, denoted "H".

Flow proceeds to block 1052. At block 1052, the sync_cstate microcode 208 computes a newly calculated native compound C-state, denoted "G", by computing the minimum value of the "G" and "H" values. Flow returns to decision block 438.

Flow proceeds in FIG. 10 from block 466 and proceeds through block 476 as described with respect to FIG. 4. It is noted that at block 474, the buddy to whom the core 106 sends the "L" value is the buddy that interrupted the core 106. Additionally, flow proceeds in FIG. 10 from decision block 472 out of the "NO" branch and proceeds through block 484 as described with respect to FIG. 4. However, FIG. 10 does not include blocks 486 or 488. Rather, flow proceeds from block 484 to decision block 1085.

At decision block 1085, if the "L" value is less than 2, flow proceeds to block 474; otherwise, flow proceeds to decision block 1087. In the case that flow proceeded to decision block 1085 from block 484, the "L" value was computed at block 484; in the case that flow proceeded to decision block 1085 from block 1093, the "L" value was computed at block 1093. Flow proceeds to decision block 1087.

At decision block 1087, the synch_cstate microcode 208 determines whether all of its buddies have been visited, i.e., whether the core 106 has exchanged a C-state with or received a C-state from each of its buddies. In the case of the interrupting buddy, the C-state was received via block 466 (and will be sent via block 474); thus, the interrupting buddy is considered to have been visited already; in the case of the remaining buddies, the C-state is exchanged via blocks 1089 and 1091. If all of its buddies have been visited, flow proceeds to block 474; otherwise, flow proceeds to block 1089.

At block 1089, the microcode 208 induces a new instance of the sync_cstate routine on its next buddy by programming the CSR 234 to send to its next buddy the "L" value and to interrupt the buddy. In the case of the first buddy, the "L" value sent was computed at block 484; in the case of the remaining buddies, the "L" value was computed at block 1093.

Flow proceeds to block 1091. At block 1091, the microcode 208 programs the CSR 234 to detect that the next buddy has returned a compound C-state to the core 106 and obtains the compound C-state, denoted "M".

Flow proceeds to block 1093. At block 1093, the sync_cstate microcode 208 computes a newly calculated value of the native compound C-state, denoted "L", by computing the minimum value of the "L" and "M" values. Flow returns to decision block 1085.

Referring now to FIG. 11, a block diagram illustrating an alternate embodiment of a computer system 1100 that performs decentralized power management distributed among multiple processing cores 106 of two multi-core microprocessors 102 according to the present invention is shown. The system 1100 is similar to the system 100 of FIG. 1, and the two multi-core microprocessors 102 are each similar to the multi-core microprocessor 102 of FIG. 1; however, the system includes two of multi-core microprocessors 102 coupled together to provide an octa-core system 1100. Thus, the system 1100 of FIG. 11 is also similar to system 900 of FIG. 9 in that it includes four dual-core dies 104, denoted die 0, die 1, die 2, and die 3. Die 0 includes core 0 and core 1, die 1 includes core 2 and core 3, die 2 includes core 4 and core 5, and die 3 includes core 6 and core 7. However, die 0 and die 1 are included in the first multi-core microprocessor package 102, and die 2 and die 3 are included in the second multi-core microprocessor package 102. Thus, although the cores 106 are distributed among multiple multi-core microprocessor packages 102 in the embodiment of FIG. 11, the cores 106 nevertheless share some power management-related resources, namely the bus 116 clock supplied by the chipset 114 and the chipset's 114 policy to snoop or not snoop caches on the processor bus, such that the chipset 114 expects the single I/O Read transaction on the bus 116 from the predetermined I/O port address. Additionally, the cores 106 of the two packages 102 potentially share a VRM, and cores 106 of a die 104 may share a PLL, as mentioned above. Advantageously, the cores 106 of the system 1100 of FIG. 11, particularly the microcode 208 of the cores 106, are configured to communicate with one another to coordinate control of the shared power management-related resources in a decentralized fashion using the inter-core communication wires 112, inter-die communication wires 118, and inter-package communication wires 1133 (described below), as described herein and in Ser. No. 13/299,225.

The inter-die communication wires 118 of the first multi-core microprocessor 102 are configured as in FIG. 1. However, the pins of the second multi-core microprocessor 102 are denoted "P5", "P6", "P7", and "P8", and the inter-die communication wires 118 of the second multi-core microprocessor 102 are configured as follows. The IN 2 pad of die 2 and the IN 3 pad of die 3 are coupled to the pin P5 via a single wire net; the IN 1 pad of die 2 and the IN 2 pad of die 3 are coupled to the pin P6 via a single wire net; the OUT pad of die 2 and the IN 1 pad of die 3 are coupled to the pin P7 via a single wire net; the OUT pad of die 3 and the IN 3 pad of die 2 are coupled to the pin P8 via a single wire net. Furthermore, via inter-package communication wires 1133 of a motherboard of the system 1100, the pin P1 of the first multi-core microprocessor 102 is coupled to the pin P7 of the second multi-core microprocessor 102, such that the OUT pad of die 0, the IN 1 pad of die 1, the IN 2 pad of die 2, and the IN 3 pad of die 3 are all coupled together via a single wire net; the pin P2 of the first multi-core microprocessor 102 is coupled to the pin P8 of the second multi-core microprocessor 102, such that the OUT pad of die 1, the IN 1 pad of die 2, the IN 2 pad of die 3, and the IN 3 pad of die 0 are all coupled together via a single wire net; the pin P3 of the first multi-core microprocessor 102 is coupled to the pin P5 of the second multi-core microprocessor 102, such that the OUT pad of die 0, the IN 1 pad of die 1, the IN 2 pad of die 2, and the IN 3 pad of die 3 are all coupled together via a single wire net; and the pin P4 of the first multi-core microprocessor 102 is coupled to the pin P6 of the second multi-core microprocessor 102, such that the OUT pad of die 0, the IN 1 pad of die 1, the IN 2 pad of die 2, and the IN 3 pad of die 3 are all coupled together via a single wire net. The CSR 234 of FIG. 2 are also coupled to the inter-package communication wires 1133 to enable the microcode 208 also to program the CSR 234 to communicate with the other cores 106 via the inter-package communication wires 1133. Thus, the master core 106 of each die 104 is enabled to communicate with the master core 106 of each other die 104 (i.e., its buddies) via the inter-package communication wires 1133 and the inter-die communication wires 118. When each of the master cores 106 wants to communicate with the other dies 104, it transmits information on its OUT pad 108 and the information is broadcast to the other dies 104 and received via the appropriate IN pad 108 by their respective master core 106. As may be observed from FIG. 11, advantageously, with respect to each multi-core microprocessor 102, the number of pads 108 on each die 104 and the number of pins P on the package 102 is no larger than the number of dies 104, which is a relatively small number.

Noting again that for a given master core 106 of a die 104, the master core 106 of every other die 104 is a "buddy" core 106 of the given master core 106, it may be observed from FIG. 11 that core 0, core 2, core 4, and core 6 are buddies similar to the configuration in FIG. 9, even though in FIG. 9 all of the four dies 104 are contained in a single octa-core microprocessor package 902, whereas in FIG. 11 the four dies 104 are contained in two separate quad-core microprocessor packages 102. Thus, the microcode 208 described with respect to FIG. 10 is configured to also operate in the system 1100 of FIG. 11. Moreover, all four buddy cores 106 together form a peer-collaborative kinship group, wherein each buddy core 106 is enabled to directly coordinate with any other of the buddy cores 106 without mediation by whichever buddy core 106 is designated as the BSP core.

Figure 12:
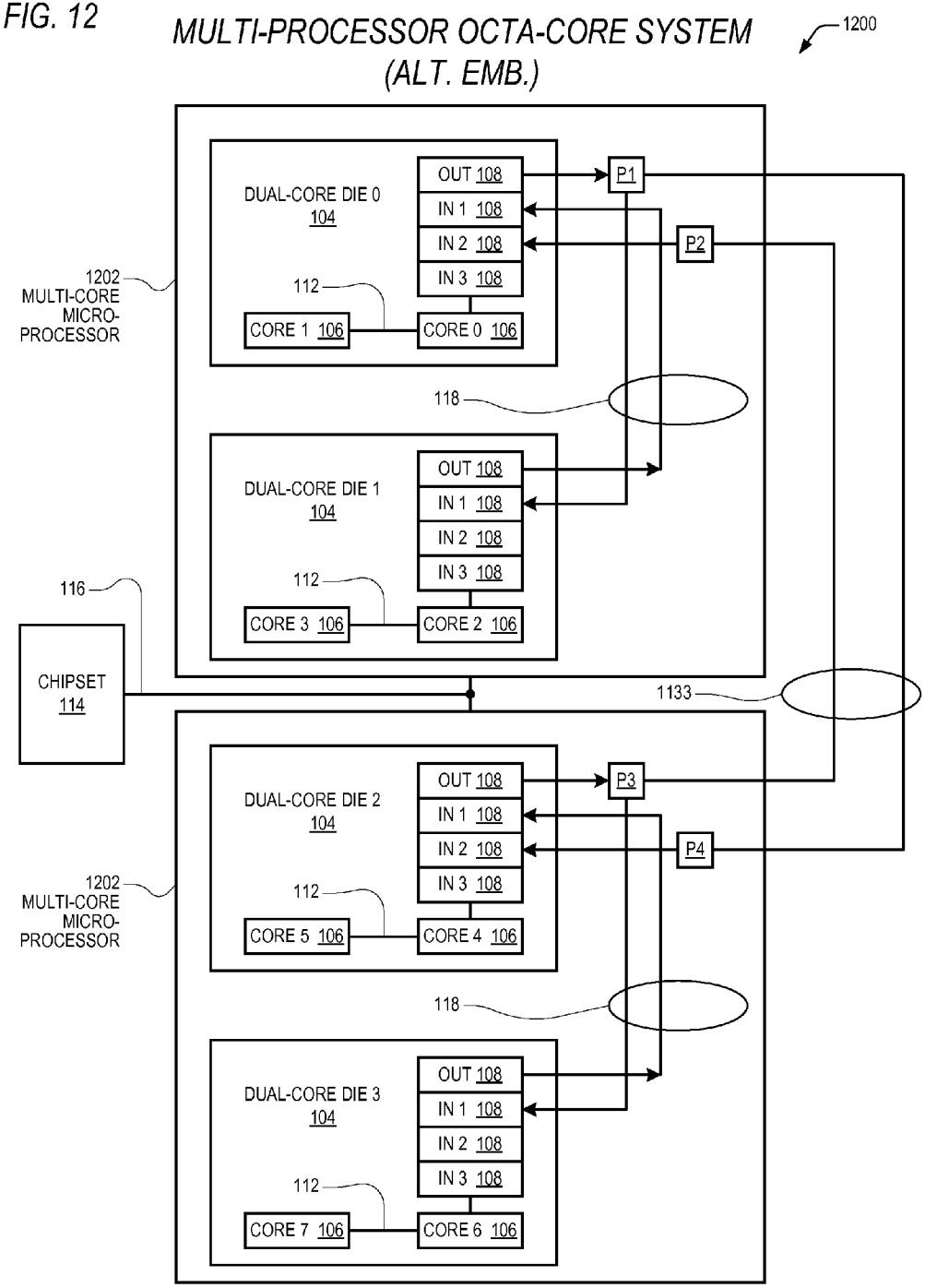
FIG. 12 is a block diagram illustrating another embodiment of a computer system that performs decentralized power management distributed among multiple processing cores of an octa-core microprocessor, that, like FIG. 11, has four dual-core dies, but whose cores, unlike
Figure 13A:
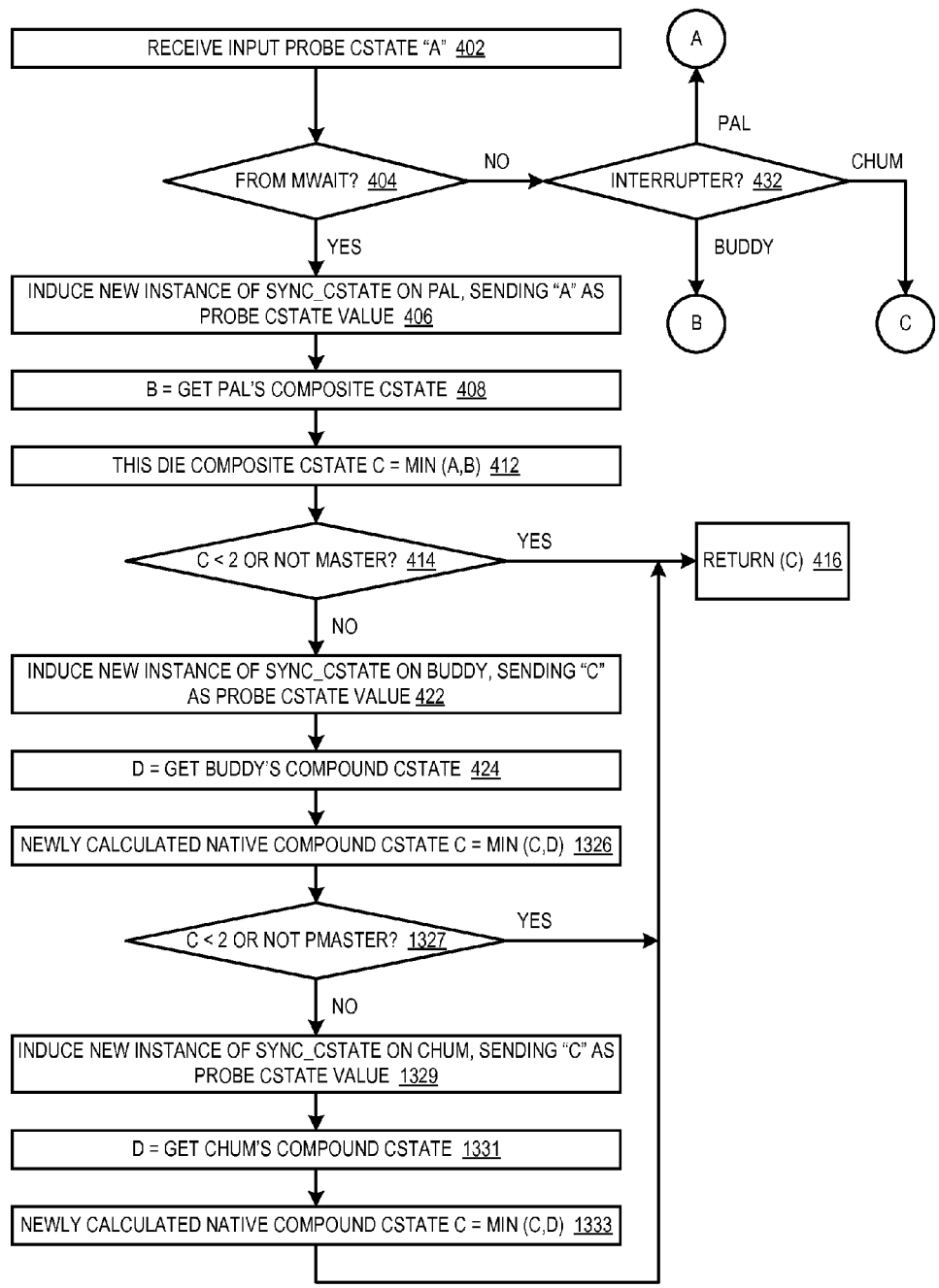
FIGS. 13A-13D is a flowchart illustrating operation, by a core, of one embodiment of a power-state synchronization routine integral to a composite power state discovery process of the system of FIG. 12.
Figure 13B:
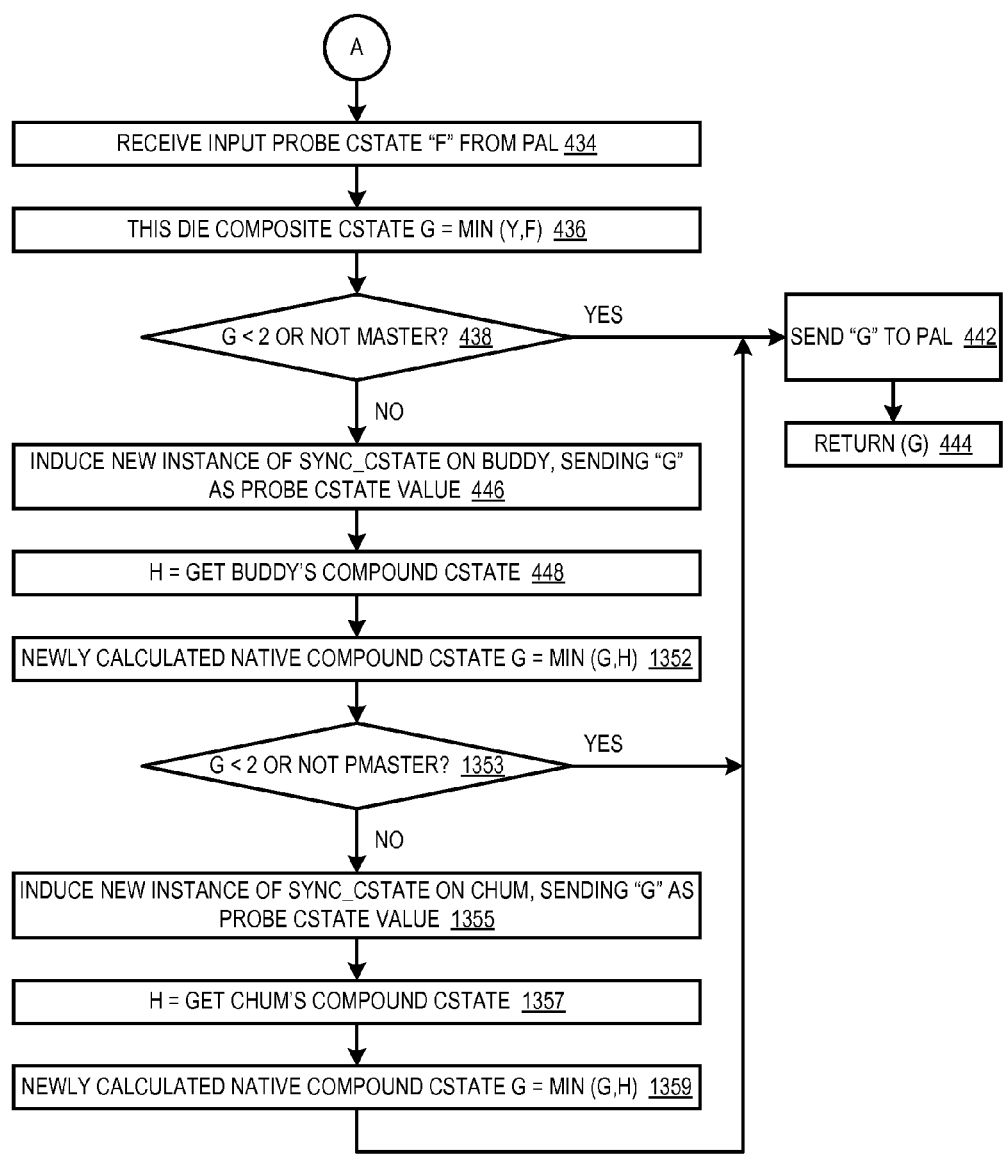
Figure 13C:
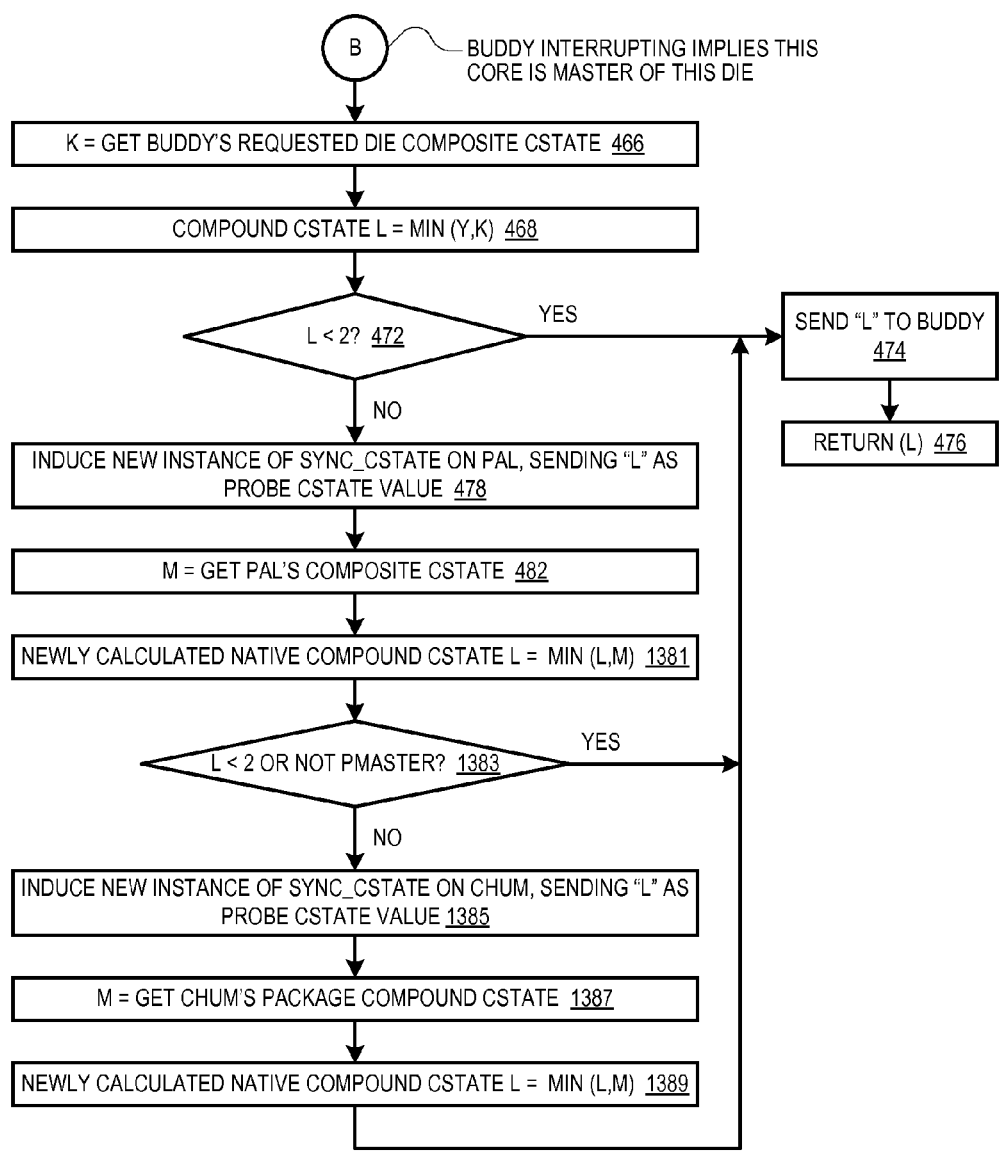
Figure 13D:
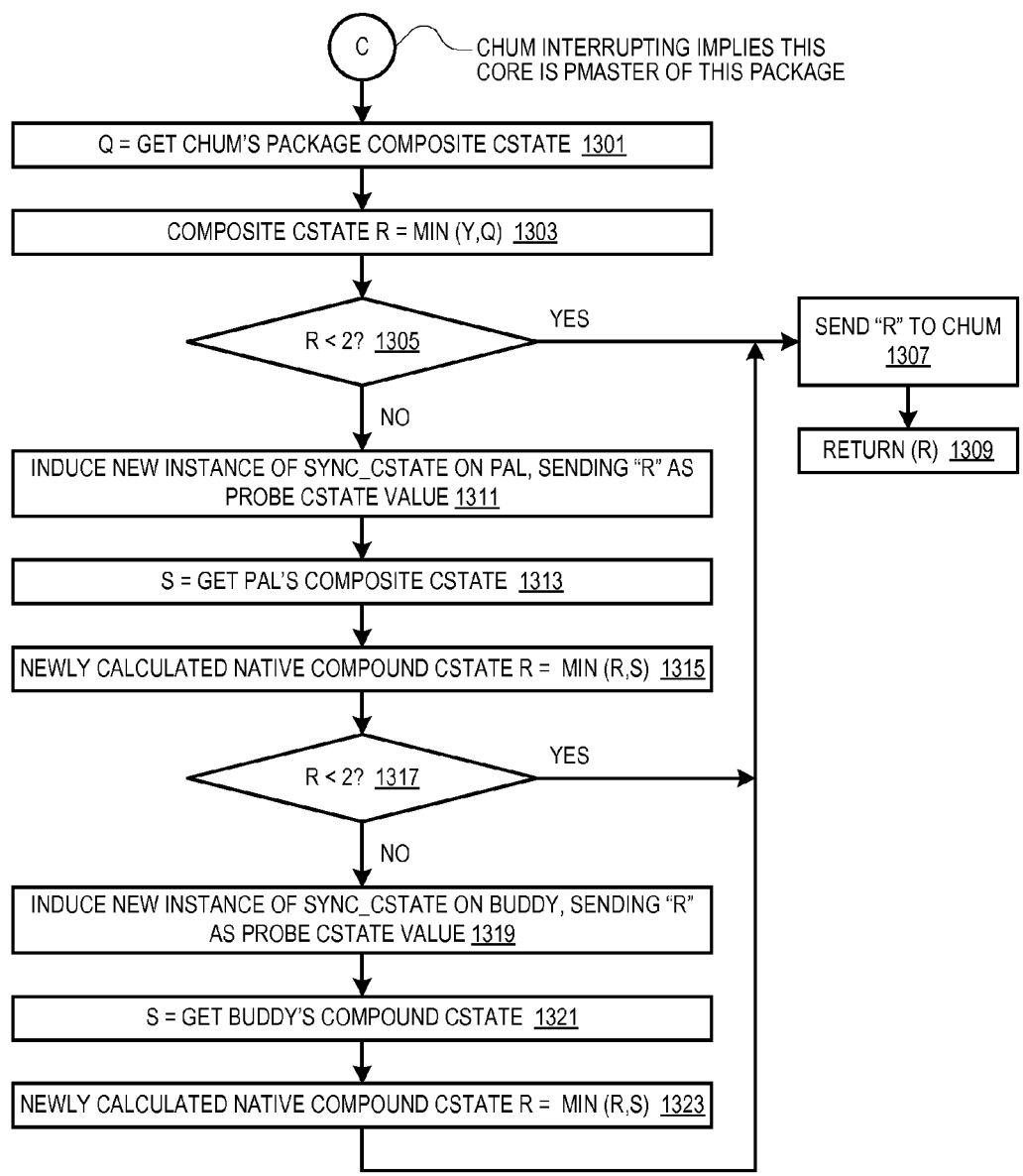

It is further noted that whereas the pins P are necessary in the multiprocessor embodiments, such as those of FIG. 11 and FIG. 12, the pins may be omitted in the single multi-core microprocessor 102 embodiments if necessary, although they are helpful for debugging purposes.

Referring now to FIG. 12, a block diagram illustrating an alternate embodiment of a computer system 1200 that performs decentralized power management distributed among multiple processing cores 106 of two multi-core microprocessors 1202 according to the present invention is shown. The system 1200 is similar to the system 1100 of FIG. 11 and the multi-core microprocessors 1202 are similar to the multi-core microprocessors 102 of FIG. 11. However, the eight cores of system 1200 are organized and physically connected by sideband wires in accordance with a deeper hierarchical coordination system.

Each die 104 has only three pads 108 (OUT, IN 1, and IN 2) for coupling to the inter-die communication wires 118; each package 1202 has only two pins, denoted P1 and P2 on the first multi-core microprocessor 1202 and denoted P3 and P4 on the second multi-core microprocessor 1202; and the inter-die communication wires 118 and the inter-package communication wires 1133 that connect the two multi-core microprocessors 1202 of FIG. 12 have a different configuration than their counterparts of FIG. 11.

In the system 1200 of FIG. 12, core 0 and core 4 are designated as "package masters" or "pmasters" of their respective multi-core microprocessor 1202. Furthermore, the term "chum," unless otherwise indicated, is used herein to refer to pmaster cores 106 on different packages 1202 that communicate with one another; thus, in the embodiment of FIG. 12, core 0 and core 4 are chums. The inter-die communication wires 118 of the first multi-core microprocessor 1202 are configured as follows. Within the first package 1202, the OUT pad of die 0 and the IN 1 pad of die 1 are coupled to the pin P1 via a single wire net; the OUT pad of die 1 and the IN 1 pad of die 0 are coupled via a single wire net; and the IN 2 pad of die 0 is coupled to pin P2. Within the second package 1201, the OUT pad of die 2 and the IN 1 pad of die 3 are coupled to the pin P3 via a single wire net; the OUT pad of die 3 and the IN 1 pad of die 2 are coupled via a single wire net; and the IN 2 pad of die 2 is coupled to pin P4. Furthermore, via inter-package communication wires 1133 of the motherboard of the system 1200, pin P1 is coupled to pin P4, such that the OUT pad of die 0, the IN 1 pad of die 1, and the IN 2 pad of die 2 are all coupled together via a single wire net; and pin P2 is coupled to pin P3, such that the OUT pad of die 2, the IN 1 pad of die 3, and the IN 2 pad of die 0 are all coupled together via a single wire net.

Thus, unlike in the system 900 of FIG. 9 and in the system 1100 of FIG. 11 in which every master core 106 can communicate with every other master core 106, in the system 1200 of FIG. 12, only master core 0 and master core 4 can communicate (that is, between via the sideband wires described herein) with one another. An advantage of the embodiment of FIG. 12 over FIG. 11 is that, with respect to each multi-core microprocessor 1202, the number of pads 108 on each die 104 is (one) less than the number of dies 104, and the number of pins P on each package 1202 is (two) less than the number of dies 104, which is a relatively small number. Additionally, the number of C-state exchanges between cores 106 may be less. In one embodiment, for debugging purposes, the first multi-core microprocessor 1202 also includes a third pin coupled to the OUT pad 108 of die 1 and the second multi-core microprocessor 1202 also includes a third pin coupled to the OUT pad 108 of die 3.

Referring now to FIG. 13, a flowchart illustrating operation of the system 1200 of FIG. 12 to perform decentralized power management distributed among the multiple processing cores 106 of the dual-quad-core microprocessor 1202 (octa-core) system 1200 according to the present invention is shown. More specifically, the flowchart of FIG. 13 illustrates operation of the sync_cstate microcode 208 of FIG. 3 (and FIG. 6), similar to the flowcharts of FIGS. 4 and 10, which are alike in many respects, and like-numbered blocks are similar. However, the sync_cstate microcode 208 of the cores 106 described in the flowchart of FIG. 13 accounts for the fact that the configuration of the inter-die communication wires 118 and inter-package communication wires 1133 is different between the system 1200 of FIG. 12 and the system 1100 of FIG. 11, specifically that some of the master cores 106 (namely core 2 and core 4) are not configured to communicate directly with all the other master cores 106 of the system 1200, but instead the chums (core 0 and core 4) communicate in a hierarchical fashion down to their buddies (core 2 and core 6, respectively), which in turn communicate down to their pal cores 106. The differences are now described.

Flow begins in FIG. 13 at block 402 and proceeds through block 424 as described with respect to FIG. 4. However, FIG. 10 does not include blocks 426 or 428. Rather, flow proceeds from block 424 to block 1326. Additionally, at decision block 432, if the interrupting core 106 is a chum rather than a pal or buddy, flow proceeds to block 1301.

At block 1326, the sync_cstate microcode 208 computes a newly calculated value of the (native) compound C-state, denoted "C", by computing the minimum value of the "C" and "D" values.

Flow proceeds to decision block 1327. At decision block 1327, if the "C" value computed at block 1326 is less than 2 or the core 106 is not the package master core 106, flow proceeds to block 416; otherwise, flow proceeds to block 1329.

At block 1329, the sync_cstate microcode 208 induces a new instance of sync_cstate on its chum by programming the CSR 234 to send to its chum the "C" value computed at block 1326 and to interrupt the chum. This requests the chum to calculate and return a compound C-state, which, under circumstances similar to that described above in connection with FIG. 4, may constitute the composite C-state of the entire processor, and to provide it back to this core 106.

Flow proceeds to block 1331. At block 1331, the sync_cstate microcode 208 programs the CSR 234 to detect that the chum has returned a compound C-state to the core 106 and obtains the compound C-state, denoted "D".

Flow proceeds to block 1333. At block 1333, the sync_cstate microcode 208 computes a newly calculated compound C-state, denoted "C", by computing the minimum value of the "C" and "D" values. It is noted that, assuming D is at least 2, then once flow proceeds to block 1333, the C-state of every core 106 in the system 1200 has been considered in the composite C-state calculation of the "C" value at block 1333; thus, the composite C-state is referred to as the system 1200 composite C-state here. Flow proceeds to block 416.

Flow proceeds in FIG. 13 from block 434 and proceeds through blocks 444 and 448 as described with respect to FIG. 4. However, FIG. 13 does not include blocks 452, 454, or 456. Rather, flow proceeds from block 448 to block 1352.

At block 1352, the sync_cstate microcode 208 computes a newly calculated native compound C-state, denoted "G", by computing the minimum value of the "G" and "H" values.

Flow proceeds to decision block 1353. At decision block 1353, if the "G" value computed at block 1352 is less than 2 or the core 106 is not the package master core 106, flow proceeds to block 442; otherwise, flow proceeds to block 1355.

At block 1355, the sync_cstate microcode 208 induces a new instance of sync_cstate on its chum by programming the CSR 234 to send to its chum the "G" value computed at block 1352 and to interrupt the chum. This requests the chum to calculate and return a compound C-state back to this core 106.

Flow proceeds to block 1357. At block 1357, the sync_cstate microcode 208 programs the CSR 234 to detect that the chum has returned a compound C-state to the core 106 and obtains the compound C-state, denoted "H". Flow proceeds to block 1359.

At block 1359, the sync_cstate microcode 208 computes a newly calculated native compound C-state, denoted "G", by computing the minimum value of the "G" and "H" values. It is noted that, assuming H is at least 2, then once flow proceeds to block 1359, the C-state of every core 106 in the system 1200 has been considered in the composite C-state calculation of the "G" value at block 1359; thus, the composite C-state is referred to as the system 1200 composite C-state here. Flow proceeds to block 442.

Flow proceeds in FIG. 13 from block 466 and proceeds through blocks 476 and 482 as described with respect to FIG. 4. However, FIG. 13 does not include blocks 484, 486, or 488. Rather, flow proceeds from block 482 to block 1381.

At block 1381, the sync_cstate microcode 208 computes a newly calculated native compound C-state denoted "L", by computing the minimum value of the "L" and "M" values.

Flow proceeds to decision block 1383. At decision block 1383, if the "L" value computed at block 1381 is less than 2 or the core 106 is not the package master core 106, flow proceeds to block 474; otherwise, flow proceeds to block 1385.

At block 1385, the sync_cstate microcode 208 induces a new instance of sync_cstate on its chum by programming the CSR 234 to send to its chum the "L" value computed at block 1381 and to interrupt the chum. This requests the chum to calculate and return a compound C-state back to this core 106.

Flow proceeds to block 1387. At block 1387, the sync_cstate microcode 208 programs the CSR 234 to detect that the chum has returned a compound C-state to the core 106 and obtains the compound C-state, denoted "M". Flow proceeds to block 1389.

At block 1389, the sync_cstate microcode 208 computes a newly calculated native synced C-state, denoted "L", by computing the minimum value of the "L" and "M" values. It is noted that, assuming M is at least 2, then once flow proceeds to block 1389, the C-state of every core 106 in the system 1200 has been considered in the composite C-state calculation of the "L" value at block 1389; thus, the composite C-state is referred to as the system 1200 composite C-state here. Flow proceeds to block 474. As stated above, at decision block 432, if the interrupting core 106 is a chum rather than a pal or buddy, flow proceeds to block 1301.

At block 1301, the core 106 was interrupted by its chum, so the microcode 208 programs the CSR 234 to obtain from its chum the chum's composite C-state, denoted "Q" in FIG. 13. It is noted that if the chum would not have invoked this instance of synch_cstate if it has not already determined a composite C-state for its package of at least 2.

Flow proceeds to block 1303. At block 1303, the sync_cstate microcode 208 computes a native compound C-state, denoted "R", as the minimum value of its applicable C-state "Y" value and the "Q" value received at block 1301.

Flow proceeds to decision block 1305. At decision block 1305, if the "R" value computed at block 1303 is less than 2, flow proceeds to block 1307; otherwise, flow proceeds to block 1311.

At block 1307, in response to the request via the inter-core interrupt from its chum, the microcode 208 programs the CSR 234 to send to its chum the "R" value computed at block 1303. Flow proceeds to block 1309. At block 1309 the routine returns to its caller the "R" value computed at block 1303. Flow ends at block 1309.

At block 1311, the sync_cstate microcode 208 induces a new instance of sync_cstate on its pal by programming the CSR 236 to send to its pal the "R" value computed at block 1303 and to interrupt the pal. This requests the pal to calculate and return a compound C-state to the core 106.

Flow proceeds to block 1313. At block 1313, the sync_cstate microcode 208 programs the CSR 236 to detect that the pal has returned a compound C-state to the core 106 and obtains the pal compound C-state, denoted "S" in FIG. 13.

Flow proceeds to block 1315. At block 1315, the sync_cstate microcode 208 computes a newly calculated native compound C-state, denoted "R", by computing the minimum value of the "R" and "S" values.

Flow proceeds to decision block 1317. At decision block 1317, if the "R" value computed at block 1315 is less than 2, flow proceeds to block 1307; otherwise, flow proceeds to block 1319.

At block 1319, the sync_cstate microcode 208 induces a new instance of sync_cstate on its buddy by programming the CSR 234 to send to its buddy the "R" value computed at block 1315 and to interrupt the buddy. This requests the buddy calculate and return a compound C-state to this core 106.

Flow proceeds to block 1321. At block 1321, the sync_cstate microcode 208 programs the CSR 234 to detect that the buddy has returned a compound C-state to the core 106 and obtains the compound C-state, denoted "S".

Flow proceeds to block 1323. At block 1323, the sync_cstate microcode 208 computes a newly calculated native compound C-state, denoted "R", by computing the minimum value of the "R" and "S" values. It is noted that, provided S is at least 2, then once flow proceeds to block 1323, the C-state of every core 106 in the system 1200 has been considered in the calculation of the "R" value at block 1323; thus, "R" constitutes the composite C-state of the system 1200. Flow proceeds to block 1307.

Referring now to FIG. 14, a block diagram illustrating an alternate embodiment of a computer system 1400 that performs decentralized power management distributed among multiple processing cores 106 of a multi-core microprocessor 1402 according to the present invention is shown. The system 1400 is similar in some ways to the system 900 of FIG. 9 in that is includes a single octa-core microprocessor 1402 having four dual-core dies 104 on a single package coupled together via inter-die communication wires 118. However, the eight cores of system 1400 are organized and physically connected by sideband wires in accordance with a deeper, three-level, hierarchical coordination system.

First, the configuration of the inter-die communication wires 118 is different from that of FIG. 9, as described below. Notable, the system 1400 is similar in some ways to the system 1200 of FIG. 12, in which the cores are also organized and physically connected in accordance with a three-level hierarchical coordination system. Each of the four dies 104 includes three pads 108 for coupling to the inter-die communication wires 118, namely the OUT pad, the IN 1 pad, and the IN 2 pad. The multi-core microprocessor 1402 of FIG. 14 includes four pins denoted "P1", "P2", "P3", and "P4". The configuration of the inter-die communication wires 118 of the multi-core microprocessor 1402 of FIG. 14 is as follows. The OUT pad of die 0, the IN 1 pad of die 1, and the IN 2 pad of die 2 are all coupled together via a single wire net that is coupled to pin P1; the OUT pad of die 1 and the IN 1 pad of die 0 are coupled together via a single wire net that is coupled to pin P2; the OUT pad of die 2, the IN 1 pad of die 3, and the IN 2 pad of die 0 are all coupled together via a single wire net that is coupled to pin P3; the OUT pad of die 3 and the IN 1 pad of die 2 are coupled together via a single wire net that is coupled to pin P4.

The cores 106 of FIG. 14 are configured to operate according to the description of FIG. 13 with the understanding that core 0 and core 4 are considered chums even though they are in the same package 1402, contrary to the meaning of the term "chum" stated with respect to FIG. 12 above, and that the chums communicate with each other in the embodiment of FIG. 14 via the inter-die communication wires 118 rather than via the inter-package communication wires 1133 of FIG. 12. Note that here, the cores are configured in accordance with a hierarchical coordination system that is deeper, having three levels of domains, than the processor's physical model.

Referring now to FIG. 15, a block diagram illustrating an alternate embodiment of a computer system 1500 that performs decentralized power management distributed among multiple processing cores 106 of a multi-core microprocessor 1502 according to the present invention is shown. The system 1500 is similar in some ways to the system 1400 of FIG. 14 in that it includes a single octa-core microprocessor 1502 having eight cores 106 denoted core 0 through core 7. However, the multi-core microprocessor 1502 comprises two quad-core dies 1504 coupled together via inter-die communication wires 118. Each of the two dies 1504 includes two pads 108 for coupling to the inter-die communication wires 118, namely an OUT pad and IN 1, IN 2, and IN 3 pads. The multi-core microprocessor 1502 includes two pins denoted "P1" and "P2". The configuration of the inter-die communication wires 118 of the multi-core microprocessor 1502 is as follows. The OUT pad of die 0 and the IN 1 pad of die 1are coupled together via a single wire net that is coupled to pin P2, and the OUT pad of die 1 and the IN 1 pad of die 0 are coupled together via a single wire net that is coupled to pin P1. Additionally, inter-core communication wires 112 of the quad-core die 1504 couple each core 106 to the other cores 106 of the die 1504 to facilitate decentralized power management distributed among multiple processing cores 106 of a multi-core microprocessor 1502.

The cores 106 of FIG. 15 are configured to operate according to the description of FIG. 13 with the following understandings. First, each die itself has its cores organized and physically connected by sideband wires in accordance with a two layer hierarchical coordination system. Die 0 has two pal kinship groups (core 0 and core 1; core 2 and core 3) and one buddy kinship group (core 0 and core 2). Likewise, die 1 has two pal kinship groups (core 4 and core 5; core 6 and core 7) and one buddy kinship group (core 4 and core 6). Note that here, the buddy cores are considered buddies even though they are in the same die, contrary to the characterization of "buddy" stated with respect to FIG. 1 above. Moreover, the buddies communicate with each other in the embodiment of FIG. 15 via the inter-core communication wires 112 rather than via the inter-die communication wires 118 of FIG. 12.

Second, the package itself defines a third hierarchical domain and corresponding chum kinship group. Namely, core 0 and core 4 are considered chums even though they are in the same package 1502, contrary to the meaning of the term "chum" stated with respect to FIG. 12 above. Also, the chums communicate with each other in the embodiment of FIG. 15 via the inter-die communication wires 118 rather than via the inter-package communication wires 1133 of FIG. 12.

Referring now to FIG. 16, a block diagram illustrating an alternate embodiment of a computer system 1600 that performs decentralized power management distributed among multiple processing cores 106 of a multi-core microprocessor 1602 according to the present invention is shown. The system 1600 is similar in some ways to the system 1500 of FIG. 15 in that it includes a single octa-core microprocessor 1602 having eight cores 106 denoted core 0 through core 7. However, each die 104 includes inter-core communication wires 112 between each of the cores 106 to enable each core 106 to communicate with each other core 106 in the die 104. Thus, for purposes of description of operation of the microcode 208 of each core 106 of FIG. 16: (1) core 0, core 1, core 2 and core 3 are considered pals, and core 4, core 5, core 6 and core 7 are considered pals; (2) core 0 and core 4 are considered buddies. Accordingly, system 1600 is organized and physically connected by sideband wires in accordance with a two layer hierarchical coordination system consisting of pal and buddy kinship groups. Moreover, the existence of inter-core communication wires 112 between each of the cores of the die facilitates a peer-collaborative coordination model for the pal kinship group that the die defines. Although capable of operating in accordance with a peer-collaborative coordination model, FIG. 17 describes a master-collaborative coordination model for decentralized power management between the cores.

Referring now to FIG. 17, a flowchart illustrating operation of the system 1600 of FIG. 16 to perform decentralized power management distributed among the multiple processing cores 106 of the multi-core microprocessor 102 according to the present invention is shown. More specifically, the flowchart of FIG. 17 illustrates operation of the sync_cstate microcode 208 of FIG. 3 (and FIG. 6), similar to the flowchart of FIG. 4, which are alike in many respects, and like-numbered blocks are similar. However, the microcode 208 of the cores 106 described in the flowchart of FIG. 17 accounts for the presence of eight cores 106 rather than the four cores 106 in the embodiment of FIG. 1, specifically the presence of four cores 106 is each of two dies 104, and the differences are now described. In particular, each master core 106 of a die 104 has three pal cores 106 rather than one pal core 106.

Flow begins in FIG. 17 at block 402 and proceeds through decision block 404 and out of the "NO" branch of decision block 404 to decision block 432 as described with respect to FIG. 4. However, FIG. 17 does not include blocks 406 through 418. Rather, flow proceeds from decision block 404 out of the "YES" branch to block 1706.

At block 1706, the sync_cstate microcode 208 induces a new instance of the sync_cstate routine on a pal by programming the CSR 236 of FIG. 2 to send to its next pal the "A" value either received at block 402 or generated at block 1712 (discussed below) and to interrupt the pal. This requests the pal to calculate and return a compound C-state to the core 106. In the loop comprising blocks 1706, 1708, 1712, 414, and 1717, the microcode 208 keeps track of which of the pals it has visited to insure that it visits each of them (unless the condition at decision block 414 is found to be true). Flow proceeds to block 1708.

At block 1708, the sync_cstate microcode 208 programs the CSR 236 to detect that the next pal has returned a compound C-state to the core 106 and obtains the pal's compound C-state, denoted "B" in FIG. 17. Flow proceeds to block 1712.

At block 1712, the sync_cstate microcode 208 computes a newly calculated native compound C-state by computing the minimum value of the "A" and "B" values, which is denoted "A." Flow proceeds to decision block 1714.

At decision block 1714, if the "A" value computed at block 1712 is less than 2 or the core 106 is not the master core 106, flow proceeds to block 1716; otherwise, flow proceeds to decision block 1717.

At block 1716, the sync_cstate microcode 208 returns to its caller the "A" value computed at block 1712. Flow ends at block 1716.

At decision block 1717, the sync_cstate microcode 208 determines whether all of its pals have been visited, i.e., whether the core 106 has exchanged compound C-states with each of its pals via blocks 1706 and 1708. If so, flow proceeds to block 1719; otherwise, flow returns to block 1706.

At block 1719, the sync_cstate microcode 208 determines the "A" value computed at block 1712 to be its die composite C-state denoted "C" and flow proceeds to block 422 and continues on through to block 428 as described above with respect to FIG. 4.

Flow proceeds from the "NO" branch of decision block 438 to decision block 1739.

At decision block 1739, the sync_cstate microcode 208 determines whether all of its pals have been visited, i.e., whether the core 106 has exchanged a compound C-state with each of its pals via blocks 1741 and 1743 (discussed below). If so, flow proceeds to block 446 and continues on through to block 456 as described above with respect to FIG. 4; otherwise, flow proceeds to block 1741.

At block 1741, the sync_cstate microcode 208 induces a new instance of the sync_cstate routine on its next pal by programming the CSR 236 of FIG. 2 to send to its next pal the "G" value computed either at block 436 or at block 1745 (discussed below) and to interrupt the pal. This requests the pal to calculate and return a compound C-state to the core 106. In the loop comprising blocks 438, 1739, 1741, 1743, and 1745, the microcode 208 keeps track of which of the pals it has visited to insure that it visits each of them (unless the condition at decision block 438 is found to be true). Flow proceeds to block 1743.

At block 1743, the sync_cstate microcode 208 programs the CSR 236 to detect that the next pal has returned a compound C-state to the core 106 and obtains the pal's compound C-state, denoted "F" in FIG. 17. Flow proceeds to block 1745.

At block 1745, the sync_cstate microcode 208 computes a newly calculated native compound C-state by computing the minimum value of the "F" and "G" values, which is denoted "G." Flow returns to decision block 438.

FIG. 17 does not include block 478 through block 488. Instead, flow proceeds out of the "NO" branch of decision block 472 to decision block 1777.

At decision block 1777, the sync_cstate microcode 208 determines whether all of its pals have been visited, i.e., whether the core 106 has exchanged a compound C-state with each of its pals via blocks 1778 and 1782 (discussed below). If so, flow proceeds to block 474 and continues on through to block 476 as described above with respect to FIG. 4; otherwise, flow proceeds to block 1778.

At block 1778, the sync_cstate microcode 208 induces a new instance of the sync_cstate routine on a next pal by programming the CSR 236 of FIG. 2 to send to its next pal the "L" value computed either at block 468 or at block 1784 (discussed below) and to interrupt the pal. This requests the pal to calculate and return a compound C-state to the core 106. In the loop comprising blocks 472, 1777, 1778, 1782, and 1784, the microcode 208 keeps track of which of the pals it has visited to insure that it visits each of them (unless the condition at decision block 472 is found to be true). Flow proceeds to block 1782.

At block 1782, the sync_cstate microcode 208 programs the CSR 236 to detect that the next pal has returned a compound C-state state to the core 106 and obtains the pal's compound C-state, denoted "M" in FIG. 17. Flow proceeds to block 1784.

At block 1784, the sync_cstate microcode 208 computes a newly calculated native compound C-state by computing the minimum value of the "L" and "M" values, which is denoted "L." Flow returns to decision block 472.

As stated earlier, FIG. 17 as applied to FIG. 16 illustrates an application of a master-mediated hierarchical coordination model to a microprocessor 1602 whose sideband wires facilitate a peer-collaborative coordination model for at least some of the core kinship groups. This combination provides various advantages. On the one hand, the physical structure of the microprocessor 1602 provides flexibility in defining and redefining hierarchical domains and designating and redesignating domain masters, as described in connection with the section of Ser. No. 61/426,470, filed Dec. 22, 2010, entitled "Dynamic and Selective Core Disablement in a Multi-Core Processor," and its concurrently filed nonprovisional Ser. No. 13/299,239, which is herein incorporated by reference. Moreover, on a microprocessor providing such inter-core coordination flexibility, a hierarchical coordination system may be provided that can act, depending on predefined circumstances or configuration settings, in more than one coordination mode. For example, a hierarchical coordination system can preferentially employ a master-mediated model of coordination using designated master cores for a given kinship group, but, under certain predefined or detected conditions, designate a different core as a provisional master for that kinship group, or alternatively switch into a peer-collaborative coordination model for a given kinship group. Examples of possible model-switching conditions include the designated master core being unresponsive or disabled, the designated master being in a restricted interruption mode that restricts interrupts based upon their status or urgency, or the designated master being in a state authorizing delegation of certain gatekeeping or coordination roles to one or more of its constituents.

In the foregoing Figures, restricted power states, such as C-states>=2, have been illustrated that are implementable only if equal to the composite power state for the processor. In such cases, composite power state discovery processes have been described that are operable to account for the applicable power states of every core in the processor before implementing the restricted power state.

It will be understood, however, and as stated early in the specification, that different configurations and classes of orderable power states are contemplated. Moreover, very advanced sets of power states that include multiple domain-specific levels of restricted power states are also contemplated, where progressively higher levels of restricted power states would be applicable to progressively higher domains of the processor.

For example, in a multi-core multiprocessor having multiple multi-core dies, each die providing a PLL to be shared amongst the cores of the die, but a single VRM shared by all of the cores of the microprocessor, as illustrated for example in Ser. No. 13/299,225, a domain-restricted power state hierarchy could be defined that included a first set of power states specifically applicable to resources internal, and not externally shared, to a core, a next set of power states specifically applicable to resources (such as PLLs and caches) shared by cores on the die, but not otherwise shared outside of the die, and yet another set of power states (e.g., voltage values and the bus clock) specifically applicable to the entire microprocessor.

Accordingly, in one embodiment, each domain has its own composite power state. Also, for each domain, there is a single properly credentialed core (e.g., the master of that domain) having authority to implement or enable implementation of a restricted power state that, as defined by a corresponding domain-differentiated power state hierarchy coordination system, is limited in its impact to that domain. Such an advanced configuration is particularly well suited for embodiments, including for example those shown in Ser. No. 13/299,225, in which subgroups of the processor's cores share caches, PLLs, and the like.

Embodiments are also contemplated in which a decentralized synchronization process is used to manage not only implementation of a restricted power state, but also to selectively implement a wake state or the repeal of a restricted power state in a manner that does not necessarily wake up all of the cores. Such an advanced embodiment contrasts with a system like that of FIG. 5, in which a chipset STPCLK deassertion may fully wake up all of the cores.

Figure 23:
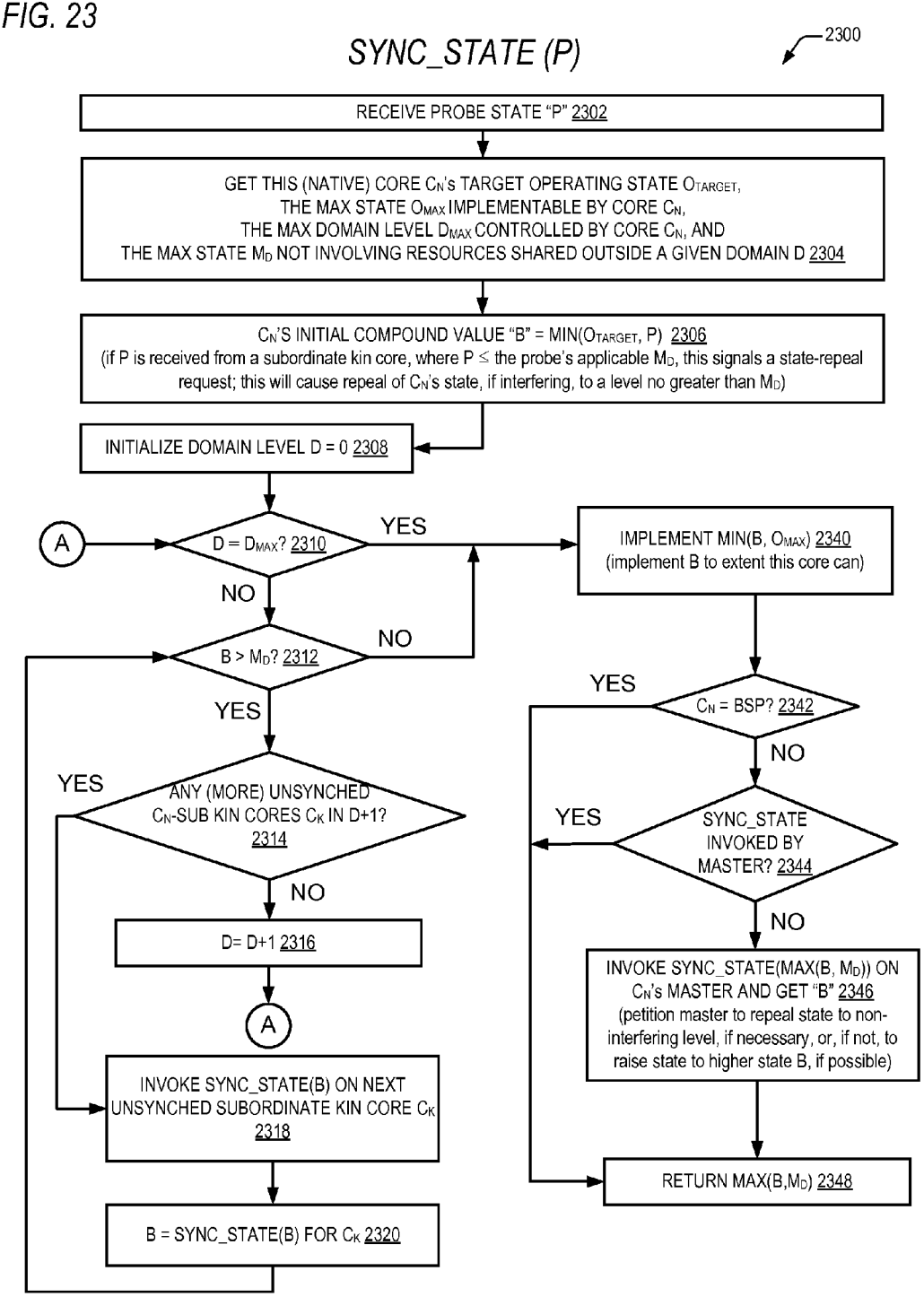
FIG. 23 is a flowchart illustrating another embodiment of operating state synchronization logic, implemented on a core, that supports a domain-differentiated operating state hierarchy coordination system and is scalable to different domain depths.

Turning now to FIG. 23, a block diagram is depicted of one embodiment of sync_state logic 2300, implemented for example in microcode, for both conditionally implementing and selectively repealing a restricted operating state. As described below, the sync_state logic 2300 supports implementation of a domain-differentiated power state hierarchy coordination system. Advantageously, sync_state logic 2300 is extraordinarily scalable in that it can be extended to hierarchical coordination systems of practically any desired domain-level depth. Also, the logic 2300 may be implemented in not only a global fashion to a microprocessor as a whole, but also more restrictive fashions to only particular groups of cores (e.g., only to the cores of a die as explained, for example, in connection with block 2342 below) within a microprocessor. Moreover, the sync_state logic 2300 may be applied independently to different groups of operating states, with different correspondingly defined hierarchical coordination systems, applicable operating states, and domain level thresholds.

In aspects similar to earlier illustrated embodiments of the sync_cstate microcode 208, the sync_state logic 2300 may be natively or externally invoked and is implemented in a routine that passes a probe state value "P." For instance, a power state management microcode routine could receive a target operating state passed by an MWAIT instruction, or, as discussed in connection with Ser. No. 13/299,225, generate a target operating state (such as a requested VID or frequency ratio value) utilizing native core logic for the core. The power state management microcode routine could then save the target value as the core's target operating state $O_{TARGET}$, and then invoke the sync_state logic 2300 by passing $O_{TARGET}$ as the probe state value "P." Alternatively, in aspects similar to those discussed in previous embodiments, the sync_state logic 2300 may be invoked by an interrupt routine responding to an externally generated synchronization request. For simplicity, such instances are referred to as externally-invoked instances of the sync_state logic 2300.

Before proceeding further, it should be noted that FIG. 23, again for simplicity, illustrates sync_state logic 2300 in a form suitable for managing operating states defined or ordered in such a way that progressively greater degrees of inter-core coordination are required for progressively higher requested states, as is applicable to C-states, for example. It will be understood that an ordinarily skilled artisan could, with carefully applied logic, modify the sync_state logic 2300 to support an operating state hierarchy (such as VID or frequency ratio states) in which the operating states are defined in the opposite direction. Alternatively, operating states that are, by convention or choice, defined in one direction are, by definition, typically "orderable" in the opposite direction. Therefore, the sync_state logic 2300 may be applied to operating states such as requested VID and frequency ratio states simply by re-ordering them, and applying oppositely-directed reference values (such as the negatives of the original values).

It is also noted that FIG. 23 illustrates sync_state logic 2300 particularly configured for a strictly hierarchical coordination system, in which all included kinship groups operate in accordance with a master-mediated coordination model. As demonstrated with respect to earlier illustrated synchronization logic embodiments that accommodate some degree of peer-to-peer collaboration, the invention should not be understood, unless and to the extent expressly so indicated, as being limited to strictly hierarchical coordination systems.

Flow begins at block 2302, where the sync_state logic 2300 receives the probe state value "P." Flow proceeds to block 2304, where the sync_state logic 2300 also gets the native core's target operating state $O_{TARGET}$, the maximum operating state $O_{MAX}$ implementable by the native core, the maximum domain level $D_{MAX}$ controlled by the native core, and the maximum available domain-specific state $M_D$ that does not involve or interfere with resources outside of a given domain D. It should be noted that the manner, or chronology in which, the sync_state logic 2300 obtains or calculates block 2304's values is not important. The position of block 2304 in the flow diagram serves merely to introduce important variables applicable to the sync_state logic 2300.

In one illustrative but non-limiting embodiment, domain levels D are defined as follows: 0 for a single core; 1 for a multi-core die; 2 for a multi-die package; and so on. Operating states of 0 and 1 are unrestricted (meaning a core may implement them without coordination with other cores), operating states of 2 and 3 are restricted with respect to cores of the same die (meaning they may be implemented on the cores of a die subject to coordination with other cores on the die, but without requiring coordination with other cores on other dies), and operating states of 4 and 5 are restricted with respect to cores of the same package (meaning they may be implemented on that package after coordination with the cores of that package, but without requiring coordination with other cores on other packages, if any), and so on. The corresponding maximum available domain-specific states $M_D$ are therefore: $M_0=1$; $M_1=3$; and $M_2=5$. Furthermore, both the maximum domain level $D_{MAX}$ controlled by a core and the maximum operating state $O_{MAX}$ implementable by the core are a function of that core's master credentials, if any. Therefore, in this example, a non-master core would have a $D_{MAX}$ of 0 and a corresponding maximum self-implementable operating state $O_{MAX}$ of 1; a die master core would have a $D_{MAX}$ of 1 and a corresponding maximum self-implementable operating state $O_{MAX}$ of 3; and a package master or BSP core would have a $D_{MAX}$ of 2 and a corresponding maximum self-implementable operating state $O_{MAX}$ of 5.

Flow proceeds to block 2306, where the sync_state logic 2300 calculates an initial compound value "B" equal to the minimum of the probe value "P" and the native core's target operating state $O_{TARGET}$. Incidentally, if P is received from a subordinate kin core, and its value is less than or equal to the maximum available domain-specific operating state $M_D$ which the kin core is credentialed to implement, then, based on the logic described herein, this generally indicates a request by a subordinate kin core to repeal any potentially interfering sleepier states implemented by the native or a higher-ranked core. This is because, in a typical configuration, the subordinate kin core has already implemented the relatively more wakeful P state to the extent it so able, but it cannot unilaterally, without higher level coordination, repeal an interfering sleepier state implemented through a domain it does not control.

Flow proceeds to block 2308, where a domain level variable D is initialized to zero. In the example illustrated above, a D of 0 refers to a core.

Flow proceeds to decision block 2310. If D is equal to $D_{MAX}$, then flow proceeds to block 2340. Otherwise, flow proceeds to decision block 2312. For example, a sync_state routine invoked on a non-master core will always proceed to block 2340 without implementing any of the logic shown between blocks 2312-2320. This is because the logic shown between blocks 2312-2320 is provided to conditionally synchronize subordinate kin cores of a master core. As another example, if a die master core has no other master credentials, its $D_{MAX}$ equals 1. Initially, D is 0, so a conditional synchronization process may be carried out on the other cores of the die, in accordance with blocks 2312-2320. But after any such synchronization is completed (assuming it is not conditionally terminated sooner in accordance with decision block 2312), and D has been incremented by one (block 2316), flow will proceed (through decision block 2310) to block 2340.

Turning now to decision block 2312, if $B>M_D$, then flow proceeds to decision block 2314. Otherwise, flow proceeds to block 2340. To state it another way, if the native core's currently calculated compound value B will not involve or interfere with resources outside of the domain defined by variable D, there is no need to synchronize with any further subordinate kin cores. For example, if the currently calculated compound value B is 1, a value that only impacts resources local to a given core, no further synchronization with subordinate kin cores is needed. As another example, suppose the native core is a chum core, with sufficient credentials to turn off or impact resources that are common to multiple dies. But assume also that the chum's currently calculated compound value B is 3, a value that would only impact resources local to the chum's die, and not to other dies over which the chum is master. Suppose also that the chum has completed synchronization with each of the cores on its own die in accordance with blocks 2314, 2318, and 2320, causing variable D to be incremented to 1 (block 2316), and bringing a new $M_D=M_1=3$ into consideration (block 2312). Under these circumstances, the chum does not need to further synchronize with subordinate kin cores (e.g., buddies) on other dies, because the chum's implementation of a value of 3 or less would not affect the other dies anyway.

Turning now to decision block 2314, the sync_state logic 2300 evaluates whether there are any (more) unsynched subordinate kin cores in the domain defined by D+1. If there are any such cores, flow proceeds to block 2318. If not, flow proceeds first to block 2316, where D is incremented, and then to decision block 2310, where the now incremented value of D is evaluated, again, as discussed above.

Turning now to block 2318, because an unsynched subordinate kin core has been detected (block 2318), which could be affected by implementation of the currently calculated compound value "B" (block 2312), because it would affect resources shared by the subordinate kin core, the native instance of the sync_state logic 2300 invokes a new, dependent instance of the sync_state logic 2300 on the unsynched subordinate kin core. The native instance passes its currently calculated compound value "B" as a probe value to the dependent instance of the sync_state logic 2300. As evident by the logic of sync_state logic 2300, the dependent instance will ultimately return a value that is no greater than the native value of "B" (block 2306) and no less than the subordinate kin core's maximum available domain-specific state $M_D$ (block 2346), which is the maximum value that would not interfere with any resources shared between the native and subordinate kin cores. Accordingly, when flow proceeds to block 2320, the native instance of the sync_state logic 2300 adopts the value returned by the dependent instance as its own "B" value.

Up until now, focus has been directed on the part of the sync_state logic 2300 used to conditionally synchronize subordinate kin cores. Now, focus will be directed to blocks 2340-2348, which describes logic for implementing a target and/or synchronized state, including conditionally coordinating with superior kin cores (i.e., higher level masters).

Turning now to block 2340, the native core implements its current compound value "B" to the extent that it can. In particular, it implements the minimum of B and $O_{MAX}$, the maximum state implementable by the native core. It is noted that with respect to cores that are domain masters, block 2340 configures such cores to implement or enable implementation of the minimum of a composite power state for its domain (the "B" of block 2306 or 2320) and the maximum restricted power state (i.e., $O_{MAX}$) applicable to its domain.

Flow proceeds to decision block 2342, where the sync_state logic 2300 evaluates whether the native core is the BSP for the microprocessor. If so, there are no superior cores to coordinate with, and flow proceeds to block 2348. If not, flow proceeds to decision block 2344. It should be noted that in embodiments in which the sync_state logic 2300 is applied to control operating states in less than a global way to the microprocessor, block 2342 is modified by replacing "BSP" with "highest applicable domain master" to which the predefined set of operating states pertains. For example, if the sync_state logic 2300 is applied merely to the application of desired frequency clock ratios to a PLL shared by a die described in Ser. No. 13/299,225, then "BSP" would be replaced with "die master."

In decision block 2344, the sync_state logic 2300 evaluates whether the native instance of sync_state was invoked by a master core. If so, then the native core has already, by definition, been synched with its master, so flow proceeds to block 2348. If not, flow proceeds to block 2346.

Turning now to block 2346, the sync_state logic 2300 invokes a dependent instance of sync_state on its master core. It passes as the probe value P the maximum of the core's last compound value B and core's maximum available domain-specific state $M_D$. Two examples are provided to illustrate this selection of a probe value P.

In a first example, assume B is higher than the native core's maximum self-implementable operating state $O_{MAX}$ (block 2340). In other words, the native core cannot unilaterally, without higher level coordination, cause full implementation of B. In such a circumstance, block 2346 represents a petition by the native core to its master core, asking it to more fully implement B, if possible. It will be appreciated that the master core, in accordance with the logic set forth in FIG. 23, will decline the petition if it is not consistent with its own target state and the applicable states of other potentially affected cores. Otherwise, the master core will implement the petition to the extent it is consistent with those states, up to a maximum of its own maximum self-implementable state $O_{MAX}$ (block 2340). In accordance with block 2346, the master core will also petition its own superior core, if any, with a value that is a compound of, and may be equal to, the original core's B value, and so on, all the way up through the hierarchy. In this way, the sync_state logic 2300 fully implements the native core's last compound value B if applicable conditions are met.

In a second example, assume that B is lower than the native core's maximum self-implementable operating state $O_{MAX}$ (block 2340). Assuming that no higher, interfering operating state, affecting resources outside of the native core's control, is in effect, then the native core has, in block 2340, fully implemented B. But if a higher, interfering operating state is in effect, then the native core cannot unilaterally repeal the interfering operating state. In such a circumstance, block 2346 represents a petition by the native core to its master core, asking it to repeal an existing interfering operating state to a level—i.e., the native core's maximum available domain-specific state $M_D$—that no longer interferes with a complete implementation of B. It will be appreciated that the master core, in accordance with the logic set forth in FIG. 23, will comply with that petition, implementing a state that is no greater than, and which could be less than, the native core's $M_D$. It should be noted that block 2346 could alternatively petition the master to simply implement B. But if B<$M_D$, then this may cause the master core to implement a more wakeful state than necessary to fully implement B for the native core. Accordingly, the use of a probe value equal to the maximum of the native core's last compound value B and native core's maximum available domain-specific state $M_D$ is preferred. Thus, it will be appreciated that the sync_state 2302 supports a minimalist approach to both sleep state and wake state implementation.

Turning now to block 2348, the sync_state 2300 logic returns a value to the process that called or invoked it equal to the maximum of the core's last compound value B and core's maximum available domain-specific state $M_D$. As explained with block 2346, it should be noted that block 2348 could alternatively just return the value of B. But if B<$M_D$, then this may cause an invoking master core (block 2318) to implement a more wakeful state than necessary for itself. Accordingly, the return of the maximum of the core's last compound value B and core's maximum available domain-specific state $M_D$ is preferred. Again, it will be appreciated that, in this manner, the sync_state 2302 supports a minimalist approach to both sleep state and wake state implementation.

In another embodiment, one or more additional decision blocks are interposed between blocks 2344 and 2346, further conditioning block 2346's invocation of a dependent sync_state routine. For example, under one applicable condition, flow would proceed to block 2346 if B>$O_{MAX}$. Under another applicable condition, flow would proceed to block 2346 if an interfering operating state, repealable only at a higher domain level, is currently being applied to the native core. If neither of these two alternative conditions applied, then flow would proceed to block 2346. In this manner, the sync_state 2302 would support an even more minimalist approach to wake state implementation. It should be observed, however, that this alternative embodiment assumes that the native core can detect whether an interfering operating state is being applied. In an embodiment where the native core cannot necessarily detect the presence of an interfering operating state, then the less conditional invocation approach depicted in FIG. 23 is preferred.

In will also be appreciated that in FIG. 23, composite operational state discovery processes, when necessary for purposes of implementing a targeted deeper operational state (or shallower version thereof), traverse only cores (and not necessarily all of the cores) of the highest level domain (which includes its nested domains) for which the resources affected by the targeted operational state are shared, using a traversal order that progressively traverses cores in a lowest-to-highest (or nearest-to-farthest kinship group) order. Also, composite operational state discovery processes, when necessary for purposes of implementing a shallower operational state, traverse only through successively higher masters. Moreover, in the alternative embodiment described immediately above, this traversal extends only as far as is necessary to repeal a currently implemented interfering operating state.

Thus, in applying an earlier exemplary illustration to FIG. 23, a target restricted power state of 2 of 3 would trigger a composite power state discovery process only of cores in the applicable die. A target restricted power state of 4 of 5 would trigger a composite power state discovery process only of cores in the applicable package.

FIG. 23 can be further characterized in a domain-specific (in addition to a core-specific) manner. Continuing with the exemplary illustration above, a die would have applicable domain-specific power states of 2 and 3. If, for example, as part of an either natively or externally initiated composite power state discovery process, the die master core discovers a composite power state for its die of only 1, then, because 1 is not an applicable domain-specific power state, the die master core would not implement it. If, as an alternative example, the die master core discovers a composite power state for its die of 5 (or a compound of the die's composite power state value and a nodally-connected core's probe power state value equal to 5), and if the die master core does not have any higher master credentials, then (provided it has not already done so) the die master core would implement or enable implementation of a power state of 3, which is the minimum of 3 (the die's maximum applicable domain-specific power state) and 5 (the die's composite power state or a compound thereof). Again, it is noted that in this example, the die master core would proceed to implement or enable implementation of the power state of 3 for its die, regardless of any actual or partial composite power state (e.g., 2 or 4 or 5) applicable to a higher domain of which it is a part.

Furthering the illustration above, where a die master discovers a die composite power state or compound thereof of 5, the die master, in conjunction with its buddies, would undertake a composite power state discovery process that would necessarily include, independently of the die master's intermediate implementation, if any, of the power state of 3 for its die, a traversal of the next higher-level domain (e.g., the package or the entire processor). This is because 5 is greater than 3, the die's maximum applicable domain-specific power state, so implementation of a higher restricted power state would necessarily depend on the power states applicable to one or more higher domains. Moreover, implementation of a higher restricted power state specific to the next higher level domain could only be enabled and/or carried out by the master of that domain (e.g., the package master for a multi-package processor or the BSP of a single-package processor). It is worth reminding that the die master might also simultaneously hold the relevant package master or BSP credential.

Accordingly, in the example above, the die master core would, at some point in the discovery process, exchange its die composite power state (or a compound thereof) with a buddy. Under some conditions, this discovery process would return to the die master core an at least partial composite power state for the higher domain (e.g., the package) that is less than 2. Yet this would not result in a repeal of the power state of 3 that the die master core had implemented for the die. Under other conditions, this discovery process would yield a composite power state (such as 4 or more) for the package or processor (or other applicable next higher domain) that corresponds to a restricted power state of 4 or more. If so, the master of that domain (e.g., the package master) would implement a higher restricted power state that is a minimum of the higher level domain's composite power state (e.g., 4 or 5) and the maximum restricted power state (here, 5) applicable to the higher level domain. This conditional, domain-specific power-state implementation process would extend to yet higher domain levels, if any, if the applicable discovery process is testing an even higher restricted power state.

As seen above, FIG. 23 illustrates a hierarchical domain-specific restricted power state management coordination system operable to incorporate domain-dependent restricted power states and associated thresholds. According, it is adapted to fine-tuned domain-specific decentralized approaches to power-state management of individual cores and groups of cores.

It will be noted that FIG. 23 illustrates power state coordination logic that provides for transition to more wakeful states in a decentralized, distributed manner. However, it will be appreciated that some power-state embodiments include power states from which a particular core may be unable, absent prior power-state-repealing actions by the chipset or other cores, to wake. For example, in the C-state architecture described above, a C-state of 2 or higher may be associated with removal of the bus clock, which may disable a given core from responding to an instruction, delivered over the system bus, to transition into a more wakeful state. Other microprocessor configurations are contemplated in which power or clock sources may be selectively removed from a core or a die. FIG. 5 depicts an embodiment of arousal logic that adapts to these circumstances by waking up all of the cores in response to a STPCLK deassertion. More selective embodiments of arousal logic, however, are contemplated. In one example, arousal logic implemented by system software, such as an operating system or BIOS, is contemplated wherein the system software would first issue a wake or arousal request to a particular core, and if does not receive a response, or the core does not comply, within an expected time interval, the logic recusively issues wake or arousal requests to successively higher masters, and potentially the chipset, as needed, until an expected response is received or appropriate compliance is detected. This software-system implemented arousal logic would be used in coordination with the power state coordination logic of FIG. 23 to transition to more wakeful states in a preferentially decentralized manner (where each targeted core initiates the transition using its own microcode), to the extent that the cores are operable to do so, and in a centrally coordinated manner, when the cores are inhibited from doing so. This embodiment of arousal logic is just one illustrative and exemplary embodiment of several possible embodiments for selectively arousing cores that are unable to arouse themselves.

VI. Extended Embodiments and Applications

Although embodiments have been described having a particular number of cores 106, other embodiments are contemplated with other numbers of cores 106. For example, although the microcode 208 described in FIGS. 10, 13, and 17 is configured to perform distributed power management among eight cores, the microcode 208 functions properly in a system with fewer cores 106 by including checks for the presence or absence of cores 106, such as is described with respect to the section of Ser. No. 61/426,470, filed Dec. 22, 2010, entitled "Dynamic Multi-Core Microprocessor Configuration," and its concurrently filed nonprovisional Ser. No. 13/299,207, whose disclosure is attached hereto. That is, if a core 106 is absent, the microcode 208 does not exchange C-state information with the absent core 106 and effectively assumes the C-state of the absent core would be the highest possible C-state (e.g., a C-state of 5). Thus, for the purpose of efficiency in manufacturability, the cores 106 may be manufactured with microcode 208 configured to perform distributed power management among eight cores even though the cores 106 may be included in systems with fewer cores 106. Furthermore, embodiments are contemplated in which the system includes more than eight cores and the microcode described herein is extended to communicate with the additional cores 106 in a manner similar to those already described. By way of illustration, the systems of FIGS. 9 and 11 may be extended to include sixteen cores 106 having eight buddies, and the systems of FIGS. 12, 14 and 15 may be extended to include sixteen cores 106 with four chums analogous to the way in which the systems of FIGS. 9 and 11 synchronize C-states between the four buddies, and the systems of FIG. 16 may be extended to includes sixteen cores 106 by having sixteen pals (either eight cores per die by two dies, or four cores per die by four dies), thereby synthesizing relevant features of the methods of FIGS. 4, 10, 13, and 17.

Embodiments are also contemplated in which coordination of different classes of power states (e.g., C-states, P-states, requested VIDs, requested frequency ratios, etc.) are carried out independently. For example, each core may have a different applicable power state for each class of power states (e.g., a separate applicable VID, frequency ratio, C-states, and P-states), with different domain-specific restrictions applied thereto, and with different extremums used to compute compound states and discover composite states (e.g., minimums for C-states versus maximums for requested VIDs). Different hierarchical coordination systems (e.g., different domain depths, different domain constituencies, different designated domain masters, and/or different kinship group coordination models) may be established for different classes of power states. Moreover, some power states may only require coordination, at most, with other cores on a domain (e.g., the die) that includes only a subset of all of the cores on the microprocessor. For such power states, hierarchical coordination systems are contemplated that only nodally link, coordinate cores within, and discover composite power states applicable to or within, that domain.

Generally, embodiments have been illustrated in which all of the operating states are strictly and linearly orderable in a progressively ascending or descending basis. But other embodiments are contemplated in which the operating states are tiered and orderable in ascending or descending fashion along each tier (including embodiments in which tiers are orderable independently of other tiers). For example, a predefined set of power states may be characterized in a composite form of separable tiers A.B, A.B.C, etc., where each of tiers A, B, C, etc., relates to a different characteristic or class of characteristics. For example, a power state could be characterized in a composite form of C.P or P.C, where P refers to an ACPI P-state and C refers to an ACPI C-state. Furthermore, a class of restricted power states may be defined by the value of a particular component (e.g., A or B or C) of the compositely defined power state, and another class of restricted power states may be defined by the value of another component of the compositely defined power state. Moreover, within any given tier of restricted power states, where a tier refers to the value of one of the components of the compositely defined power states, e.g., C.P, the values of another component, e.g., the P in C.P, may be unrestricted, or subject to a different class of restrictions, for a given core than the restrictions that apply to the tier. For example, a core with a targeted power state of C.P, where P refers to its P-state, and C refers to its requested C-state, may be subject to independent restrictions and coordination requirements with respect to the implementation of the C and P portions of its targeted power state. In composite power state embodiments, an "extremum" of any two power states may refer, for a given core calculating the extremum, a composite of extremums of component portions of the composite power states, or a composite of extremums of fewer than all of the component portions of the composite power state and, for the other component portions, otherwise selected or determined values.

Also, embodiments are contemplated in which the multiple cores 106 in a system perform distributed, decentralized power management to specifically perform power credit functionality as described in U.S. application Ser. No. 13/157, 436, filed Jun. 10, 2011, which is hereby incorporated by reference in its entirety for all purposes, but using the inter-core communication wires 112, inter-die communication wires 118, and inter-package communication wires 1133 rather than using a shared memory area as described in Ser. No. 13/157,436. Advantages of such an embodiment are that it is transparent to system firmware (e.g., BIOS) and system software and does not require reliance on the system firmware or software to provide a shared memory region, which is desirable since the microprocessor manufacturer may not always have the ability to control releases of the system firmware or software.

Also, embodiments of synchronization logic are contemplated that pass other values in addition to a probe value. In one embodiment, a synchronization routine passes a value that distinguishingly identifies the discovery process of which it is a part, with respect to any other simultaneously operating discovery processes. In another embodiment, the synchronization routine passes a value by which the synched, or not-yet-synched, cores may be identified. For example, an octa-core embodiment may pass an 8-bit value where each bit represents a particular core of the octa-core processor and each bit indicates whether or not that core has been synched as part of the instant discovery process. The synchronization routine may also pass a value that identifies the core that initiated the instant discovery process.

Additional embodiments are also contemplated to facilitate synchronized discovery processes that perform ordered traversals of the cores. In one example, each core stores bit masks identifying members of kinship groups of which it is a part. For example, in an octa-core embodiment utilizing a three-level deep hierarchical coordination structure, each core stores three 8-bit "kinship" masks, a "closest" kinship mask, a second-tier kinship mask, and a top-tier kinship mask, where the bit values of each mask identify the kin, if any, belonging to the core in the kinship group represented by the mask. In another example, each core stores a map, a Gödel number, or combinations thereof, from which the nodal hierarchy of the cores can be exactly and uniquely determined, including identifying each domain master. In yet another example, the core stores information identifying shared resources (e.g., voltage sources, clock sources, and caches), and the particular cores or corresponding domains to which they belong and are shared.

Also, while this specification focuses primarily on power state management, it will be appreciated that various embodiments of hierarchical coordination systems described above may be applied to coordinate other types of operations and restricted activities, not just power states or power-related status information. For example, in some embodiments, various of the hierarchical coordination systems described above are used, in coordination with decentralized logic duplicated on each core, for dynamically discovering a multi-core microprocessor's configuration, such as described, for example, in Ser. No. 13/299,207.

Moreover, it should be noted that the present invention, does not, unless specifically so claimed, require use of any of the hierarchical coordination systems described above in order to perform predefined restricted activities. Indeed, the present invention is applicable, unless and to the extent otherwise specifically stated, to purely peer-to-peer coordination systems between cores. However, as made apparent by this specification, usage of a hierarchical coordination system can provide advantages, particularly when relying on sideband communications where the structure of the microprocessor's sideband communication lines does not permit a fully equipotent peer-to-peer coordination system.

As may be observed from the foregoing, in contrast to a solution such as that of Naveh described above which includes the centralized non-core hardware coordination logic (HCL), the decentralized embodiments in which the power management function is distributed equally among the cores 106 described herein advantageously requires no additional non-core logic. Although non-core logic could be included in a die 104, embodiments are described in which all that is required to implement the decentralized distributed power management scheme is hardware and microcode completely physically and logically within the cores 106 themselves along with the inter-core communication wires 112 in multi-core-per-die embodiments, the inter-die communication wires 118 in multi-die embodiments, and the inter-package communication wires 1133 in multi-package embodiments. As a result of the decentralized embodiments described herein that perform power management distributed among multiple processing cores 106, the cores 106 may be located on separate dies or even separate packages. This potentially reduces die size and improves yields, provides more configuration flexibility, and provides a high level of scalability of the number of cores in the system.

In yet other embodiments, the cores 106 differ in various aspects from the representative embodiment of FIG. 2 and provide, instead or addition, a highly parallel structure, such as structures applicable to a graphics processing units (GPU), to which coordination systems as described herein for activities such as power state management, core configuration discovery, and core reconfiguration are applied.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A multi-core processor comprising:
    a plurality of physical processing cores;
    inter-core state discovery microcode in each core enabling the core to participate in a de-centralized inter-core state discovery process through signals, unmediated by any centralized non-core logic, sent to or received from other cores;
    wherein the inter-core state discovery microcode includes synchronization logic, provided to each core, synchronized instances of which are operable to be invoked on multiple cores for purposes of an inter-core state discovery process;
    wherein each native instance is operable both to invoke new instances of the synchronization logic on other cores, and to respond to any prior instance of the synchronization logic on another core that invoked the native instance;
    wherein the hierarchical coordination system groups cores into a plurality of domain levels, including at least:

a primary-level domain of highest rank that includes all of the cores; and two or more secondary-level domains of equal next rank, immediately below the highest rank, that are constituents of and nested within the primary-level domain, each secondary-level group comprising respectively exclusive subgroups of the cores;

for each multi-core domain level, a single core is designated as a master of that domain;

each multi-core domain other than the lowest-level multi-core domains defines a kinship group consisting of master cores of constituent domains of the immediately next lower rank;

each lowest-level multi-core domain defines a kinship group consisting of all of its cores;

each core belongs to at least one kinship group; and each native instance of the synchronization logic is restricted from invoking new instances of the synchronization logic to cores not belonging to a native core kinship group.

2. The multi-core processor of claim 1, wherein:

the inter-core state discovery microcode exchanges signals with other cores through sideband communication wires that are independent of a system bus connecting the multi-core processor to a chipset; and the inter-core state discovery microcode determines an applicable state value that is a function, at least, of a state of another core, without the assistance of any centralized non-core logic.

3. The multi-core processor of claim 1, wherein each instance of the synchronization logic is configured to invoke dependent instances of the synchronization logic on other cores of the multi-core processor in accordance with a hierarchical coordination system that structures inter-core coordinations in a hierarchical fashion.

4. The multi-core processor of claim 1, wherein the hierarchical coordination system groups cores into domains in accordance with resources shared by cores within those domains, and wherein for each domain, a single core is designated as a master of that domain for purposes of a coordinated configuration of those resources.

5. The multi-core processor of claim 1, wherein a single one of the multi-core processor's cores is designated as a master for each multi-core domain of the hierarchical coordination system.

6. The multi-core processor of claim 1, wherein each core is configured to employ its de-centralized inter-core state discovery microcode to discover whether others of the multi-core processor's cores are disabled.

7. The multi-core processor of claim 1, wherein each core is configured to employ its de-centralized inter-core state discovery microcode to discover how many enabled cores the multi-core processor has.

8. The multi-core processor of claim 1, wherein each core is configured to employ its de-centralized inter-core state discovery microcode to discover a hierarchical coordination system of the multi-core processor.

9. A decentralized, microcode-implemented method of discovering states of a multi-core processor comprising a plurality of physical processing cores, the method comprising:

inter-core state discovery microcode of at least two cores participating in a de-centralized inter-core state discovery process through signals, unmediated by any centralized non-core logic, exchanged by the cores;

wherein the inter-core state discovery microcode includes synchronization logic, provided to each core, synchronized instances of which are operable to be invoked on multiple cores for purposes of an inter-core state discovery process;

wherein each native instance is operable both to invoke new instances of the synchronization logic on other cores, and to respond to any prior instance of the synchronization logic on another core that invoked the native instance;

wherein the hierarchical coordination system groups cores into a plurality of domain levels, including at least:

a primary-level domain of highest rank that includes all of the cores; and two or more secondary-level domains of equal next rank, immediately below the highest rank, that are constituents of and nested within the primary-level domain, each secondary-level group comprising respectively exclusive subgroups of the cores;

for each multi-core domain level, a single core is designated as a master of that domain;

each multi-core domain other than the lowest-level multi-core domains defines a kinship group consisting of the master cores of constituent domains of the immediately next lower rank;

each lowest-level multi-core domain defines a kinship group consisting of all of its cores;

each core belongs to at least one kinship group; and each native instance of the synchronization logic is restricted from invoking new instances of the synchronization logic to cores not belonging to a native core kinship group.

10. The method of claim 9, wherein:

the inter-core state discovery microcode exchanges signals with other cores through sideband communication wires that are independent of a system bus connecting the multi-core processor to a chipset; and the inter-core state discovery microcode determines an applicable state value that is a function, at least, of a state of another core, without the assistance of any centralized non-core logic.

11. The method of claim 9, wherein each instance of the synchronization logic is configured to invoke dependent instances of the synchronization logic on other cores of the multi-core processor in accordance with a hierarchical coordination system that structures inter-core coordinations in a hierarchical fashion.

12. The method of claim 9, wherein the hierarchical coordination system groups cores into domains in accordance with resources shared by cores within those domains, and wherein for each domain, a single core is designated as a master of that domain for purposes of a coordinated configuration of those resources.

13. The method of claim 9, wherein a single one of the multi-core processor's cores is designated as a master for each multi-core domain of the hierarchical coordination system.

14. The method of claim 9, wherein each core is configured to employ its de-centralized inter-core state discovery microcode to discover whether others of the multi-core processor's cores are disabled.

15. The method of claim 9, wherein each core is configured to employ its de-centralized inter-core state discovery microcode to discover how many enabled cores the multi-core processor has.

16. The method of claim 9, wherein each core is configured to employ its de-centralized inter-core state discovery microcode to discover a hierarchical coordination system of the multi-core processor.

* * * * *